(12) United States Patent
Okada et al.

(10) Patent No.: US 10,564,059 B2
(45) Date of Patent: Feb. 18, 2020

(54) FORCE SENSOR

(71) Applicant: TRI-FORCE MANAGEMENT CORPORATION, Saitama-ken (JP)

(72) Inventors: Kazuhiro Okada, Saitama-ken (JP); Miho Okada, Saitama-ken (JP)

(73) Assignee: TRI-FORCE MANAGEMENT CORPORATION, Saitama-Ken (JP)

( * ) Notice: Subject to any disclaimer, the term of this patent is extended or adjusted under 35 U.S.C. 154(b) by 13 days.

(21) Appl. No.: 15/759,423

(22) PCT Filed: Aug. 29, 2016

(86) PCT No.: PCT/JP2016/075236
§ 371 (c)(1),
(2) Date: Mar. 12, 2018

(87) PCT Pub. No.: WO2018/029866
PCT Pub. Date: Feb. 15, 2018

(65) Prior Publication Data
US 2019/0113407 A1 Apr. 18, 2019

(30) Foreign Application Priority Data
Aug. 9, 2016 (WO) .................. PCT/JP2016/073487

(51) Int. Cl.
*G01L 5/16* (2006.01)
*G01L 1/14* (2006.01)
(Continued)

(52) U.S. Cl.
CPC .............. *G01L 5/166* (2013.01); *G01L 5/161* (2013.01); *G01L 5/165* (2013.01); *G01L 1/142* (2013.01);
(Continued)

(58) Field of Classification Search
CPC ......... G01L 5/166; G01L 5/161; G01L 5/165; G01L 5/162; G01L 1/142; G01L 1/2231; G01L 1/2262; G01L 25/00
See application file for complete search history.

(56) References Cited

U.S. PATENT DOCUMENTS 8,656,787 B2 * 2/2014 Ishihara ................ G01L 9/0075
361/283.4
8,966,996 B2   3/2015 Okada et al.
(Continued)

FOREIGN PATENT DOCUMENTS

CN    1204767 A    1/1999
CN    1982860 A    6/2007
(Continued)

OTHER PUBLICATIONS

International Preliminary Report on Patentability (IPRP) dated Feb. 12, 2019 for Application No. PCT/JP2016/075236.
(Continued)

*Primary Examiner* — Jonathan M Dunlap
(74) *Attorney, Agent, or Firm* — Ladas & Parry LLP

(57) ABSTRACT

A force sensor according to the present invention is configured to detect at least one component among components of a force in each axis direction in an XYZ three-dimensional coordinate system and a moment around each axis, and includes: a support body arranged on an XY plane; a deformation body joined to the support body; and a detection circuit that outputs an electric signal indicating a force applied on the deformation body. The deformation body includes a first deformation portion having a first spring constant and a second deformation portion having a second spring constant different from the first spring constant, and the detection circuit outputs, in response to an applied force, a first electric signal corresponding to the deformation of the first deformation portion and a second electric signal corre-
(Continued)

sponding to the deformation of the second deformation portion and determines whether the force sensor functions normally based on a change of a ratio between the first electric signal and the second electric signal, both corresponding to the applied force.

8 Claims, 28 Drawing Sheets

(51) Int. Cl.
    *G01L 1/22*     (2006.01)
    *G01L 25/00*     (2006.01)
    *G01L 5/166*     (2020.01)
    *G01L 5/161*     (2020.01)
    *G01L 5/165*     (2020.01)
    *G01L 5/162*     (2020.01)

(52) U.S. Cl.
    CPC .......... *G01L 1/2231* (2013.01); *G01L 1/2262* (2013.01); *G01L 5/162* (2013.01); *G01L 25/00* (2013.01)

(56) References Cited

U.S. PATENT DOCUMENTS

| | | | |
|---|---|---|---|
| 2004/0187602 A1 | 9/2004 | Okada | |
| 2012/0017691 A1* | 1/2012 | Ishihara | G01L 9/0042 73/724 |
| 2014/0150559 A1* | 6/2014 | Ishihara | G01L 9/0075 73/718 |
| 2019/0226936 A1* | 7/2019 | Ishihara | G01L 9/0075 |

FOREIGN PATENT DOCUMENTS

| | | |
|---|---|---|
| CN | 103335754 A | 10/2013 |
| JP | 07239283 A | 9/1995 |
| JP | 3444952 B2 | 9/2003 |
| JP | 2004-354049 A | 12/2004 |
| JP | 4963138 B1 | 6/2012 |

OTHER PUBLICATIONS

International Search Report (ISR) and Written Opinion (WO) dated Oct. 11, 2016 for International Application No. PCT/JP2016/075236.
J-PlatPat English translation of JP 3444952 B2.
Japanese Office Action for Japanese Application No. 2016-570130.
Chinese Office Action dated Aug. 2, 2019 for Application No. CN 201680059439.9.
Espacenet English abstract of JP 07239283 A.
Espacenet English abstract of CN 1982860 A.
Espacenet English abstract of CN 103335754 A.
Espacenet English abstract of CN 1204767 A.

* cited by examiner

|     | C11 | C12 | C13 | C14 | C21 | C22 | C23 | C24 |
| --- | --- | --- | --- | --- | --- | --- | --- | --- |
| Fx  | −   | ++  | −   | +   | 0   | 0   | 0   | 0   |
| Fy  | 0   | 0   | 0   | 0   | ++  | −   | +   | −   |
| Fz  | −   | −   | −   | −   | −   | −   | −   | −   |
| Mx  | −   | −   | −   | −   | 0   | 0   | 0   | 0   |
| My  | 0   | 0   | 0   | 0   | ++  | ++  | +   | +   |
| Mz  | ++  | −   | +   | −   | ++  | −   | +   | −   |

|     | C31 | C32 | C33 | C34 | C41 | C42 | C43 | C44 |
| --- | --- | --- | --- | --- | --- | --- | --- | --- |
| Fx  | ++  | −   | +   | −   | 0   | 0   | 0   | 0   |
| Fy  | 0   | 0   | 0   | 0   | −   | ++  | −   | +   |
| Fz  | −   | −   | −   | −   | −   | −   | −   | −   |
| Mx  | ++  | ++  | +   | +   | 0   | 0   | 0   | 0   |
| My  | 0   | 0   | 0   | 0   | −   | −   | −   | −   |
| Mz  | ++  | −   | +   | −   | ++  | −   | +   | −   |

FIG. 15

| | S11 | S12 | S13 | S14 | S21 | S22 | S23 | S24 |
|---|---|---|---|---|---|---|---|---|
| Fx | ++ | − | − | + | 0 | 0 | 0 | 0 |
| Fy | 0 | 0 | 0 | 0 | −− | ++ | + | − |
| Fz | ++ | ++ | − | − | ++ | ++ | − | − |
| Mx | ++ | ++ | + | + | 0 | 0 | 0 | 0 |
| My | 0 | 0 | 0 | 0 | −− | −− | + | + |
| Mz | −− | ++ | + | − | −− | ++ | + | − |

| | S31 | S32 | S33 | S34 | S41 | S42 | S43 | S44 |
|---|---|---|---|---|---|---|---|---|
| Fx | −− | ++ | + | − | 0 | 0 | 0 | 0 |
| Fy | 0 | 0 | 0 | 0 | ++ | −− | − | + |
| Fz | ++ | ++ | − | − | ++ | ++ | − | − |
| Mx | −− | −− | − | − | 0 | 0 | 0 | 0 |
| My | 0 | 0 | 0 | 0 | ++ | ++ | − | − |
| Mz | −− | ++ | + | − | −− | ++ | + | − |

FIG. 24

|    | C1 | C2 | C3 | C4 |
|----|----|----|----|----|
| Fx | −  | ++ | ++ | −  |
| Fy | +  | ++ | −− | −  |
| Fz | −  | −− | −− | −  |
| Mx | −  | −− | ++ | +  |
| My | +  | −− | −− | +  |
| Mz | +  | −− | ++ | −  |

FIG. 41

FORCE SENSOR

RELATED APPLICATION

This application is an application under 35 U.S.C. 371 of International Application No. PCT/JP2016/075236 filed on Aug. 29, 2016, the entire contents of which are incorporated herein by reference.

TECHNICAL FIELD

The present invention relates to a force sensor, and particularly to a sensor having a function of outputting a force applied in a predetermined axis direction and a torque applied around a predetermined rotation axis as electric signals.

BACKGROUND ART

A force sensor, which has a function of outputting a force applied in a predetermined axis direction and a torque applied around a predetermined rotation axis as electric signals, is disclosed in Patent Literature 1, for example, and is widely used for force control of industrial robots. In recent years, such a force sensor has been also employed in life support robots, and there is a demand for high safety. However, a current capacitance type force sensor is provided with a mechanism portion, a capacitance detection portion (force detection portion), and an electronic circuit including a microcomputer, for example, and is likely to malfunction due to condensation, an impact, an overload, or mixing a foreign substance between a pair of parallel flat plates which provide the capacitance. In particular, a force detection portion of the force sensor has flexibility, and thus, metal fatigue is caused by the overload or a repeated load. As a result, a crack or the like may be generated in an elastic body forming the force detection portion, and there is a risk that the elastic body may be eventually broken.

As a simple method of determining whether a force sensor malfunctions, a plurality of the force sensors (for example, three force sensors) described in Cited Document 1, for example, may be arranged in parallel to evaluate a difference between output signals of the respective force sensors. In this method, three output signals are compared two by two, and when a difference between output signals of two force sensors falls within a predetermined range, it is determined that the force sensors normally function. On the other hand, when the difference does not fall within the predetermined range, it is determined that the force sensors do not function normally (malfunction).

CITATION LIST

Patent Literature

Patent Literature 1: JP 2004-354049 A

However, cost increases depending on the number of force sensors in the case of adopting the method of determining whether the force sensor functions normally using the plurality of force sensors. Further, space required to install the force sensors also increases, which is a problem. It is a matter of course that it is possible to determine whether a force sensor functions normally by detaching the force sensor attached to a robot or the like and performing malfunction diagnosis. However, it is troublesome to detach the force sensor that has been once attached, and thus, there is a demand for a force sensor capable of performing the malfunction diagnosis more easily.

The present invention has been made in view of the problems described above. That is, an object of the present invention is to provide a force sensor capable of detecting occurrence of metal fatigue in an elastic body before breakage of the elastic body forming a force detection portion and diagnosing malfunction of the force detection portion.

SUMMARY OF INVENTION

The present invention relates to a force sensor that detects at least one component among components of a force in each axis direction in an XYZ three-dimensional coordinate system and a moment around each axis, the sensor including:

a support body that is arranged on an XY plane;

a deformation body that is joined to the support body; and a detection circuit that outputs an electric signal indicating a force applied on the deformation body, in which the deformation body includes a first deformation portion having a first spring constant and a second deformation portion having a second spring constant different from the first spring constant, and the detection circuit outputs, in response to an applied force, a first electric signal corresponding to the deformation of the first deformation portion and a second electric signal corresponding to the deformation of the second deformation portion and determines whether the force sensor functions normally based on a change of a ratio between the first electric signal and the second electric signal, both corresponding to the applied force.

According to the present invention, the ratio between the first electric signal and the second electric signal changes when metal fatigue occurs in the deformation body forming a force detection portion, and thus, it is possible to provide the force sensor capable of detecting the occurrence of the metal fatigue based on this change and diagnosing malfunction of the deformation body.

In this force sensor, a component applied on the force sensor is preferably detected based on the first electric signal or the second electric signal.

In this case, if an applied component (force) is detected based on the electric signal corresponding to the deformation portion having a relatively large spring constant, it is possible to detect the component with little influence of metal fatigue. On the other hand, if an applied component (force) is detected based on the electric signal corresponding to the deformation portion having a relatively small spring constant, it is possible to perform measurement with an excellent S/N ratio since the sensitivity to the applied component is relatively high.

In the force sensor described above, the detection circuit can detect a component applied on the force sensor using various means. As an example, the detection circuit may detect an applied component using a change of capacitance.

Alternatively, the detection circuit may detect an applied component using a change of an electric resistance value.

Alternatively, the detection circuit may detect an applied component using a light emitting element and a light receiving element.

As specific aspects of the invention described above, the following aspects can be assumed.

According to a (1-1) invention, the present invention is a uniaxial force sensor that detects a force in a Z axis direction in an XYZ three-dimensional coordinate system, the sensor including:

a support body that is arranged on an XY plane;

a deformation body that is arranged to oppose the support body and has a deformation portion elastically deformable by action of the force to be detected;

a fixed electrode that is arranged to the support body;

a displacement electrode that is provided to the deformation portion of the deformation body so as to oppose the fixed electrode and that forms a capacitive element with the fixed electrode; and a detection circuit that outputs an electric signal, in a state where a load is applied on one of the deformation body and the support body, indicating a force applied on the other body thereof based on a variation amount of a capacitance value of the capacitive element, in which the deformation portion includes an inner deformation portion including the Z axis as viewed from the Z axis direction and having a first spring constant and an outer deformation portion positioned at an outer side of the inner deformation portion and having a second spring constant different from the first spring constant, the capacitive element includes a first capacitive element arranged at a position corresponding to the inner deformation portion and a second capacitive element arranged at a position corresponding to the outer deformation portion, and the detection circuit outputs, in response to the applied force, a first electric signal corresponding to a capacitance value of the first capacitive element and a second electric signal corresponding to a capacitance value of the second capacitive element and determines whether the force sensor functions normally based on a change of a ratio between the first electric signal and the second electric signal, both corresponding to the applied force.

According to a (1-2) invention, the second capacitive element is arranged so as to surround the first capacitive element.

According to a (1-3) invention, the first capacitive element has a disc shape as viewed from the Z axis direction, and the second capacitive element has an annular shape as viewed from the Z axis direction.

In these cases, each capacitive element has a symmetric shape, and thus, it is easy to perform the processing for measurement of the force to be detected based on the variation of the capacitance value of each capacitive element.

According to a (1-4) invention, the respective displacement electrodes of the first and second capacitive elements are configured using a common electrode, or the respective fixed electrodes of the first and second capacitive elements are configured using a common electrode in the above-described force sensor.

According to a (1-5) invention, the area of one of the displacement electrode and the fixed electrode of each of the first and second capacitive elements is set to be larger than the area of the other electrode such that each effective opposing area of each pair of electrodes forming the first and second capacitive elements does not change even when a relative position of the displacement electrode with respect to the fixed electrode changes as a result of action of the force in the Z axis direction.

According to a (2-1) invention, the present invention is a force sensor that detects forces in a Z axis direction and an X axis direction in an XYZ three-dimensional coordinate system, the sensor including:

a support body that is arranged on an XY plane;

a deformation body that is arranged to oppose the support body and has a deformation portion elastically deformable by action of the force to be detected;

a fixed electrode that is arranged on the support body;

a displacement electrode that is provided in the deformation portion of the deformation body so as to oppose the fixed electrode and that forms a capacitive element with the fixed electrode; and a detection circuit that outputs an electric signal, in a state where a load is applied on one of the deformation body and the support body, indicating a force applied on the other body thereof based on a variation amount of a capacitance value of the capacitive element, in which the deformation portion includes an inner deformation portion including the Z axis as viewed from the Z axis direction and having a first spring constant and an outer deformation portion positioned at an outer side of the inner deformation portion and having a second spring constant different from the first spring constant, as viewed from the Z axis direction, the capacitive element includes a first capacitive element on a negative X axis side and a second capacitive element on a positive X axis side, which are arranged at a position corresponding to the inner deformation portion with a Y axis interposed therebetween, and a third capacitive element arranged in the vicinity of the first capacitive element and a fourth capacitive element arranged in the vicinity of the second capacitive element, at a position corresponding to the outer deformation portion, and the detection circuit outputs, in response to the force applied in the X axis direction, a first electric signal corresponding to a "difference between a capacitance value of the first capacitive element and a capacitance value of the second capacitive element" and a second electric signal corresponding to a "difference between a capacitance value of the third capacitive element and a capacitance value of the fourth capacitive element" and determines whether the force sensor functions normally based on a change of a ratio between the first electric signal and the second electric signal, both corresponding to the force applied in the X axis direction According to a (2-2) invention, it is also possible to diagnose malfunction of the deformation body based on the electric signal corresponding to the force applied in the Z axis direction. That is, the present invention is a force sensor that detects forces in a Z axis direction and an X axis direction in an XYZ three-dimensional coordinate system, the sensor including:

a support body that is arranged on an XY plane;

a deformation body that is arranged to oppose the support body and has a deformation portion elastically deformable by action of the force to be detected;

a fixed electrode that is arranged on the support body;

a displacement electrode that is provided in the deformation portion of the deformation body so as to oppose the fixed electrode and that forms a capacitive element with the fixed electrode; and a detection circuit that outputs an electric signal, in a state where a load is applied on one of the deformation body and the support body, indicating a force applied on the other body thereof based on a variation amount of a capacitance value of the capacitive element, in which the deformation portion includes an inner deformation portion including the Z axis as viewed from the Z axis direction and having a first spring constant and an outer deformation portion positioned at an outer side of the inner deformation portion and having a second spring constant different from the first spring constant, as viewed from the Z axis direction, the capacitive element includes a first capacitive element on a negative X axis side and a second capacitive element on a positive X axis side, which are arranged at a position corresponding to the inner deformation portion with a Y axis interposed therebetween, and a third capacitive element arranged in the vicinity of the first capacitive element and a fourth capacitive element arranged in the vicinity of the second capacitive element, at a position corresponding to the outer deformation portion, each of the first and second capacitive elements is arranged at the position corresponding to the inner deformation portion, each of the third and fourth capacitive elements is arranged at the position corresponding to the outer deformation portion, and the detection circuit outputs, in response to the force applied in the Z axis direction, a first electric signal corresponding to a "sum of a capacitance value of the first capacitive element and a capacitance value of the second capacitive element" and a second electric signal corresponding to a "sum of a capacitance value of the third capacitive element and each capacitance value of the fourth capacitive element" and determines whether the force sensor functions normally based on a change of a ratio between the first electric signal and the second electric signal, both corresponding to the force applied in the Z axis direction According to the present invention, the ratio between the first electric signal and the second electric signal also changes when metal fatigue occurs in the deformation body forming a force detection portion, and thus, it is possible to provide the force sensor capable of detecting the occurrence of the metal fatigue based on this change and diagnosing malfunction of the deformation body.

According to a (2-3) invention, the third capacitive element is arranged on the negative X axis side with regard to the first capacitive element, and the fourth capacitive element is arranged on the positive X axis side with regard to the second capacitive element.

According to a (2-4) invention, the first capacitive element has a semicircular shape having a chord extending in parallel to the Y axis as a diameter in which an arc is formed on the negative X axis side with regard to the chord as viewed from the Z axis direction, the second capacitive element has a semicircular shape having a chord extending in parallel to the Y axis as a diameter in which an arc is formed on the positive X axis side with regard to the chord as viewed from the Z axis direction, the third capacitive element has a semicircular-ring shape that surrounds the arc of the first capacitive element as viewed from the Z axis direction, and the fourth capacitive element has a semicircular-ring shape that surrounds the arc of the second capacitive element as viewed from the Z axis direction.

In these cases, each capacitive element has a symmetric shape, and thus, it is easy to perform the processing for measurement of the force to be detected based on the variation of the capacitance value of each capacitive element.

According to a (2-5) invention, the area of one of the displacement electrode and the fixed electrode of each of the first to fourth capacitive elements is set to be larger than the area of the other electrode such that each effective opposing area of each pair of electrodes forming the first to fourth capacitive elements does not change even when a relative position of the displacement electrode with respect to the fixed electrode changes as a result of action of the force in the X axis direction and/or the Z axis direction.

According to a (2-6) invention, at least two of the respective fixed electrodes of the first to fourth capacitive elements are configured using a common electrode, or at least two of the respective displacement electrodes of the first to fourth capacitive elements are configured using a common electrode.

According to a (2-7) invention, a component applied on the force sensor is detected based on the first electric signal or the second electric signal. The present invention can be also applicable to the (1-1) to (1-5) inventions.

According to a (3-1) invention, the present invention is a force sensor that detects a force in each axis direction in an XYZ three-dimensional coordinate system and a moment around each axis, that is, the six-axis force sensor, the sensor including:

a support body that is arranged on an XY plane;

a first deformation body that is arranged to oppose the support body and includes four first deformation portions and elastically deformable by action of the force or the moment to be detected;

fixed electrodes that are arranged on the support body corresponding to the four first deformation portions;

displacement electrodes that are provided in the four first deformation portions, respectively, so as to oppose the fixed electrodes and form four sets of capacitive elements with the fixed electrodes;

a second deformation body that opposes the first deformation body on a side opposite to the support body with respect to the first deformation body and includes four second deformation portions arranged so as to oppose the four first deformation portions, respectively;

connection members each of which connects each of the first deformation portions and each of the second deformation portions corresponding to the first deformation portions; and a detection circuit that outputs an electric signal, in a state where a load is applied on one of the second deformation body and the support body, indicating the force or the moment applied on the other body thereof based on a variation amount of each capacitance value of the four sets of capacitive elements, in which each of the first deformation portions includes an inner deformation portion connected to the connection member of the first deformation portion and having a first spring constant, and an outer deformation portion positioned at an outer side of the inner deformation portion and having a second spring constant different from the first spring constant, a first set of capacitive elements among the four sets of capacitive elements includes a first capacitive element on a negative X axis side and a second capacitive element on a positive X axis side, which are arranged on a positive Y axis side with the Y axis interposed therebetween, and a third capacitive element arranged in the vicinity of the first capacitive element and a fourth capacitive element arranged in the vicinity of the second capacitive element, as viewed from a Z axis direction, a second set of capacitive elements among the four sets of capacitive elements includes a fifth capacitive element on the positive Y axis side and a sixth capacitive element on a negative Y axis side, which are arranged on a positive X axis side with the X axis interposed therebetween, and a seventh capacitive element arranged in the vicinity of the fifth capacitive element and an eighth capacitive element arranged in the vicinity of the sixth capacitive element, as viewed from the Z axis direction, a third set of the capacitive elements among the four sets of capacitive elements includes a ninth capacitive element on the positive X axis side and a tenth capacitive element on the negative X axis side, which are arranged on a negative Y axis side with the Y axis interposed therebetween, and an eleventh capacitive element arranged in the vicinity of the ninth capacitive element and a twelfth capacitive element arranged in the vicinity of the tenth capacitive element, as viewed from the Z axis direction, a fourth set of capacitive elements among the four sets of capacitive elements includes a thirteenth capacitive element on the negative Y axis side and a fourteenth capacitive element on the positive Y axis side, which are arranged on a negative X axis side with the X axis interposed therebetween, and a fifteenth capacitive element arranged in the vicinity of the thirteenth capacitive element and a sixteenth capacitive element arranged in the vicinity of the fourteenth capacitive element, as viewed from the Z axis direction, the first, second, fifth, sixth, ninth, tenth, thirteenth, and fourteenth capacitive elements are arranged, respectively, at positions corresponding to the inner deformation portions of the respective first deformation portions, the third, fourth, seventh, eighth, eleventh, twelfth, fifteenth, and sixteenth capacitive elements are arranged, respectively, at positions corresponding to the outer deformation portions of the respective first deformation portions, and the detection circuit outputs six first electric signals in total for the four first deformation portions, which correspond to the forces in the respective axis directions in the XYZ three-dimensional coordinate system and the moments around the respective axes based on the "variation amount of each capacitance value of the first, second, fifth, sixth, ninth, tenth, thirteenth, and fourteenth capacitive elements", outputs six second electric signals in total for the four first deformation portions, which correspond to the forces in the respective axis directions in the XYZ three-dimensional coordinate system and the moments around the respective axes based on the "variation amount of each capacitance value of the third, fourth, seventh, eighth, eleventh, twelfth, fifteenth and sixteenth capacitive elements", and determines whether the force sensor functions normally based on a change of a ratio between the first electric signal and the second electric signal of at least one of the forces in the respective axis directions in the XYZ three-dimensional coordinate system and the moments around the respective axes.

According to a (3-2) invention, the detection circuit detects the forces and moments in the respective axis directions applied on the force sensor based on the first electric signal or the second electric signal.

According to a (3-3) invention, the third capacitive element is arranged on the negative X axis side with regard to the first capacitive element, the fourth capacitive element is arranged on the positive X axis side with regard to the second capacitive element, the seventh capacitive element is arranged on the positive Y axis side with regard to the fifth capacitive element, the eighth capacitive element is arranged on the negative Y axis side with regard to the sixth capacitive element, the eleventh capacitive element is arranged on the positive X axis side with regard to the ninth capacitive element, the twelfth capacitive element is arranged on the negative X axis side with regard to the tenth capacitive element, the fifteenth capacitive element is arranged on the negative Y axis side with regard to the thirteenth capacitive element, and the sixteenth capacitive element is arranged on the positive Y axis side with regard to the fourteenth capacitive element.

According to a (3-4) invention, the first capacitive element has a semicircular shape having a chord extending in parallel to the Y axis as a diameter in which an arc is formed on the positive X axis side with regard to the chord as viewed from the Z axis direction, the second capacitive element has a semicircular shape having a chord extending in parallel to the Y axis as a diameter in which an arc is formed on the negative X axis side with regard to the chord as viewed from the Z axis direction, the third capacitive element has a semicircular-ring shape that surrounds the arc of the first capacitive element as viewed from the Z axis direction, the fourth capacitive element is a semicircular-ring electrode that surrounds the arc of the second capacitive element as viewed from the Z axis direction, the fifth capacitive element has a semicircular shape having a chord extending in parallel to the X axis as a diameter in which an arc is formed on the positive Y axis side with regard to the chord as viewed from the Z axis direction, the sixth capacitive element has a semicircular shape having a chord extending in parallel to the X axis as a diameter in which an arc is formed on the negative Y axis side with regard to the chord as viewed from the Z axis direction, the seventh capacitive element has a semicircular-ring shape that surrounds the arc of the fifth capacitive element as viewed from the Z axis direction, the eighth capacitive element has a semicircular-ring shape that surrounds the arc of the sixth capacitive element as viewed from the Z axis direction, the ninth capacitive element has a semicircular shape having a chord extending in parallel to the Y axis as a diameter in which an arc is formed on the negative X axis side with regard to the chord as viewed from the Z axis direction, the tenth capacitive element has a semicircular shape having a chord extending in parallel to the Y axis as a diameter in which an arc is formed on the positive X axis side with regard to the chord as viewed from the Z axis direction, the eleventh capacitive element has a semicircular-ring shape that surrounds the arc of the ninth capacitive element as viewed from the Z axis direction, the twelfth capacitive element has a semicircular-ring shape that surrounds the arc of the tenth capacitive element as viewed from the Z axis direction, the thirteenth capacitive element has a semicircular shape having a chord extending in parallel to the X axis as a diameter in which an arc is formed on the negative Y axis side with regard to the chord as viewed from the Z axis direction, the fourteenth capacitive element has a semicircular shape having a chord extending in parallel to the X axis as a diameter in which an arc is formed on the positive Y axis side with regard to the chord as viewed from the Z axis direction, the fifteenth capacitive element has a semicircular-ring shape that surrounds the arc of the thirteenth capacitive element as viewed from the Z axis direction, and the sixteenth capacitive element has a semicircular-ring shape that surrounds the arc of the fourteenth capacitive element as viewed from the Z axis direction.

In this case, each capacitive element has a symmetric shape, and thus, it is easy to perform the processing for measurement of the force to be detected based on the variation of the capacitance value of each capacitive element.

According to a (3-5) invention, the area of one of the displacement electrode and the fixed electrode of each of the first to sixteenth capacitive elements is set to be larger than the area of the other electrode such that each effective opposing area of each pair of electrodes forming the first to sixteenth capacitive elements does not change even when a relative position of the displacement electrode with respect to the fixed electrode changes as a result of action of the forces in the respective axis directions in the XYZ three-dimensional coordinate system and the moments around the respective axes.

According to a (3-6) invention, at least two of the respective fixed electrodes of the first to sixteenth capacitive elements are configured using a common electrode, or at least two of the respective displacement electrodes of the first to sixteenth capacitive elements are configured using a common electrode.

According to a (3-7) invention, the four sets of capacitive elements are arranged to be equidistant from an origin as viewed from the Z axis direction. In this case, the respective sets of capacitive elements are symmetrically arranged, and thus, it is easier to perform the processing for measurement of the force to be detected based on the variation of the capacitance value of each capacitive element.

According to a (3-8) invention, the detection circuit includes a storage unit that stores the ratio between the first electric signal and the second electric signal in a state where the force sensor normally functions as a reference ratio, and determines whether the force sensor functions normally by determining whether a "difference between the ratio between the first electric signal and the second electric signal and the reference ratio" falls within a predetermined range.

In this case, it is possible to reliably perform the malfunction determination of the deformation body, that is, the malfunction determination of the force sensor based on the reference ratio set in advance. This configuration can also be applicable to the (1-1) to (2-7) inventions.

According to a (4-1) invention, the present invention is a force sensor that detects a force in a Z axis direction in an XYZ three-dimensional coordinate system, the sensor including:

a deformation body that includes a deformation portion elastically deformable by action of a force to be detected;

a strain measurement device that is arranged on a surface of the deformation body and measures strain generated in the deformation body by the elastic deformation; and a detection circuit that outputs an electric signal indicating a force applied on the deformation body based on a measurement result of the strain measurement device, in which as viewed from the Z axis direction, the deformation portion includes an inner deformation portion including the Z axis and having a first spring constant and an outer deformation portion having a second spring constant different from the first spring constant, the strain measurement device measures strain of a first measurement portion provided in the inner deformation portion and strain of a second measurement portion provided in the outer deformation portion, and the detection circuit outputs, in response to the applied force, a first electric signal corresponding to a measurement value of the first measurement portion and a second electric signal corresponding to a measurement value of the second measurement portion and determines whether the force sensor functions normally based on a change of a ratio between the first electric signal and the second electric signal, both corresponding to the applied force.

According to a (4-2) invention, the present invention is a force sensor that detects forces in a Z axis direction and an X axis direction in an XYZ three-dimensional coordinate system, the sensor including:

a deformation body that includes a deformation portion elastically deformable by action of a force to be detected;

a strain measurement device that is arranged on a surface of the deformation body and measures strain generated in the deformation body by the elastic deformation; and a detection circuit that outputs an electric signal indicating a force applied on the deformation body based on a measurement result of the strain measurement device, in which as viewed from the Z axis direction, the deformation portion includes an inner deformation portion including the Z axis and having a first spring constant and an outer deformation portion arranged at an outer side of the inner deformation portion and having a second spring constant different from the first spring constant, the strain measurement device measures strain of a first measurement portion provided in the inner deformation portion on a positive X axis, strain of a second measurement portion provided in the inner deformation portion on a negative X axis, strain of a third measurement portion provided in the outer deformation portion on the positive X axis, and strain of a fourth measurement portion provided in the outer deformation portion on the negative X axis, and the detection circuit outputs, in response to the applied force in the X axis direction, a first electric signal corresponding to a "difference between a measurement value of the first measurement portion and a measurement value of the second measurement portion" and a second electric signal corresponding to a "difference between a measurement value of the third measurement portion and a measurement value of the fourth measurement portion" and determines whether the force sensor functions normally based on a change of a ratio between the first electric signal and the second electric signal, both corresponding to the applied force in the X axis direction.

According to a (4-3) invention, the present invention is a force sensor that detects forces in a Z axis direction and an X axis direction in an XYZ three-dimensional coordinate system, the sensor including:

a deformation body that includes a deformation portion elastically deformable by action of a force to be detected;

a strain measurement device that is arranged on a surface of the deformation body and measures strain generated in the deformation body by the elastic deformation; and a detection circuit that outputs an electric signal indicating a force applied on the deformation body based on a measurement result of the strain measurement device, in which as viewed from the Z axis direction, the deformation portion includes an inner deformation portion including the Z axis and having a first spring constant and an outer deformation portion arranged at an outer side of the inner deformation portion and having a second spring constant different from the first spring constant, the strain measurement device measures strain of a first measurement portion provided in the inner deformation portion on a positive X axis, strain of a second measurement portion provided in the inner deformation portion on a negative X axis, strain of a third measurement portion provided in the outer deformation portion on the positive X axis, and strain of a fourth measurement portion provided in the outer deformation portion on the negative X axis, and the detection circuit outputs, in response to the applied force in the Z axis direction, a first electric signal corresponding to a "sum of a measurement value of the first measurement portion and a measurement value of the second measurement portion" and a second electric signal corresponding to a "sum of a measurement value of the third measurement portion and a measurement value of the fourth measurement portion" and determines whether the force sensor functions normally based on a change of a ratio between the first electric signal and the second electric signal, both corresponding to the applied force in the Z axis direction.

According to a (4-4) invention, the applied force is measured based on the measurement values of the measurement portion provided in the deformation portion having a relatively large spring constant between the inner deformation portion and the outer deformation portion.

According to a (4-5) invention, the detection circuit includes a storage unit that stores a "ratio between the first electric signal and the second electric signal in a state where the force sensor normally functions" as a reference ratio, and determines whether the force sensor functions normally by determining whether a "difference between the ratio between the first electric signal and the second electric signal and the reference ratio" falls within a predetermined range.

According to a (4-6) invention, the present invention is a six-axis force sensor that detects a force in each axis direction in an XYZ three-dimensional coordinate system and a moment around each axis, the sensor including:

a first deformation body that includes four first deformation portions elastically deforamble by action of the force or the moment to be detected;

a strain measurement device that is arranged on a surface of the first deformation body and is configured to measure strain generated in the four first deformation portions by the elastic deformation;

a second deformation body having four second deformation portions arranged so as to oppose the four first deformation portions, respectively;

a connection member that connects each of the first deformation portions and the second deformation portions corresponding to the first deformation portion; and a detection circuit that outputs an electric signal, in a state where a load is applied to one of the first deformation body and the second deformation body, indicating the force or the moment applied to the other body based on the measurement result of the strain measurement device, in which each of the first deformation portions includes an inner deformation portion connected to the connection member of the first deformation portion and having a first spring constant and an outer deformation portion having a second spring constant different from the first spring constant, the strain measurement device detects strain of first and second measurement portions provided along an X axis direction with the connection member interposed therebetween in the inner deformation portion, strain of third and fourth measurement portions provided along a Y direction with the connection member interposed therebetween in the inner deformation portion, strain of fifth and sixth measurement portions provided along the X axis direction with the connection member interposed therebetween in the outer deformation portion, and strain of seventh and eighth measurement portions provided along the Y axis direction with the connection member interposed therebetween in the outer deformation portion, in each of the first deformation portions, and the detection circuit outputs six first electric signals in total for the four first deformation portions corresponding to the forces in the respective axis directions and the moments around the respective axes in the XYZ three-dimensional coordinate system based on measurement values of the first to fourth measurement portions arranged in the inner deformation portion of each of the first deformation portions, outputs six second electric signals in total for the four first deformation portions corresponding to the forces in the respective axis directions and the moments around the respective axes in the XYZ three-dimensional coordinate system based on measurement values of the respective four fifth to eighth measurement portions arranged in the outer deformation portion of each of the first deformation portions, and determines whether the force sensor functions normally based on a change of a ratio between the first electric signal and the second electric signal for at least one of the forces in the respective axis directions and the moments around the respective axes in the XYZ three-dimensional coordinate system.

According to a (4-7) invention, a component applied on the force sensor is detected based on the first electric signal or the second electric signal.

According to a (4-8) invention, the detection circuit includes a storage unit that stores a "ratio between the first electric signal and the second electric signal in a state where the force sensor normally functions" as a reference ratio for at least one of the forces in the respective axis directions and the moments around the respective axes, and determines whether the force sensor functions normally by determining whether a "difference between the ratio between the first electric signal and the second electric signal for at least one of the forces in the respective axis directions and the moments around the respective axes and the reference ratio" falls within a predetermined range.

According to a (4-9) invention, the strain measurement device includes a strain gauge provided in response to each of the measurement portions.

According to a (4-10) invention, the strain measurement device includes an optical interference type measurement device having a light emitting element and a light receiving element.

According to a (4-11) invention, the inner deformation portion is one inner beam extending in the X axis direction, and the outer deformation portion is an outer beam extending in the X axis direction from both ends of the inner beam.

According to a (4-12) invention, the inner deformation portion is two inner beams extending in the X axis direction and the Y axis direction, respectively, and the outer deformation portion is outer beams extending in the X axis direction and the Y axis direction, respectively, from both ends of each of the two inner beams.

According to a (4-13) invention, the inner deformation portion is a disc-shaped inner diaphragm, and the outer deformation portion is an annular-shaped outer diaphragm that surrounds an outer periphery of the inner diaphragm.

According to a (4-14) invention, the first spring constant is smaller than the second spring constant.

According to a (4-15) invention, the first spring constant is larger than the second spring constant.

According to a (4-16) invention, the inner deformation portion and the outer deformation portion have different thicknesses in the Z axis direction, and thus, have different spring constants.

Incidentally, the (4-13) to (4-16) inventions can also be applicable to the (1-1) to (3-8) inventions.

According to a (4-17) invention, one of the inner deformation portion and the outer deformation portion is provided with a slit, and thus, the inner deformation portion and the outer deformation portion have different spring constants.

According to a (4-18) invention, the inner beam and the outer beam have different thicknesses in a width direction as viewed from the Z axis direction, and thus, have different spring constants.

According to a (5-1) invention, the present invention is a force sensor that detects a force in each axis direction in an XYZ three-dimensional coordinate system and a torque around each axis, the sensor including:

an annular deformation body that is made of a material elastically deformable by action of the force or the torque to be detected and has a through opening portion through which the Z axis passes;

a first support body that is connected to the annular deformation body at two first portions where the annular deformation body intersects an XZ plane;

a second support body that is connected to the annular deformation body at two second portions where the annular deformation body includes the Z axis and intersects a plane different from the XZ plane, and is rotatable around the Z axis with respect to the first support body;

a displacement electrode that is arranged at a predetermined position of the annular deformation body and causes displacement by elastic deformation of the annular deformation body;

a fixed electrode that is arranged at a position opposing the displacement electrode in the first support body; and a detection circuit that outputs an electric signal, in a state where a load is applied to one of the first support body and the second support body, indicating the force in each axis direction and the torque around each axis applied on the other support body based on a variation amount of a capacitance value of a capacitive element configured using the displacement electrode and the fixed electrode, in which the annular deformation body includes first to fourth detection portions positioned at fourth detection points defined on the annular deformation body, and a connection portion connected to both ends of the first to fourth detection portions, the first detection portion and the fourth detection portion are arranged to be symmetric with respect to an X axis on a positive X axis side, the second detection portion and the third detection portion are arranged to be symmetric with respect to an X axis on a negative X axis side, each of the first to fourth detection portions includes a first deformation portion causing elastic deformation by action of the force or the torque to be detected, a second deformation portion causing elastic deformation by action of the force or the torque to be detected, and a displacement portion causing displacement by the elastic deformation of the first deformation portion and the second deformation portion, an outer end of the first deformation portion in a circumferential direction is connected to the connection portion adjacent thereto, an inner end of the first deformation portion in the circumferential direction is connected to the displacement portion, an outer end of the second deformation portion in the circumferential direction is connected to the connection portion adjacent thereto, an inner end of the second deformation portion in the circumferential direction is connected to the displacement portion, the first and second deformation portions of the first and fourth detection portions have a first spring constant, the first and second deformation portions of the second and third detection portions have a second spring constant different from the first spring constant, the capacitive element includes a first capacitive element, a second capacitive element, a third capacitive element, and a fourth capacitive element, each of the capacitive elements is configured of the displacement electrode and the fixed electrode which are arranged at positions, respectively, corresponding to the displacement portions of the first to fourth detection portions, and the detection circuit outputs a "difference between a first electric signal corresponding to a sum of a capacitance value of the first capacitive element and a capacitance value of the fourth capacitive element and a second electric signal corresponding to a sum of a capacitance value of the second capacitive element and a capacitance value of the third capacitive element, as an electric signal indicating the applied force in the X axis direction, and determines whether the force sensor functions normally based on a "ratio between the first electric signal and the second electric signal" or a "ratio between an electric signal corresponding to the capacitance value of the first capacitive element or the fourth capacitive element and an electric signal corresponding to the capacitance value of the second capacitive element or the third capacitive element".

According to a (5-2) invention, the detection circuit includes a storage unit that stores a "ratio between the first electric signal and the second electric signal" in a state where the force sensor normally functions or the "ratio between an electric signal corresponding to the capacitance value of the first capacitive element or the fourth capacitive element and an electric signal corresponding to the capacitance value of the second capacitive element or the third capacitive element", as a reference ratio, and determines whether the force sensor functions normally by determining whether a difference between the "ratio between the first electric signal and the second electric signal" or the "ratio between an electric signal corresponding to the capacitance value of the first capacitive element or the fourth capacitive element and an electric signal corresponding to the capacitance value of the second capacitive element or the third capacitive element" and the reference ratio falls within a predetermined range.

According to a (5-3) invention, when a V axis and a W axis passing through an origin O and forming an angle of 45° with respect to the X axis and the Y axis, respectively, are defined on the XY plane, the first detection portion is arranged on a positive V axis, the second detection portion is arranged on a positive W axis, the third detection portion is arranged on a negative V axis, and the fourth detection portion is arranged on a negative W axis, as viewed from the Z axis direction.

According to a (5-4) invention, the present invention is a force sensor that detects a force in each axis direction in an XYZ three-dimensional coordinate system and a torque around each axis, the sensor including:

an annular deformation body that is made of a material elastically deformable by action of the force or the torque to be detected and has a through opening portion through which the Z axis passes;

a first support body that is connected to the annular deformation body at two first portions where the annular deformation body intersects an XZ plane;

a second support body that is connected to the annular deformation body at two second portions where the annular deformation body includes the Z axis and intersects a plane different from the XZ plane, and is rotatable around the Z axis with respect to the first support body;

a displacement electrode that is arranged at a predetermined position of the annular deformation body and causes displacement by elastic deformation of the annular deformation body;

a fixed electrode that is arranged at a position opposing the displacement electrode in the first support body; and a detection circuit that outputs an electric signal, in a state where a load is applied to one of the first support body and the second support body, indicating the force in each axis direction and the torque around each axis applied on the other support body based on a variation amount of a capacitance value of a capacitive element configured using the displacement electrode and the fixed electrode, in which the annular deformation body includes first to fourth detection portions positioned at fourth detection points defined on the annular deformation body, and a connection portion connected to both ends of the first to fourth detection portions, each of the first to fourth detection portions includes a first deformation portion causing elastic deformation by action of the force or the torque to be detected, a second deformation portion causing elastic deformation by action of the force or the torque to be detected, and a displacement portion causing displacement by the elastic deformation of the first deformation portion and the second deformation portion, an outer end of the first deformation portion in a circumferential direction is connected to the connection portion adjacent thereto, an inner end of the first deformation portion in the circumferential direction is connected to the displacement portion, an outer end of the second deformation portion in the circumferential direction is connected to the connection portion adjacent thereto, an inner end of the second deformation portion in the circumferential direction is connected to the displacement portion, the first and second deformation portions of the first and second detection portions have a first spring constant, the first and second deformation portions of the third and fourth detection portions have a second spring constant different from the first spring constant, the capacitive element includes a first capacitive element, a second capacitive element, a third capacitive element, and a fourth capacitive element, each of the capacitive elements is configured of the displacement electrode and the fixed electrode which are arranged at positions, respectively, corresponding to the displacement portions of the first to fourth detection portions, and the detection circuit outputs a first electric signal corresponding to a "sum of a capacitance value of the first capacitive element and a capacitance value of the second capacitive element" and a second electric signal corresponding to a "sum of a capacitance value of the third capacitive element and a capacitance value of the fourth capacitive element", as an electric signal indicating the applied force in the Z axis direction, and determines whether the force sensor functions normally based on a change of a ratio between the first electric signal and the second electric signal.

According to a (5-5) invention, the detection circuit includes a storage unit that stores a "ratio between the first electric signal and the second electric signal when the force in the Z axis direction is applied in a state where the force sensor normally functions" as a reference ratio, and determines whether the force sensor functions normally by determining whether a "difference between the ratio between the first electric signal and the second electric signal and the reference ratio" falls within a predetermined range.

According to a (5-6) invention, the first to fourth detection portions are arranged on the annular deformation body at equal intervals along a circumferential direction of the annular deformation body. In this case, each of the detection portions is arranged to be symmetric with respect to the origin, and thus, it is easy to perform calculation for detection of the force or moment applied on the force sensor.

According to a (5-7) invention, the area of one of the displacement electrode and the fixed electrode of each of the first to fourth capacitive elements is set to be larger than the area of the other electrode such that each effective opposing area of each pair of electrodes forming the first to fourth capacitive elements does not change even when a relative position of the displacement electrode with respect to the fixed electrode changes as a result of action of the forces in the respective axis directions in the XYZ three-dimensional coordinate system and the torques around the respective axes.

According to a (5-8) invention, at least two of the first to fourth fixed electrodes are configured using a common electrode, or at least two of the first to fourth displacement electrodes are configured using a common electrode.

According to a (5-9) invention, the first spring constant is smaller than the second spring constant.

According to a (5-10) invention, the first spring constant is larger than the second spring constant.

BRIEF DESCRIPTION OF DRAWINGS

FIG. 15 is a table illustrating a list of changes of capacitance values generated in capacitive elements when forces in the positive direction of each axis of X, Y and Z and positive moments around the respective axes are applied on the force sensor of FIG. 9.

FIG. 24 is a table illustrating a list of trends of measurement values of each strain gauge when a force or a moment in the positive direction is applied on the force sensor of FIG. 22.

FIG. 41 is a table illustrating a variation amount (a degree of an increase or a decrease) of a capacitance value of each capacitive element when a force in each axis direction or a moment around each axis is applied on a force receiving body of a force sensor in which the detection ring of FIG. 40 is employed.

DESCRIPTION OF EMBODIMENTS

§ 1. Example of Uniaxial Force Sensor

Figure 1:
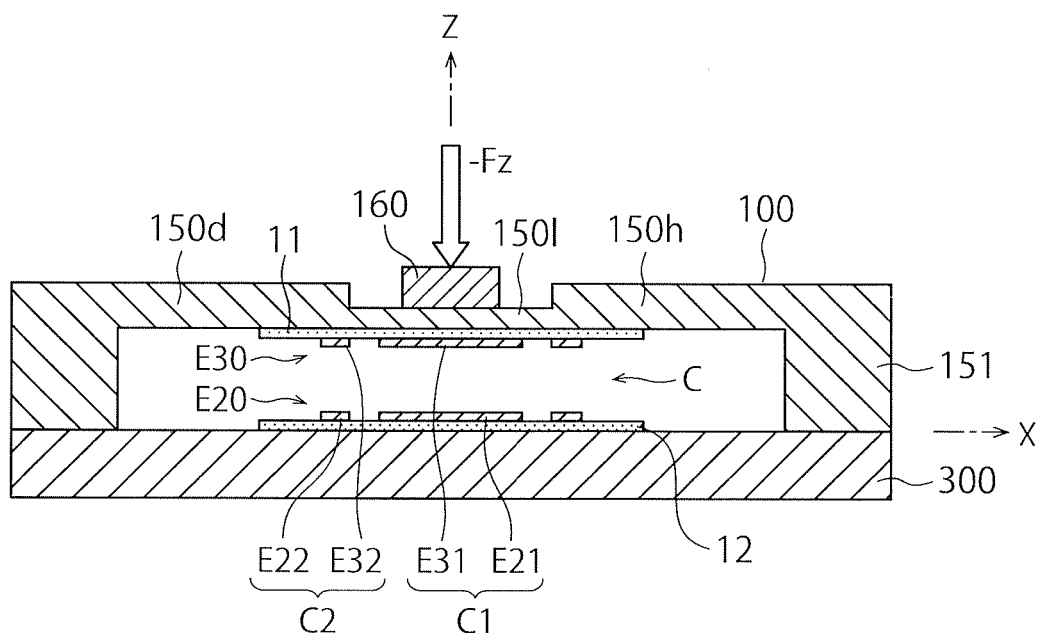
FIG. 1 is a schematic cross-sectional view illustrating a uniaxial force sensor according to an embodiment of the present invention.
Figure 2:
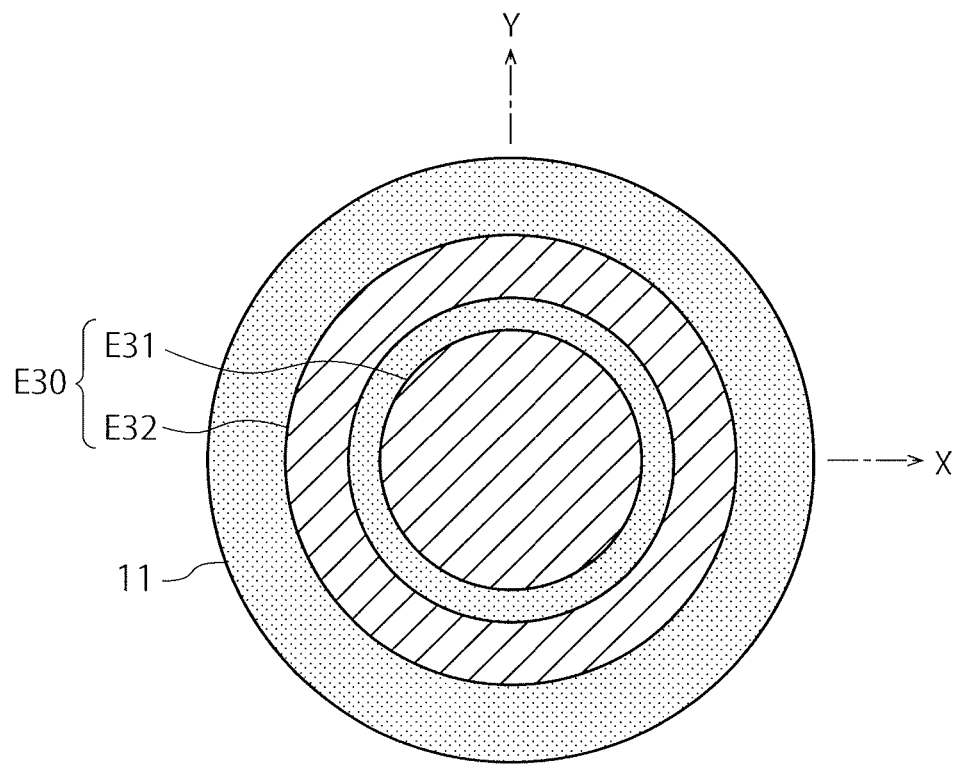
FIG. 2 is a schematic plan view illustrating a displacement electrode of the force sensor of FIG. 1.

A force sensor according to a first embodiment of the present invention will be described with reference to the accompanying drawings. FIG. 1 is a schematic cross-sectional view illustrating a uniaxial force sensor according to the first embodiment of the present invention, and FIG. 2 is a schematic plan view illustrating a displacement electrode E30 of the force sensor of FIG. 1.

As illustrated in FIG. 1, the force sensor according to the present embodiment is a force sensor that detects a force Fz in a Z axis direction (a vertical direction in FIG. 1) in an XYZ three-dimensional coordinate system. The force sensor according to the present embodiment includes: a planar support body 300 arranged on an XY plane; a deformation body 100 which is arranged to oppose the support body 300 and includes a diaphragm 150d serving as a deformation portion elastically deformable by action of the force Fz to be detected; a fixed electrode E20 arranged on an upper surface of the support body 300 with a lower substrate 12 interposed therebetween; and a displacement electrode E30 which is provided in the diaphragm 150d so as to oppose the fixed electrode E20 with an upper substrate 11 interposed therebetween and forms a capacitive element C with the fixed electrode E20. Here, it is assumed that the upper surface of the support body 300 is arranged to match with the XY plane for convenience of description.

In the present embodiment, a force receiving body 160 that receives the force Fz to be detected is provided on the upper surface (a surface on the upper side in FIG. 1) of the diaphragm 150d such that the force Fz is transmitted to the diaphragm 150d via the force receiving body 160 as illustrated in FIG. 1. In addition, a connection portion 151 extending downward is formed at a peripheral portion of the diaphragm 150d, and a lower end of the connection portion 151 is connected to the upper surface of the support body 300. That is, the deformation body 100 is supported by the support body 300 such that the diaphragm 150d is elastically deformed with respect to the support body 300 when the force Fz to be detected is applied on the force receiving body 160. Both the support body 300 and the deformation body 100 according to the present embodiment have a circular outer shape whose center is on a Z axis as viewed from the upper side (positive Z axis direction). Further, the force receiving body 160 has a smaller diameter than an inner deformation portion 150l, which will be described later, and has a disc shape concentric with the support body 300 and the deformation body 100. As illustrated in FIG. 1, the force Fz is applied on an upper surface of the force receiving body 160 in parallel with the Z axis.

As illustrated in FIG. 1, the diaphragm 150d according to the present embodiment includes the inner deformation portion 150l and an outer deformation portion 150h having a relatively larger spring constant than the inner deformation portion 150l. The inner deformation portion 150l is provided in a central region of the diaphragm 150d as understood from FIG. 1. On the other hand, the outer deformation portion 150h is provided in an annular region that surrounds an outer periphery of the inner deformation portion 150l. To be specific, the inner deformation portion 150l has a disc shape, and the outer deformation portion 150h has an annular shape. As illustrated in the drawing, the inner deformation portion 150l has a smaller thickness in the Z axis direction than the outer deformation portion 150h, and accordingly, has a spring constant smaller than the spring constant of the outer deformation portion 150h. Incidentally, the "spring constant" of the present embodiment means a value obtained by dividing a magnitude of the force Fz by displacement in the Z axis direction generated in each of the inner deformation portion 150l and the outer deformation portion 150h when the force Fz in the Z axis direction is applied on the force receiving body 160 provided in the inner deformation portion 150l.

The force receiving body 160 is at a fixed position with respect to the support body 300 in a state where no force is applied on the force receiving body 160, but the diaphragm 150d having elasticity (flexibility) undergoes elastic deformation and causes a change in a relative position between the force receiving body 160 and the support body 300 when the force Fz is applied on the force receiving body 160. At this time, the elastic deformation caused in the inner deformation portion 150l is greater than the elastic deformation caused in the outer deformation portion 150h due to the difference in spring constant between the inner deformation portion 150l and the outer deformation portion 150h. Of course, when the force applied on the force receiving body 160 disappears, the force receiving body 160 returns to the original fixed position.

As illustrated in FIG. 2, the displacement electrode E30 according to the present embodiment includes a disc-shaped first displacement electrode E31 whose center is on the Z axis and an annular-shaped second displacement electrode E32 which surrounds an outer periphery of the first displacement electrode E31 and whose center is on the Z axis. In addition, as illustrated in FIG. 1, the fixed electrode E20 according to the present embodiment includes a first fixed electrode E21 whose center is on the Z axis and an annular-shaped second fixed electrode E22 which surrounds an outer periphery of the first fixed electrode E21 and whose center is on the Z axis. Further, the first displacement electrode E31 and the first fixed electrode E21 are arranged to oppose each other and form a first capacitive element C1, and the second displacement electrode E32 and the second fixed electrode E22 are arranged to oppose each other and form a second capacitive element C2. In the present embodiment, the first displacement electrode E31 and the first fixed electrode E21 have the same shape, and the second displacement electrode E32 and the second fixed electrode E22 have the same shape. It is a matter of course that the displacement electrode E30 may be configured using the first displacement electrode and the second displacement electrode surrounding the first displacement electrode and the fixed electrode E20 may be configured as a common electrode, or the fixed electrode E20 may be configured using the first fixed electrode and the second fixed electrode surrounding the first fixed electrode, and the displacement electrode E30 may be configured as a common electrode in another embodiment.

In the present embodiment, the first displacement electrode E31 is arranged on a lower surface of the inner deformation portion 150l, and the second displacement electrode is arranged on a lower surface of the outer deformation portion 150h as illustrated in FIG. 1. In other words, the first capacitive element C1 configured of the first displacement electrode E31 and the first fixed electrode E21 is arranged at a position corresponding to the inner deformation portion 150l as viewed from the Z axis direction, and the second capacitive element C2 configured of the second displacement electrode E32 and the second fixed electrode E22 is arranged at a position corresponding to the outer deformation portion 150h as viewed from the Z axis direction.

Although not illustrated, it is conceivable to set the area of one of the fixed electrode and the displacement electrode to be larger than the area of the other electrode such that an effective opposing area of a pair of electrodes forming a capacitive element does not change even when the relative position of the displacement electrode with respect to the fixed electrode changes as a result of action of the force in the Z axis direction. To be specific, this is a state where a projected image of an electrode having the smaller area is completely contained inside a surface of an electrode having the larger area when a contour of the electrode having the smaller area (for example, the displacement electrode) is projected on the surface of the electrode having the larger area (for example, the fixed electrode) to form an orthogonally projected image. If this state is maintained, the effective area of the capacitive element formed using both the electrodes becomes equal to the area of the smaller electrode and is always constant. That is, it is possible to improve the accuracy in detection of the force.

When a force −Fz in a negative Z axis direction (downward) is applied on the force receiving body 160 of the force sensor configured as described above, the diaphragm 150d is bent downward. Along with this, the first displacement electrode E31 and the second displacement electrode E32 are displaced downward. As a result, each distance between each of the first and second displacement electrodes E31 and E32 and each of the first and second fixed electrodes E21 and E22 decreases, and each capacitance value of the first and second capacitive elements C1 and C2 increases. In the force sensor according to the present embodiment, it is possible to detect the force Fz in the Z axis direction applied on the force receiving body 160 based on a variation amount of the capacitance value of the first capacitive element C1. Alternatively, it is possible to detect the force Fz in the Z axis direction applied on the force receiving body 160 based on a variation amount of the capacitance value of the second capacitive element C2.

In the present embodiment, the spring constant of the inner deformation portion 150l is smaller than the spring constant of the outer deformation portion 150h as described above. Thus, the inner deformation portion 150l undergoes relatively large elastic deformation by the force Fz regardless of a direction (sign) of the applied force Fz, and the outer deformation portion 150h undergoes relatively small elastic deformation. Thus, the variation amount of the capacitance value of the first capacitive element C1 is larger than the variation amount of the capacitance value of the second capacitive element C2 as long as the pairs of the fixed electrode and the displacement electrode, respectively, forming the first and second capacitive elements C1 and C2 have the same separation distance and have the same effective opposing area. In other words, the first capacitive element C1 is more sensitive to the force Fz than the second capacitive element C2.

In the force sensor according to the present embodiment, it is possible to detect the direction and the magnitude of the force Fz applied on the force receiving body 160 based on a first electric signal T1 corresponding to the variation amount of the capacitance value of the first capacitive element C1 as shown in the following [Expression 1]. Further, it is also possible to detect the direction and the magnitude of the applied force Fz based on a second electric signal T2 corresponding to the variation amount of the capacitance value of the second capacitive element. Incidentally, each of C1 and C2 represents the variation amount of the capacitance value of each of the capacitive elements C1 and C2 in the following [Expression 1].

$$T1=C1$$

$$T2=C2 \quad \quad \text{[Expression 1]}$$

In the present embodiment, malfunction diagnosis of the force sensor is performed by utilizing a fact that a ratio between the first electric signal T1 and the second electric signal T2 changes along with accumulation of metal fatigue in the diaphragm 150d as the deformation body. In the following description, it is assumed that first and second electric signals in an initial state where the metal fatigue does not occur in the diaphragm 150d are denoted by T1a and T2a, and first and second electric signals in a state where the metal fatigue occurs (is accumulated) in the diaphragm 150d are denoted by T1b and T2b to distinguish from each other.

Figure 3:
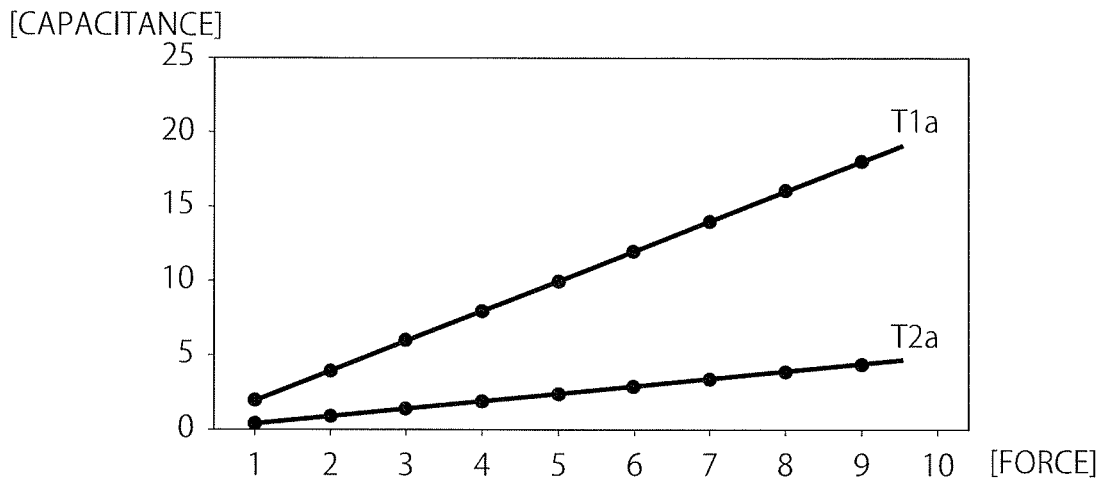
FIG. 3 is a graph illustrating a relationship between a magnitude of a force Fz applied on the force sensor and a first electric signal T1$a$ and a second electric signal T2$a$ output from the force sensor in a case (initial state) where metal fatigue does not occur in a diaphragm of FIG. 1.
Figure 4:
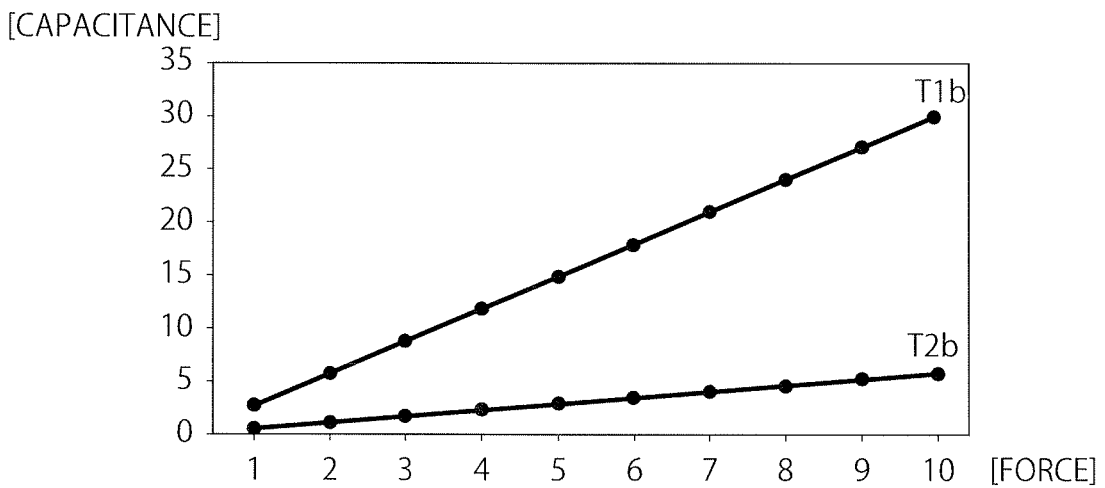
FIG. 4 is a graph illustrating a relationship between a magnitude of the force Fz applied on the force sensor and a first electric signal T1$b$ and a second electric signal T2$b$ output from the force sensor in a case where metal fatigue occurs in the diaphragm of FIG. 1.

FIG. 3 is a graph illustrating a relationship between the magnitude of the force applied on the force sensor and the first electric signal T1a and the second electric signal T2a output from the force sensor in the state (initial state) where the metal fatigue does not occur in the diaphragm 150d of FIG. 1, and FIG. 4 is a graph illustrating a relationship between the magnitude of the force applied on the force sensor and the first electric signal T1b and the second electric signal T2b output from the force sensor in a case where the metal fatigue occurs (is accumulated) in the diaphragm 150d of FIG. 1.

In each drawing, the horizontal axis represents an absolute value of a force −Fz acting on the force sensor and the vertical axis represents a magnitude of an electric signal output from the force sensor in response to the force −Fz. Thus, an inclination of a straight line indicating each of the electric signals T1a to T2b represents the detection sensitivity of the force sensor in each drawing.

Next, a method of determining whether the force sensor functions normally will be described. When a repeated load is applied on the force sensor according to the present embodiment, the metal fatigue occurs in the diaphragm 150d. The metal fatigue is remarkably developed in the inner deformation portion 150l in which the elastic deformation caused by the force Fz is relatively large. When this metal fatigue is accumulated, the strength of the inner deformation portion 150l decreases, and finally, the diaphragm 150d breaks. In general, a metal material is softened when metal fatigue is accumulated in the metal material so that the spring constant of the inner deformation portion 150l decreases. That is, when the metal fatigue is accumulated in the inner deformation portion 150l in the diaphragm 150d according to the present embodiment, the inner deformation portion 150l is greatly deformed by the force Fz, and the sensitivity of the inner deformation portion 150l with respect to the force Fz increases as compared with the initial state. This can be understood by comparing FIGS. 3 and 4.

To be specific, an inclination (sensitivity) of the straight line indicating the first electric signal T1a corresponding to the inner deformation portion 150l is 2.0 in the initial state when referring to FIG. 3. On the other hand, an inclination (sensitivity) of the straight line indicating the first electric signal T1b corresponding to the inner deformation portion 150l is 3.0 in the state where the metal fatigue is accumulated, and the sensitivity increases by 50% when referring to FIG. 4.

It is a matter of course that the metal fatigue is also developed in the outer deformation portion 150h, but a degree of development thereof is smaller than a degree of development of metal fatigue in the inner deformation portion 150l. In fact, an inclination (sensitivity) of the straight line indicating the second electric signal T2a corresponding to the outer deformation portion 150h is 0.5 in the initial state when referring to FIG. 3. On the other hand, an inclination (sensitivity) of the straight line indicating the second electric signal T2b corresponding to the outer deformation portion 150h in the state where the metal fatigue is accumulated is 0.6 when referring to FIG. 4. Accordingly, an increase of the sensitivity is only 20%.

It should be noted here that the degree of development of metal fatigue differs between the inner deformation portion 150l and the outer deformation portion 150h. That is, a ratio (T1a/T2a) between the first electric signal T1a and the second electric signal T2a is 4.0 in the initial state, whereas a ratio (T1b/T2b) between the first electric signal T1b and the second electric signal T2b increases to 5.0 in the state where the metal fatigue is accumulated. The present invention utilizes this fact to perform the malfunction diagnosis of the force sensor.

In other words, the ratio between the first electric signal T1 and the second electric signal T2 gradually changes due to the difference in characteristic of accumulation of metal fatigue between the inner deformation portion 150l and the outer deformation portion 150h. Further, when a repeated load is further applied to the force sensor, the diaphragm 150d finally breaks in the inner deformation portion 150l, and it is difficult for the capacitive element C1 arranged in the inner deformation portion 150l to normally function. On the other hand, it is highly probable that the capacitive element C2 arranged in the outer deformation portion 150h normally functions at this point in time.

In the above-described manner, it is possible to determine whether the force sensor functions normally by evaluating whether a difference between a ratio between the first electric signal T1b and the second electric signal T2b and a ratio between the first electric signal T1a and the second electric signal T2a in the initial state falls within a predetermined range while performing measurement of the force Fz using, for example, the capacitive element C2 arranged on the outer deformation portion 150h side. It is a matter of course that the applied torque may be measured based on the first electric signal T1. In this case, the capacitive element C1 that provides the first electric signal T1 is supported by the inner deformation portion 150l having the relatively small spring constant, and thus, the sensitivity with respect to the applied force is high and it is possible to perform the force measurement with an excellent S/N ratio.

Figure 5:
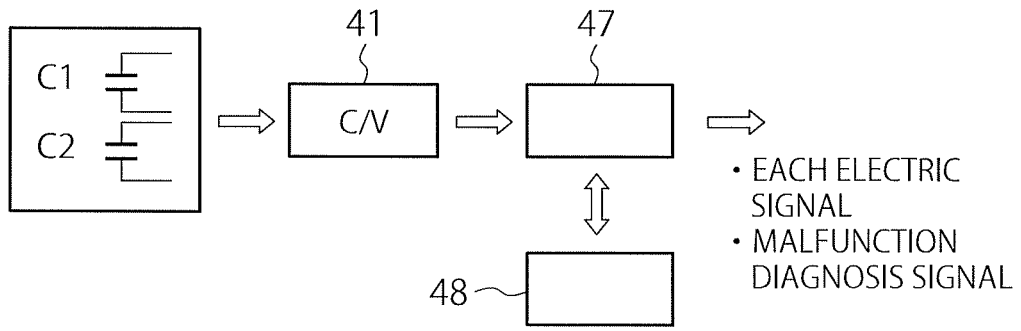
FIG. 5 is a block diagram of a detection circuit employed in the force sensor according to the present embodiment.

In order to embody the above-described determination principle, the force sensor according to the present embodiment includes a detection circuit illustrated in FIG. 5. FIG. 5 is a block diagram of the detection circuit employed in the force sensor according to the present embodiment. This detection circuit includes a C/V converter 41 which converts information on capacitance values of the two capacitive elements provided from a mechanical part including the diaphragm 150d and the capacitive elements C1 and C2, that is, the first electric signal T1 and the second electric signal T2 into corresponding voltage values, respectively, a microcomputer 47 which calculates the force Fz applied on the force sensor based on the two voltage values provided from the C/V converter 41, and a storage unit 48 which is connected to the microcomputer 47 and stores the ratio between the first electric signal T1a and the second electric signal T2a in the initial state. The microcomputer 47 has a function of comparing the initial state ratio (T1a/T2a) stored in the storage unit 48 and a current ratio between the first electric signal T1b and the second electric signal T2b and determining whether a comparison result thereof falls within a predetermined range.

When the current ratio (T1b/T2b) falls within the predetermined range as a result of the comparison, the microcomputer 47 determines that the force sensor normally functions and outputs a measured value of the force Fz. In the present embodiment, the force Fz (Fz2) is measured using the second electric signal T2b provided based on the second capacitive element C2 provided on the outer deformation portion 150h side. On the other hand, when the ratio does not fall within the predetermined range, the microcomputer 47 determines that the force sensor does not normally function (malfunctions) and outputs a malfunction diagnosis signal.

According to the present embodiment as described above, the ratio between the first electric signal T1 and the second electric signal T2 changes when the metal fatigue occurs in the diaphragm 150d, and thus, it is possible to provide the force sensor capable of detecting the occurrence of the metal fatigue based on this change and diagnosing the malfunction of the deformation body.

To be specific, the detection circuit according to the present embodiment includes the storage unit 48 that stores the ratio between the first electric signal T1a and the second electric signal T2a in a state where the force sensor normally functions as a reference ratio, and is configured to determine whether the force sensor functions normally by determining whether a "difference between the ratio between the first electric signal T1b and the second electric signal T2b and the reference ratio" falls within a predetermined range. Thus, it is possible to reliably perform the malfunction determination of the diaphragm 150d, that is, the malfunction determination of the force sensor based on the reference ratio set in advance.

§ 2. Example of Biaxial Force Sensor

Next, an example in which the above-described principle of malfunction determination is applied in a biaxial force sensor will be described.

Figure 6:
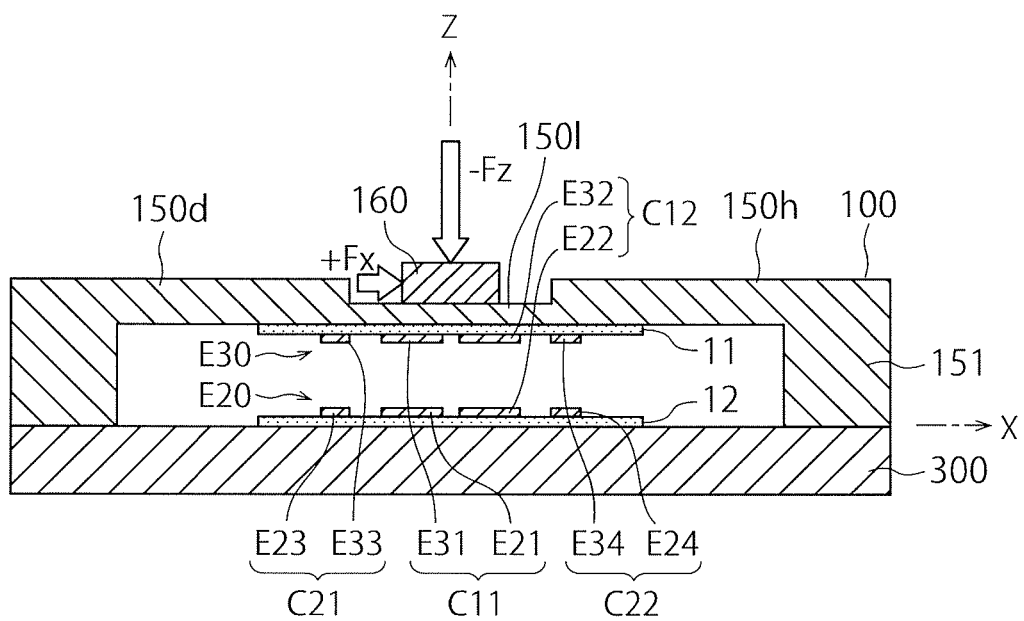
FIG. 6 is a schematic cross-sectional view illustrating a biaxial force sensor according to a second embodiment of the present invention.

The biaxial force sensor to be described herein is a force sensor capable of detecting two forces, that is, the force Fz in the Z axis direction and a force Fx in an X axis direction which are applied on the force receiving body 160. FIG. 6 is a schematic cross-sectional view illustrating a biaxial force sensor according to a second embodiment of the present invention, and FIG. 7 is a schematic plan view illustrating a displacement electrode E30 of the force sensor of FIG. 6.

Figure 7:
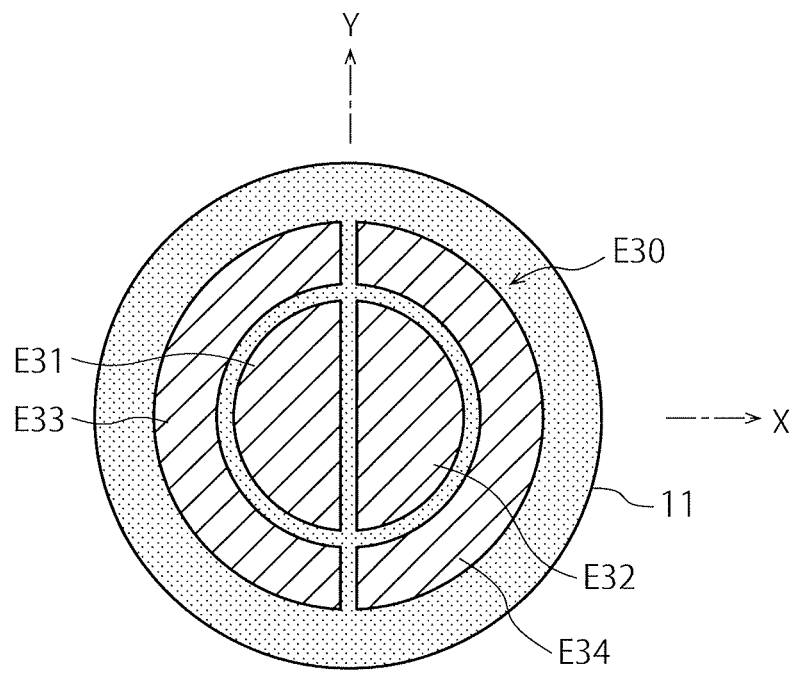
FIG. 7 is a schematic plan view illustrating a displacement electrode of the force sensor of FIG. 6.

As illustrated in FIGS. 6 and 7, the force sensor according to the present embodiment is a force sensor that detects the forces in the Z axis direction (a vertical direction in FIG. 6) and the X axis direction (a horizontal direction in FIG. 6) in an XYZ three-dimensional coordinate system. This force sensor has substantially the same structure as the uniaxial force sensor (see FIG. 1) according to the first embodiment. Thus, constituent parts corresponding to the force sensor according to the first embodiment will be denoted by the same reference signs, and a detailed description thereof will be omitted.

As illustrated in FIG. 6, the diaphragm 150d according to the present embodiment also includes the inner deformation portion 150l and the outer deformation portion 150h having a relatively larger spring constant than the inner deformation portion 150l. Since the arrangement and configurations of the inner deformation portion 150l and the outer deformation portion 150h are the same as those in the uniaxial force sensor (see FIG. 1), a detailed description thereof will be omitted. Incidentally, the "spring constant" according to the present embodiment means a value obtained by dividing a magnitude of the applied force Fz or Fx by displacement in the Z axis direction generated in each of the inner deformation portion 150l and the outer deformation portion 150h when the force Fz in the Z axis direction or the force Fx in the X axis direction is applied on the force receiving body 160 provided in the inner deformation portion 150l. Therefore, it is possible to consider a spring constant in response to the force Fz and a spring constant in response to the force Fx as the "spring constant" according to the present embodiment, but the displacement generated in the inner deformation portion 150*l* is greater than the displacement generated in the outer deformation portion 150*h* regardless of the direction of the applied fore.

The force sensor according to the present embodiment is different from the force sensor according to the first embodiment in terms of a structure of a capacitive element. That is, the capacitive element according to the present embodiment includes a first capacitive element C11 on a negative X axis and a second capacitive element C12 on a positive X axis side, which are arranged with the Y axis interposed therebetween as viewed from the Z axis direction, a third capacitive element C21 arranged on the negative X axis side with regard to the first capacitive element C11, and a fourth capacitive element C22 arranged on the positive X axis side with regard to the second capacitive element C12.

Displacement electrodes forming each part of these capacitive elements are illustrated in FIG. 7. As illustrated in the drawing, the displacement electrode includes a first displacement electrode E31 on the negative X axis side and a second displacement electrode E32 on the positive X axis side, which are arranged with the Y axis interposed therebetween as viewed from the Z axis direction, a third displacement electrode E33 arranged on the negative X axis side with regard to the first displacement electrode E31, and a fourth displacement electrode E34 arranged on the positive X axis side with regard to the second displacement electrode E32. Further, the fixed electrode includes a first fixed electrode E21 arranged to oppose the first displacement electrode E31, a second fixed electrode E22 arranged to oppose the second displacement electrode E32, and a third fixed electrode E23 arranged to oppose the third displacement electrode E33, and a fourth fixed electrode E24 arranged to oppose the fourth displacement electrode E34.

In the present embodiment, the first displacement electrode E31 and the second displacement electrode E32 are arranged on a lower surface of the inner deformation portion 150*l*, and the third displacement electrode E33 and the fourth displacement electrode E34 are arranged on a lower surface of the outer deformation portion 150*h* as illustrated in FIG. 6. In other words, the first capacitive element C11 configured using the first displacement electrode E31 and the first fixed electrode E21 and the second capacitive element C12 configured using the second displacement electrode E32 and the second fixed electrode E22 are arranged at positions corresponding to the inner deformation portion 150*l* as viewed from the Z axis direction, and the third capacitive element C21 configured using the third displacement electrode E33 and the third fixed electrode E23 and the fourth capacitive element C22 configured using the fourth displacement electrode E34 and the fourth fixed electrode E24 are arranged at positions corresponding to the outer deformation portion 150*h* as viewed from the Z axis direction.

In the present embodiment, the first displacement electrode E31 and the first fixed electrode E21 have the same shape, the second displacement electrode E32 and the second fixed electrode E22 have the same shape, the third displacement electrode E33 and the third fixed electrode E23 have the same shape, and the fourth displacement electrode E34 and the fourth fixed electrode E24 have the same shape.

It is a matter of course that at least two, for example, all, of the first to fourth displacement electrodes may be configured as a common electrode, or at least two, for example, all, of the first to fourth fixed electrodes may be configured as a common electrode in another embodiment.

Although not illustrated, it is conceivable to set the area of one of the fixed electrode and the displacement electrode to be larger than the area of the other electrode such that an effective opposing area of a pair of electrodes forming a capacitive element does not change even when the relative position of the displacement electrode with respect to the fixed electrode changes as a result of action of the forces in the X axis direction and the Z axis direction. As described above, this is a state where a projected image of an electrode having the smaller area is completely contained inside a surface of an electrode having the larger area when a contour of the electrode having the smaller area (for example, the displacement electrode) is projected on the surface of the electrode having the larger area (for example, the fixed electrode) to form an orthogonally projected image. If this state is maintained, the effective area of the capacitive element formed using both the electrodes becomes equal to the area of the smaller electrode and is always constant. That is, it is possible to improve the accuracy in detection of the force.

When describing a structure of each electrode as viewed from the Z axis direction in detail, the first fixed electrode E31 and the first displacement electrode E21 are semicircular-shaped electrodes having a chord extending in parallel to the Y axis as a diameter in which an arc is formed on the negative X axis side with regard to the chord, the second fixed electrode E32 and the second displacement electrode E22 are semicircular-shaped electrodes having a chord extending in parallel to the Y axis as a diameter in which an arc is formed on the positive X axis side with regard to the chord, the third fixed electrode E33 and the third displacement electrode E23 are semicircular ring-shaped electrodes which surround the arcs of the first fixed electrode E31 and the first displacement electrode E21, respectively, and the fourth fixed electrode E34 and the fourth displacement electrode E24 are semicircular ring-shaped electrodes which surround the arcs of the second fixed electrode E32 and the second displacement electrode E22, respectively. Eventually, each of the electrodes E20 and E30 according to the present embodiment has a shape obtained by bisecting the electrode of the force sensor according to the first embodiment with the Y axis as a cutting line.

<2-1. Malfunction Determination by Fx>

Figure 8:
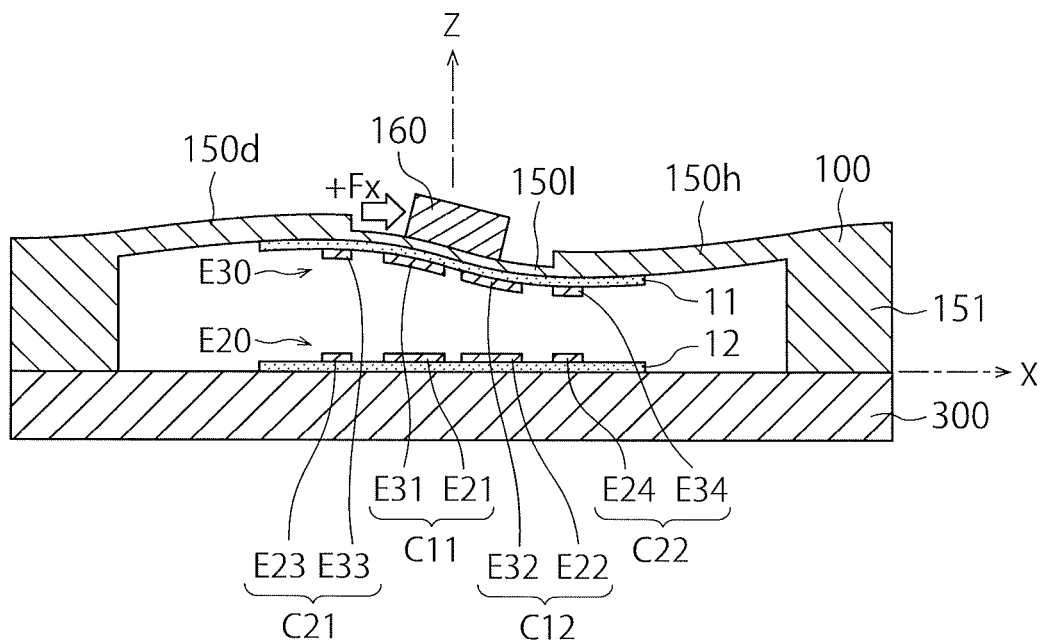
FIG. 8 is a schematic cross-sectional view illustrating a state where a diaphragm of the force sensor of FIG. 6 is deformed by a force +Fx in a positive X direction.

When a force +Fx in the positive X axis direction is applied on the force receiving body 160 of the force sensor as described above, elastic deformation occurs in the diaphragm 150*d*. FIG. 8 is a schematic cross-sectional view illustrating a state where the diaphragm 150*d* of the force sensor of FIG. 7 is deformed by the force +Fx in the positive X axis direction. As illustrated in FIG. 8, when the force +Fx is applied on the force receiving body 160 from the left side to the right side in the drawing, the deformation as illustrated in the drawing occurs in the diaphragm 150*d*. As a result of this deformation, the first displacement electrode E31 and the third displacement electrode E33 positioned on the negative X axis side are displaced upward, and the second displacement electrode E32 and the fourth displacement electrode E34 are displaced downward as compared with the initial state where the force +Fx is not applied on the force receiving body 160. Due to such displacement of the respective displacement electrodes E31 to E34, the respective capacitance values of the first capacitive element C11 and the third capacitive element C21 decrease, but the respective capacitance values of the second capacitive element C12 and the fourth capacitive element C22 increase.

In the present embodiment, the spring constant of the inner deformation portion 150*l* is smaller than the spring constant of the outer deformation portion 150*h* as described above. Thus, the inner deformation portion 150*l* undergoes relatively large elastic deformation and the outer deformation portion 150h undergoes relatively small elastic deformation by the force Fx regardless of a direction (sign) of the force Fx. Thus, the variation amount of the capacitance values of the first capacitive element C11 and the second capacitive element C12 is larger than the variation amount of the capacitance values of the third capacitive element C21 and the fourth capacitive element C22 as long as the pairs of the fixed electrode and the displacement electrode, respectively, forming the first to fourth capacitive elements C11 to C22 have the same separation distance and have the same effective opposing area. In other words, the first capacitive element C11 and the second capacitive element C12 are more sensitive to the force Fz than the third capacitive element C21 and the fourth capacitive element C22.

It is possible to detect the direction and the magnitude of the force Fx in the X axis direction applied on the force receiving body 160 based on a first electric signal T1 corresponding to a "difference between the capacitance value of the first capacitive element C11 and the capacitance value of the second capacitive element C12" as shown in the following [Expression 2] on the basis of the variation amount of each capacitance value of each of the capacitive elements C11 to C22. Further, it is also possible to detect the force Fx based on a second electric signal T2 corresponding to a "difference between the capacitance value of the third capacitive element C21 and the capacitance value of the fourth capacitive element C22". Incidentally, each of C11 to C22 represents the variation amount of the capacitance value of each of the capacitive elements C1 to C4 in the following [Expression 2]

$$T1 = C12 - C11$$

$$T2 = C22 - C21 \qquad \text{[Expression 2]}$$

Even in the present embodiment, the malfunction diagnosis of the force sensor is performed by utilizing a fact that a ratio between the first and second electric signals T1 and T2 changes along with accumulation of metal fatigue in the diaphragm 150d as the deformation body. Thus, it is assumed that first and second electric signals in an initial state where the metal fatigue does not occur in the diaphragm 150d are denoted by T1a and T2a, and first and second electric signals in a state where the metal fatigue occurs (is accumulated) in the diaphragm 150d are denoted by T1b and T2b to distinguish from each other in the following description, which is similar to § 1. In the present embodiment, a relationship between the magnitude of the force Fx applied on the force sensor and the first and second electric signals T1a and T2a in the initial state is the same as that of the graph illustrated in FIG. 3. In addition, a relationship between the magnitude of the force Fx applied on the force sensor and the first and second electric signals T1b and T2b in the state where the metal fatigue occurs in diaphragm 150d is the same as that of the graph illustrated in FIG. 4.

A principle and a method for determination on whether the force sensor according to the present embodiment described above functions normally are the same as those in § 1. That is, it is possible to understand the principle and the method of the malfunction determination of the force sensor according to the present embodiment by replacing [Expression 2] with the first electric signal T1 (T1a, T1b) and the second electric signal T2 (T2a, T2b) in § 1. Thus, a detailed description of the principle and method will be omitted herein. However, the microcomputer 47 of the detection circuit calculates the force Fx instead of the force Fx by performing difference detection based on [Expression 2] for two voltage values provided from the C/V converter 41 in the present embodiment.

According to the present embodiment as described above, the ratio between the first electric signal T1 and the second electric signal T2 changes when the metal fatigue occurs in the diaphragm 150d, and thus, it is possible to provide the force sensor capable of detecting the occurrence of the metal fatigue based on this change and diagnosing the malfunction of the deformation body.

To be specific, the detection circuit according to the present embodiment includes the storage unit 48 that stores the ratio between the first electric signal T1a and the second electric signal T2a in a state where the force sensor normally functions as a reference ratio, and is configured to determine whether the force sensor functions normally by determining whether a "difference between the ratio between the first electric signal T1b and the second electric signal T2b and the reference ratio" falls within a predetermined range. Thus, it is possible to reliably perform the malfunction determination of the diaphragm 150d, that is, the malfunction determination of the force sensor based on the reference ratio set in advance.

In addition, the capacitive elements C11 to C22 are arranged to be symmetric with respect to the Y axis, and thus, it is easy to perform the processing to measure the force Fx to be detected based on the variation of the capacitance values of the capacitive elements C11 to C22 in the present embodiment.

<2-2. Malfunction Determination by Fz>

With a biaxial force sensor, it is also possible to perform malfunction determination of the force sensor using the force Fz in the Z axis direction instead of the force Fx in the X axis direction. Since the structure of the biaxial force sensor is similar to the structure described in 2-1, a detailed description thereof will be omitted.

When a force −Fz in the negative Z axis direction is applied on the force receiving body 160 of this force sensor, the diaphragm 150d is bent downward as described in § 1. Along with this, the first to fourth displacement electrodes E31 to E34 are displaced downward. As a result, each separation distance between each of the first to fourth displacement electrodes E31 to E34 and each of the first to fourth fixed electrodes E21 to E24 forming each of the first to fourth capacitive elements C11 to C22 decreases, and capacitance values of the respective capacitive elements C11 to C22 increase.

Accordingly, it is possible to detect the force Fz in the Z axis direction applied on the force receiving body 160 based on a first electric signal T1 corresponding to a sum of a variation amount of the capacitance value of the first capacitive element C11 and a variation amount of the capacitance value of the second capacitive element C12 in the force sensor according to the present embodiment as shown in the following [Expression 3]. Further, it is also possible to detect the force Fz based on a second electric signal T2 corresponding to a sum of a variation amount of the capacitance value of the third capacitive element C21 and a variation amount of the capacitance value of the fourth capacitive element C22

$$T1 = C11 + C12$$

$$T2 = C21 + C22 \qquad \text{[Expression 3]}$$

The force sensor according to the present embodiment is also configured such that the malfunction diagnosis of the force sensor is performed by utilizing a fact that a ratio between the first and second electric signals T1 and T2 changes along with accumulation of metal fatigue in the diaphragm 150d as the deformation body. Here, it is also assumed that first and second electric signals in an initial state where the metal fatigue does not occur in the diaphragm 150d are denoted by T1a and T2a, and first and second electric signals in a state where the metal fatigue occurs (is accumulated) in the diaphragm 150d are denoted by T1b and T2b to distinguish from each other, which is similar to § 1. In the present embodiment, a relationship between an absolute value of the applied force −Fz and the first and second electric signals T1a and T2a in the initial state where metal fatigue does not occur in the diaphragm 150d is the same as that in the graph illustrated in FIG. 3. In addition, a relationship between the absolute value of the applied force −Fz and the first and second electric signals T1b and T2b in a state where the metal fatigue occurs in the diaphragm 150d is the same as that in the graph illustrated in FIG. 4.

A principle and a method for determination on whether the force sensor according to the present embodiment described above functions normally are the same as those in § 1. That is, it is possible to understand the principle and the method of the malfunction determination of the force sensor according to the present embodiment by replacing [Expression 3] with the first electric signal T1 (T1a, T1b) and the second electric signal T2 (T2a, T2b) in § 1. Thus, a detailed description of the principle and method will be omitted herein. Incidentally, when a force +Fz in the opposite direction, that is, in the positive Z axis direction is applied, an increase or a decrease of a capacitance value of each capacitive element is reversed.

The ratio between the first electric signal T1 and the second electric signal T2 changes when the metal fatigue occurs in the diaphragm 150d even with the force sensor according to the present embodiment as described above, and thus, it is possible to provide the force sensor capable of detecting the occurrence of the metal fatigue based on this change and diagnosing the malfunction of the deformation body.

To be specific, the detection circuit according to the present embodiment includes the storage unit 48 that stores the ratio between the first electric signal T1a and the second electric signal T2a in a state where the force sensor normally functions as a reference ratio, and is configured to determine whether the force sensor functions normally by determining whether a "difference between the ratio between the first electric signal T1b and the second electric signal T2b and the reference ratio" falls within a predetermined range. Thus, it is possible to reliably perform the malfunction determination of the diaphragm 150d, that is, the malfunction determination of the force sensor based on the reference ratio set in advance.

In addition, the capacitive elements C11 to C22 are arranged to be symmetric with respect to the Y axis, and thus, it is easy to perform the processing to measure the force Fz to be detected based on the variation of the capacitance values of the capacitive elements C11 to C22 in the present embodiment.

Incidentally, the malfunction determination may be performed using [Expression 2] by focusing on the force Fx as described in <2-1> above, or the malfunction determination may be performed using [Expression 3] by focusing on the force Fz as described herein, in the biaxial force sensor illustrated in FIG. 6.

§ 3. Example of Six-Axis Force Sensor

Next, an example in which the principle of malfunction determination described in § 1 is applied in a six-axis force sensor will be described.

The six-axis force sensor described herein is a force sensor capable of detecting six components of forces Fx, Fy and Fz in each axis direction of X, Y, and Z and moments Mx, My and Mz around each axis.

Figure 9:
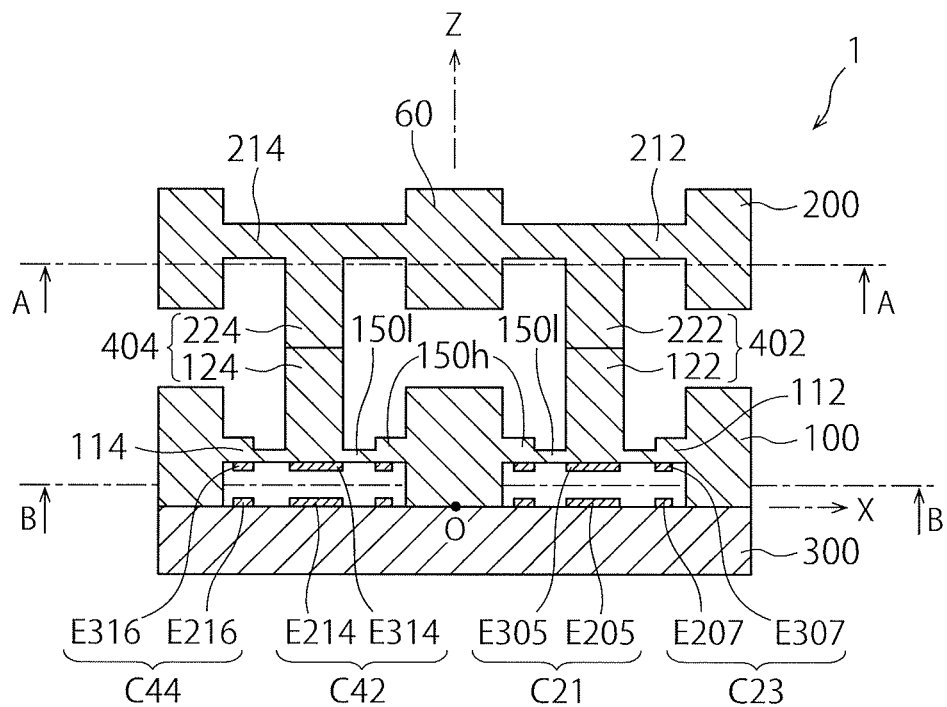
FIG. 9 is a schematic cross-sectional view illustrating a six-axis force sensor according to a third embodiment of the present invention.
Figure 10:
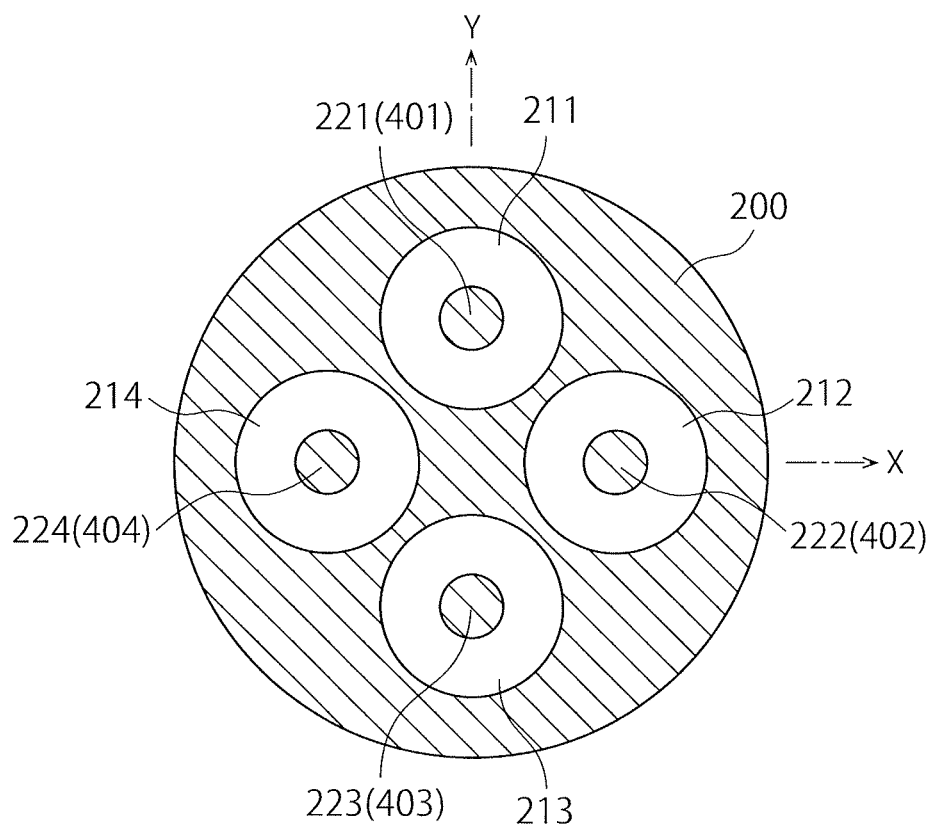
FIG. 10 is a cross-sectional view taken along a line A-A of FIG. 9.
Figure 11:
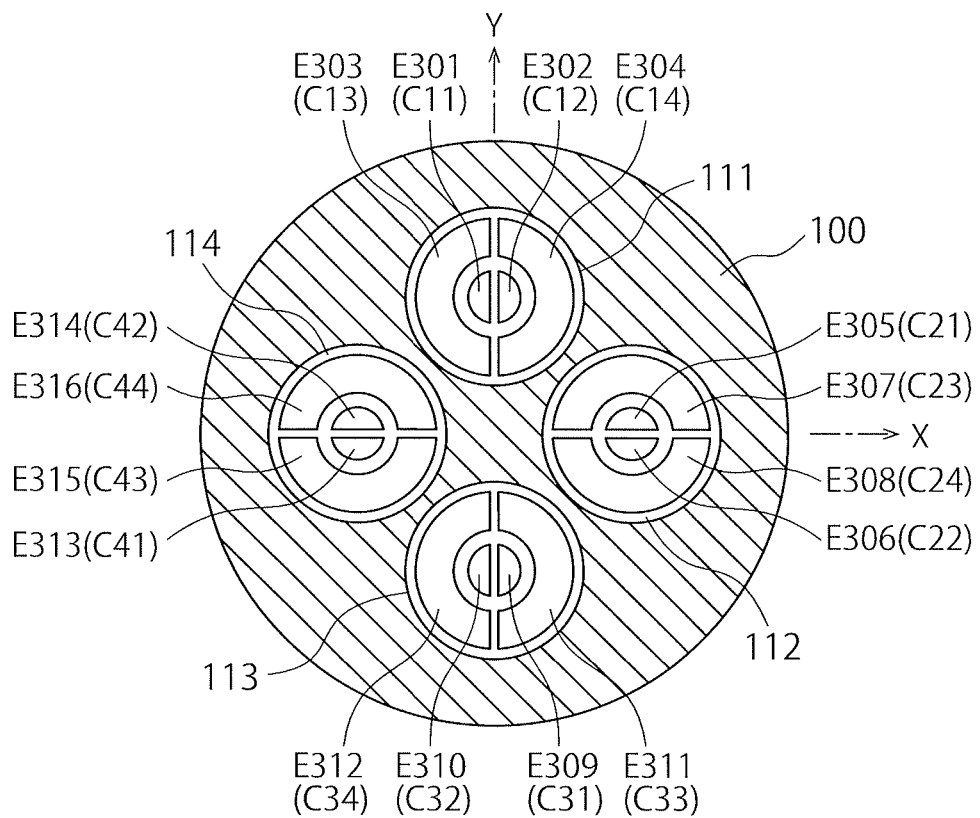
FIG. 11 is a cross-sectional view taken along a line B-B of FIG. 9.

FIG. 9 is a schematic cross-sectional view illustrating a six-axis force sensor according to a third embodiment of the present invention, FIG. 10 is a cross-sectional view taken along a line A-A of FIG. 9, and FIG. 11 is a cross-sectional view taken along a line B-B of FIG. 9.

As illustrated in FIGS. 9 to 11, the force sensor according to the present embodiment includes: a support body 300 arranged on an XY plane; a first deformation body 100 which is arranged to oppose the support body 300 and includes four first deformation portions 111 to 114 elastically deformable by action of a force or a moment to be detected; fixed electrodes arranged on the support body 300 in response to the respective deformation portions 111 to 114 of the first deformation body 100; and displacement electrodes which are provided, respectively, in the four first deformation portions 111 to 114 of the first deformation body 100 to oppose the fixed electrodes and form four sets of capacitive elements with the fixed electrodes; and a second deformation body 200 arranged to oppose an upper side of the first deformation body 100. The second deformation body 200 according to the present embodiment includes four second deformation portions 211 to 214 which are arranged so as to oppose the four first deformation portions 111 to 114. Further, the force sensor according to the present embodiment is provided with four connection members 401 to 404 that connects the first deformation portions 111 to 114 and the second deformation portions 211 to 214 corresponding to the respective first deformation portions 111 to 114. Incidentally, FIG. 9 does not illustrate the two first deformation portions 111 and 113, the two second deformation portions 211 and 213, and the connection members 401 and 403 in order to avoid complication.

The first deformation body 100 can be configured by, for example, forming four regions having a small thickness and elasticity (flexibility) on a disc-shaped plate material made of metal to be equidistant from the center of the disc at intervals of 90°. These four regions having elasticity function as the first deformation portions 111 to 114. In addition, the second deformation body 200 according to the present embodiment can be configured by, for example, forming four regions having a small thickness and elasticity on a disc-shaped plate material, which is configured using metal and has the same diameter as the first deformation body 100, to be equidistant from the center of the disc at intervals of 90°. These four regions having elasticity function as the second deformation portions 211 to 214.

The support body 300 according to the present embodiment has a disc shape having the same diameter as the first deformation body 100 and the second deformation body 200, and supports the first deformation body 100 in a region excluding the first deformation portions 111 to 114 as illustrated in FIG. 9.

Each one of the first deformation portions 111 to 114 and each one of the second deformation portions 211 to 214 are arranged on the positive X axis, the positive Y axis, the negative X axis, and the negative Y axis, respectively, as viewed from the Z axis direction to be equidistant from an origin O (see FIG. 10). In the present embodiment, all of the respective first deformation portions 111 to 114 and the respective second deformation portions 211 to 214 are configured as a circular diaphragm having the same diameter as viewed from the Z axis direction.

First connection portions 121 to 124 extending upward along the Z axis direction from circular center positions of the respective first deformation portions 111 to 114 are provided on upper surfaces (surfaces on the upper side in FIG. 9) of the respective first deformation portions 111 to 114. Further, second connection portions 221 to 224 extending downward along the Z axis direction from circular center positions of the respective second deformation portions 211 to 214 are provided on lower surfaces (surfaces on the lower side in FIG. 9) of the respective second deformation portions 211 to 214. Further, the first connection portions 121 to 124 and the second connection portions 221 to 224 corresponding to the first connection portions 121 to 124, respectively, are rigidly connected to each other by an appropriate connecting means such as a bolt, thereby forming four connection members 401 to 404 extending in the Z axis direction.

As illustrated in FIG. 9, each of the first deformation portions 111 to 114 according to the present embodiment is configured using a diaphragm including an inner deformation portion 150$l$ and an outer deformation portion 150$h$ having a relatively larger spring constant than the inner deformation portion 150$l$. The inner deformation portion 150$l$ is provided in a central region of each diaphragm as understood from FIG. 9. On the other hand, the outer deformation portion 150$h$ is provided in an annular region that surrounds an outer periphery of the inner deformation portion 150$l$. As illustrated in the drawing, the inner deformation portion 150$l$ is configured to have a smaller thickness in the Z axis direction than the outer deformation portion 150$h$, and accordingly, has the spring constant smaller than the spring constant of the outer deformation portion 150$h$. In other words, the four diaphragms 150$d$, employed in the uniaxial force sensor described in § 1, are arranged at equal intervals in a circumferential direction in the first deformation body 100 according to the present embodiment.

Incidentally, the "spring constant" according to the present embodiment means a value obtained by dividing a magnitude of a force and/or a moment by displacement in the Z axis direction generated in each of the inner deformation portion 150$l$ and the outer deformation portion 150$h$ of each diaphragm when the force in each axis direction of X, Y and Z and/or the moment around each axis is applied on the force receiving body 60 illustrated in the drawing. Therefore, strictly speaking, the "spring constant" is determined for each force and/or moment applied on the force receiving body 60, but displacement generated in the inner deformation portion 150$l$ is greater than displacement generated in the outer deformation portion 150$h$ regardless of the direction and the magnitude of the fore and/or the moment.

With such a configuration, the second deformation body 200 is at a fixed position with respect to the support body 300 in a state where no force is applied on the second deformation body 200, but the four first deformation portions 111 to 114 having elasticity (elasticity) undergo elastic deformation when any force is applied on the second deformation body 200, and a relative position between the second deformation body 200 and the support body 300 is changed. At this time, the elastic deformation caused in the inner deformation portion 150$l$ is greater than the elastic deformation caused in the outer deformation portion 150$h$ due to the difference in spring constant between the inner deformation portion 150$l$ and the outer deformation portion 150$h$.

It is a matter of course that the second deformation body 200 returns to the original fixed position when the force applied on the second deformation body 200 disappears.

As illustrated in FIG. 9, the four sets of capacitive elements are configured using the displacement electrodes arranged on the lower surfaces of the four first deformation portions 111 to 114 and the fixed electrodes arranged to oppose the displacement electrodes. First, a first set of capacitive elements among the four sets of capacitive elements will be described. The first set of capacitive elements is provided in a region corresponding to the first deformation portion 111 on a positive Y axis side as viewed from the Z axis direction, and is configured of four capacitive elements.

A first displacement electrode E301 on a negative X axis side and a second displacement electrode E302 on a positive X side, which are arranged with the Y axis interposed therebetween, and a third displacement electrode E303 arranged on the negative X axis side with regard to the first displacement electrode E301, and a fourth displacement electrode E304 arranged on the positive X axis side with regard to the second displacement electrode E302 are provided to be symmetric with respect to the Y axis on a lower surface of the first deformation portion 111 on the positive Y axis side, as electrodes forming these four capacitive elements C11 to C14. Further, a first fixed electrode E201 arranged to oppose the first displacement electrode E301, a second fixed electrode E202 arranged to oppose the second displacement electrode E302, and a third fixed electrode E203 arranged to oppose the third displacement electrode E303, and a fourth fixed electrode E204 arranged to oppose the fourth displacement electrode E304 are provided on the support body 300.

In the present embodiment, the first fixed electrode E201 and the first displacement electrode E301 are semicircular-shaped electrodes having a chord extending in parallel to the Y axis as a diameter in which an arc is formed on the negative X axis side with regard to the chord, the second fixed electrode E202 and the second displacement electrode E302 are semicircular-shaped electrodes having a chord extending in parallel to the Y axis as a diameter in which an arc is formed on the positive X axis side with regard to the chord, the third fixed electrode E203 and the third displacement electrode E303 are semicircular ring-shaped electrodes which surround the arcs of the first fixed electrode E201 and the first displacement electrode E301, respectively, and the fourth fixed electrode E204 and the fourth displacement electrode E304 are semicircular ring-shaped electrodes which surround the arcs of the second fixed electrode E202 and the second displacement electrode E302, respectively, as viewed from the Z axis direction. Incidentally, a substrate that supports each electrode is not illustrated in FIG. 9 and FIGS. 12 to 14 to be described later.

With this arrangement of the electrodes, the first capacitive element C11 is configured using the first displacement electrode E301 and the first fixed electrode E201, the second capacitive element C12 is configured using the second displacement electrode E302 and the second fixed electrode E202, the third capacitive element C13 is configured using the third displacement electrode E303 and the third fixed electrode E203, and the fourth capacitive element C14 is configured using the fourth displacement electrode E304 and the fourth fixed electrode E204. In other words, the first set of capacitive elements has the same structure as the capacitive element employed in the biaxial force sensor described in § 2.

In addition, three sets, that is, a second set, a third set, and a fourth set, of capacitive elements are provided in the force sensor according to the present embodiment. The second set of capacitive elements is also configured using four capacitive elements (fifth to eighth capacitive elements C21 to C24). The second set of capacitive elements is arranged by rotating the above-described first set of capacitive elements, that is, the first to fourth capacitive elements C11 to C14 clockwise by 90° around the origin. That is, the fifth capacitive element C21 is arranged at a position obtained by rotating the first capacitive element C11 clockwise by 90° around the origin, the sixth capacitive element C22 is arranged at a position obtained by rotating the second capacitive element C12 clockwise by 90° around the origin, the seventh capacitive element C23 is arranged at a position obtained by rotating the third capacitive element C13 clockwise by 90° around the origin, and the eighth capacitive element C24 is arranged at a position obtained by rotating the fourth capacitive element C14 clockwise by 90° around the origin. It is a matter of course that the fifth to eighth fixed electrodes E205 to E208 and the fifth to eighth displacement electrodes E305 to E308 forming the fifth to eighth capacitive elements C21 to C24 are similarly configured, and are arranged at positions obtained by rotating the first to fourth fixed electrodes E201 to E204 and the first to fourth displacement electrodes E301 to E304 clockwise by 90° around the origin, respectively.

Similarly, the third set of capacitive elements is also configured using four capacitive elements (ninth to twelfth capacitive elements C31 to C34), and are arranged at positions obtained by rotating the above-described fifth to eighth capacitive elements C21 to C24 clockwise by 90° around the origin. In addition, the fourth set of capacitive elements is also configured using four capacitive elements (thirteenth to sixteenth capacitive elements C41 to C44), and are arranged at positions obtained by rotating the above-described ninth to twelfth capacitive elements C31 to C34 clockwise by 90° around the origin.

As a result, the first and third capacitive elements C11 and C13 and the second and fourth capacitive elements C12 and C14 are axisymmetrically arranged with the positive Y axis as the axis of symmetry and form the first set of capacitive elements having a substantially circular shape as a whole. The fifth and seventh capacitive elements C21 and C23 and the sixth and eighth capacitive elements C22 and C24 are axisymmetrically arranged with the positive X axis as the axis of symmetry and form the second set of capacitive elements having a substantially circular shape as a whole. The ninth and eleventh capacitive elements C31 and C33 and the tenth and twelfth capacitive elements C32 and C34 are axisymmetrically arranged with the negative Y axis as the axis of symmetry and form the third set of capacitive elements having a substantially circular shape as a whole. The thirteenth and fifteenth capacitive elements C41 and C43 and the fourteenth and sixteenth capacitive elements C42 and C44 are axisymmetrically arranged with the negative X axis as the axis of symmetry and form the fourth set of capacitive elements having a substantially circular shape as a whole. Further, the first to fourth sets of capacitive elements are arranged to be equidistant from the origin O and concentric with the corresponding first deformation portions 111 to 114. In order to facilitate the understanding of the arrangement of the capacitive elements according to the present embodiment, FIG. 11 illustrates reference signs of the sixteen, in total, displacement electrodes E301 to E316 arranged on the first deformation body 100 together with reference signs of the capacitive elements C11 to C44 corresponding to the displacement electrodes E301 to E316, respectively.

As described above, the first deformation portions 111 to 114 of the first deformation body 100 are connected to the second deformation portions 211 to 214 of the second deformation body 200 via the connection members 401 to 404, respectively (see FIGS. 9 and 10). Thus, when a force is applied on the second deformation body 200, the force is transmitted to the first deformation portions 111 to 114 of the first deformation body 100 via the second deformation body 200 and the connection members 401 to 404, and the first deformation portions 111 to 114 are deformed according to a magnitude and a direction of the force. Along with this deformation, the first to sixteenth displacement electrodes E301 to E316 arranged on the first deformation portions 111 to 114 are displaced in the Z axis direction. That is, relative positions (separation distances) of the first to sixteenth displacement electrodes E301 to E316 with respect to the first to sixteenth fixed electrodes E201 to E216 arranged on the support body 300 are changed, respectively. This causes variation in each capacitance value of the capacitive elements C11 to C44, and thus, it is possible to measure the direction and the magnitude of the force applied on the second deformation body 200 by detecting the variation amount.

Next, a principle of measuring the forces Fx, Fy, and Fz in the respective axis directions of the X, Y, and Z axes, and the moments Mx, My and Mz around the respective axes will be described. In the following description, it is assumed that a force or a moment is applied on the second deformation body 200 in a state where the support body 300 is fixed.

Figure 12:
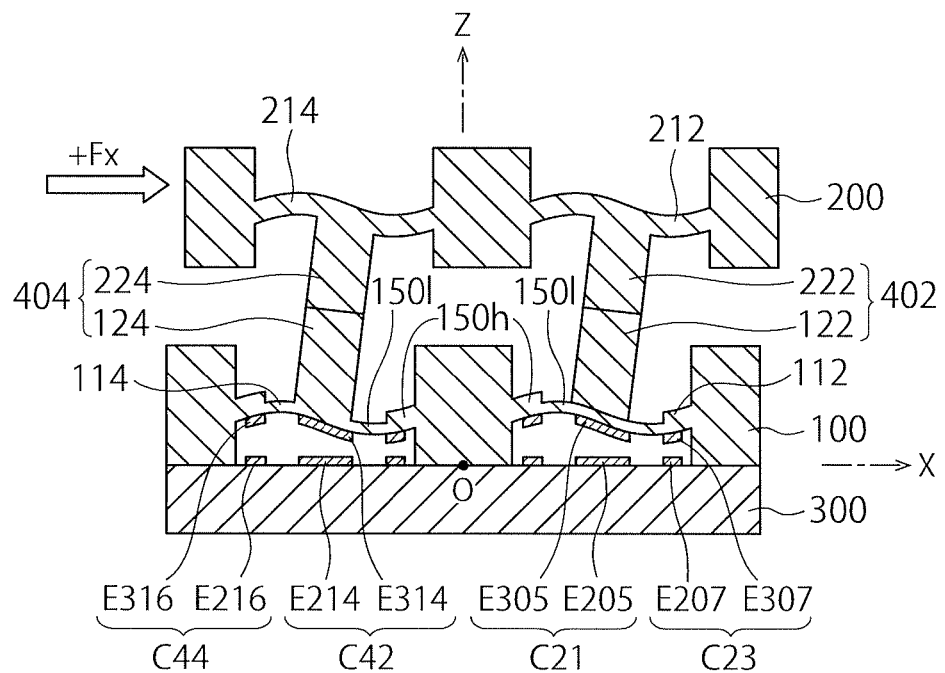
FIG. 12 is a schematic cross-sectional view illustrating a state of the force sensor of FIG. 9 when the force +Fx in the positive X axis direction is applied.

FIG. 12 is a schematic cross-sectional view illustrating a state of the force sensor of FIG. 9 when a force +Fx in the positive X axis direction is applied on the second deformation body 200. In this case, the first deformation portions 111 to 114 of the first deformation body and the second deformation portions 211 to 214 of the second deformation body are deformed as illustrated in the drawing. That is, a semicircular region on the positive X axis side is deformed downward, and a semicircular region on the negative X axis side is deformed upward in each of the first deformation portions 111 to 114. Therefore, the capacitance values of the first, third, tenth and twelfth capacitive elements C11, C13, C32 and C34 arranged on the negative X axis side in the first and third sets of capacitive elements decrease. On the other hand, the capacitance values of the second, fourth, ninth and eleventh capacitive elements C12, C14, C31 and C33 arranged on the positive X axis side in the first and third sets of capacitive elements increase. In regard to this, there are a region where the separation distance between the displacement electrode and the fixed electrode decreases and a region where the separation distance increases so that the change of capacitance value is canceled in the remaining fifth to eighth and thirteenth to sixteenth capacitive elements C21 to C24 and C41 to C44, and thus, the capacitance value does not substantially change.

It is a matter of course that variation opposite to the above-described variation of the capacitance value is caused in the first set and the third set of capacitive elements when a force −Fx in the negative X axis direction to the left is applied on the second deformation body 200. That is, the capacitance values of the first, third, tenth and twelfth capacitive elements C11, C13, C32 and C34 arranged on the negative X axis side in the first and third sets of capacitive elements increase. On the other hand, the capacitance values of the second, fourth, ninth and eleventh capacitive elements C12, C14, C31 and C33 arranged on the positive X axis side in the first and third sets of capacitive elements decrease. The capacitance value does not substantially change for the remaining fifth to eighth and thirteenth to sixteenth capacitive elements C21 to C24 and C41 to C44, which is similar to the above-described case.

A case where a force +Fy in the positive Y axis direction is applied on the second deformation body 200 may be conceivable by shifting the state where the force +Fx in the positive X axis direction is applied on the second deformation body 200 by 90°, and thus, will not be described here.

Figure 13:
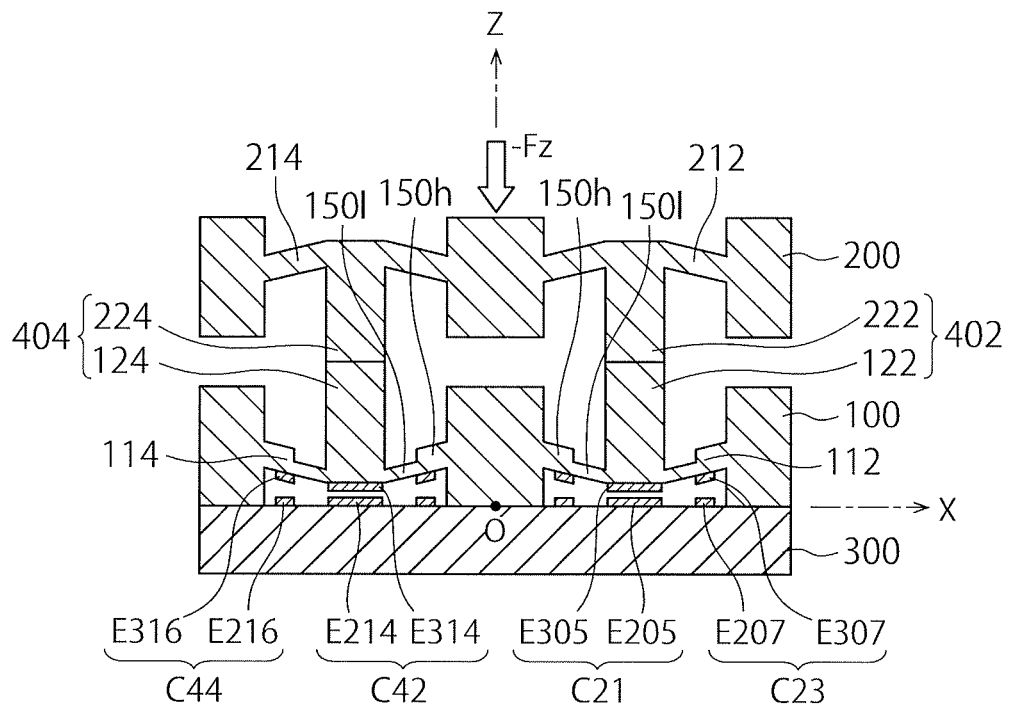
FIG. 13 is a schematic cross-sectional view illustrating a state of the force sensor of FIG. 9 when a force −Fz in a negative Z axis direction is applied.

Next, a case where a force −Fz in a negative Z axis direction is applied on the second deformation body 200 will be studied. FIG. 13 is a schematic cross-sectional view illustrating a state of the force sensor of FIG. 9 when the force −Fz in the negative Z axis direction is applied on the second deformation body 200. In this case, the first deformation portions 111 to 114 of the first deformation body and the second deformation portions 211 to 214 of the second deformation body are deformed as illustrated in the drawing. That is, each of the first deformation portions 111 to 114 is deformed downward. Therefore, the separation distance between the displacement electrode and the fixed electrode decreases in all of the first to sixteenth capacitive elements C11 to C44, the capacitance values thereof increase.

On the other hand, when a force in a positive Z axis direction is applied on the second deformation body 200, the first deformation portions 111 to 114 are deformed upward contrary to the above-described case described. Therefore, the separation distance between the displacement electrode and the fixed electrode increases in all of the first to sixteenth capacitive elements C11 to C44, the capacitance values thereof decrease.

Figure 14:
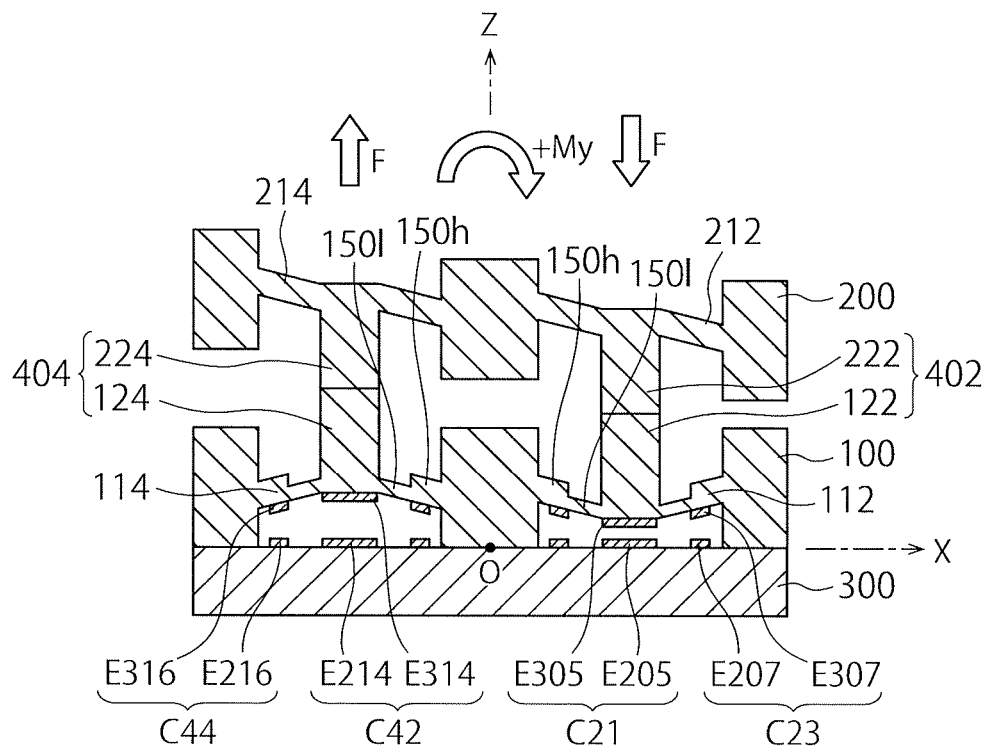
FIG. 14 is a schematic cross-sectional view illustrating a state of the force sensor of FIG. 9 when a positive moment +My around a Y axis is applied.

Next, a case where a positive moment +My around the Y axis is applied on the second deformation body 200 will be studied. FIG. 14 is a schematic cross-sectional view illustrating a state of the force sensor of FIG. 9 when the positive moment +My around the Y axis is applied on the second deformation body 200. In this case, the first deformation portions 111 to 114 of the first deformation body and the second deformation portions 211 to 214 of the second deformation body are deformed as illustrated in the drawing. That is, the first deformation portion 112 on the positive X axis side is deformed downward, and the first deformation portion 114 on the negative X axis side is deformed upward. Although not illustrated, a semicircular region on the positive X axis side is deformed downward and a semicircular region on the negative X axis side is deformed upward in the first deformation portions 111 and 113 on the positive Y axis side and the negative Y axis side. Regarding the sign of the moment to be applied around a predetermined coordinate axis, a direction of rotation of a right screw for advancing the right screw in a positive direction of the relevant coordinate axis is set to be positive in the present application. Although not illustrated, the Y axis extends from a front side to a back side of the sheet in FIG. 14.

Therefore, the capacitance values of the fifth to eighth capacitive elements C21 to C24 corresponding to the first deformation portion 112 on the positive X axis side increase, and the capacitance values of the thirteenth to sixteenth capacitive elements C41 to C44 corresponding to the first deformation portion 114 on the negative X axis side decrease. Meanwhile, the capacitance values of the first to fourth capacitive elements C11 to C14 and the ninth to twelfth capacitive elements C31 to C34 corresponding to the first deformation portions 111 and 113 on the positive Y axis side and the negative Y axis side do not substantially change as described in the case where the force Fx in the X axis direction is applied on the second deformation body 200 (see FIG. 12).

On the other hand, when a negative moment −My around the Y axis is applied on the second deformation body 200, the capacitance values of the fifth to eighth capacitive elements C21 to C24 corresponding to the first deformation portion 112 on the positive X axis side decrease, and the capacitance values of the thirteenth to sixteenth capacitive elements C41 to C44 corresponding to the first deformation portion 114 on the negative X axis side increase contrary to the above-described case. Even in this case, the capacitance values of the first to fourth capacitive elements C11 to C14 and the ninth to twelfth capacitive elements C31 to C34 corresponding to the first deformation portions 111 and 113 on the positive Y axis side and the negative Y axis side do not substantially change.

A case where a moment Mx around the X axis is applied on the second deformation body 200 may be conceivable by shifting the state where the moment My around the Y axis is applied on the second deformation body 200 by 90°, and thus, will not be described here.

In addition, when a moment Mz around the Z axis is applied on the second deformation body 200, all of the connection members 401 to 404 are displaced to be tilted in the same rotation direction along a circumference around the Z axis although not illustrated. Therefore, for example, when a negative moment −Mz around the Z axis is applied on the second deformation body 200, the semicircular region on the positive X axis side is deformed downward, and the semicircular region on the negative X axis side is deformed upward in the first deformation portion 111 on the positive Y axis side. In the first deformation portion 112 on the positive X axis side, a semicircular region on the negative Y axis side is deformed downward, and a semicircular region on the positive Y axis side is deformed upward. In the first deformation portion 113 on the negative Y axis side, the semicircular region on the negative X axis side is deformed downward, and the semicircular region on the positive X axis side is deformed upward. In the first deformation portion 114 on the negative X axis side, a semicircular region on the positive Y axis side is deformed downward, and a semicircular region on the negative Y axis side is deformed upward.

Therefore, the capacitance values of the first and third capacitive elements C11 and C13 decrease, and the capacitance values of the second and fourth capacitive elements C12 and C22 increase in the first set of capacitive elements corresponding to the first deformation portion 111 on the positive Y axis side. Similarly, the capacitance values of the fifth and seventh capacitive elements C21 and C23 decrease, and the capacitance values of the sixth and eighth capacitive elements C22 and C24 increase in the second set of capacitive elements corresponding to the second deformation portion 112 on the positive X axis side. The capacitance values of the ninth and eleventh capacitive elements C31 and C33 decrease, and the capacitance values of the tenth and twelfth capacitive elements C32 and C34 increase in the third set of capacitive elements corresponding to the first deformation portion 113 on the negative Y axis side. The capacitance values of the thirteenth and fifteenth capacitive elements C41 and C43 decrease, and the capacitance values of the fourteenth and sixteenth capacitive elements C42 and C44 increase in the fourth set of capacitive elements corresponding to the first deformation portion 114 on the negative X axis side.

Meanwhile, when a positive moment +Mz around the Z axis is applied on the second deformation body 200, each of the first deformation portions 111 to 114 is deformed inversely, and as a result, the capacitance values of the first to the sixteenth capacitive elements C11 to C44 also vary inversely.

In the present embodiment, the spring constant of the inner deformation portion 150*l* is smaller than the spring constant of the outer deformation portion 150*h* as described above. Thus, the inner deformation portion 150*l* undergoes relatively large elastic deformation and the outer deformation portion 150*h* undergoes relatively small elastic deformation by the applied force or moment. Thus, the variation amount of the capacitance values of the first, second, fifth, sixth, ninth, tenth, thirteenth and fourteenth capacitive elements C11, C12, C21, C22, C31, C32, C41 and C42 is greater than the variation amount of the capacitance values of the third, fourth, seventh, eighth, eleventh, twelfth, fifteenth and sixteenth capacitive elements C13, C14, C23, C24, C33, C34, C43 and C44. In other words, the first, second, fifth, sixth, ninth, tenth, thirteenth and fourteenth capacitive elements C11, C12, C21, C22, C31, C32, C41 and C42 are more sensitive to the applied force or moment than the third, fourth, seventh, eighth, eleventh, twelfth, fifteenth and sixteenth capacitive elements C13, C14, C23, C24, C33, C34, C43 and C44.

FIG. 15 is a table illustrating a list of changes of the capacitance values generated in the respective capacitive elements C11 to C44 when the forces and the moments +Fx, +Fy, +Fz, +Mx, +My, and +Mz are applied on the second deformation body 200. In the table, "+" indicates an increase of the capacitance value, "++" indicates a greater increase of the capacitance value, "−" indicates a decrease of the capacitance value, and "−−" indicates a greater decrease of the capacitance value. Here, "0" indicates that the capacitance value does not substantially change. In addition, the signs in the table are reversed when each direction of the forces Fx, Fy, Fz, Mx, My and Mz becomes reversed, as described above. Such an increase or decrease of the capacitance value is established in a case where each pair of the fixed electrodes and the displacement electrodes forming the first to sixteenth capacitive elements has the same separation distance and has the same effective opposing area.

Six components Fx, Fy, Fz, Mx, My and Mz of forces are expressed by the following [Expression 4] based on changes of capacitance values of capacitive elements corresponding to the inner deformation portion 150*l* among the above-described respective capacitive elements. Incidentally, the reference signs "1" and "2" appended to the end of each component are given to distinguish these components from components (these are appended with "2" at the end) to be calculated based on changes of capacitance values of capacitive elements corresponding to the outer deformation portion 150*h* which will be described later.

$Fx1=(C12+C31)-(C11+C32)$ $Fy1=(C21+C42)-(C22+C41)$ $Fz1=-(C11+C12+C21+C22+C31+C32+C41+C42)$ $Mx1=(C31+C32)-(C11+C12)$ $My1=(C21+C22)-(C41+C42)$ $Mz1=C11-C12+C21-C22+C31-C32+C41-C42$ [Expression 4]

Further, six components Fx, Fy, Fz, Mx, My and Mz of forces are expressed by the following [Expression 5] based on changes of capacitance values of capacitive elements corresponding to the outer deformation portion 150*h* among the above-described respective capacitive elements.

$Fx2=(C14+C33)-(C13+C34)$ $Fy2=(C23+C44)-(C24+C43)$ $Fz2=-(C13+C14+C23+C24+C33+C34+C43+C44)$ $Mx2=(C33+C34)-(C13+C14)$ $My2=(C23+C24)-(C43+C44)$ $Mz2=C13-C14+C23-C24+C33-C34+C43-C44$ [Expression 5]

In the force sensor according to the present embodiment, it is possible to perform malfunction determination of the force sensor by focusing on any of the above-described six forces and moments of Fx to Mz. Here, a method of performing the malfunction determination focusing on the force Fx in the X axis direction will be described. In addition, electric signals corresponding to the above-described components Fx1 and Fx2 are set as the first electric signal T1 and the second electric signal T2 before describing this malfunction determination. That is, the first electric signal T1 and the second electric signal T2 may be written down as in the following [Expression 6].

$T1=(C12+C31)-(C11+C32)$ $T2=(C14+C33)-(C13+C34)$ [Expression 6]

Even in the present embodiment, the malfunction diagnosis of the force sensor is performed by utilizing a fact that a ratio between the first and second electric signals T1 and T2 changes along with accumulation of metal fatigue in the diaphragm 150*d* as the deformation body. Here, it is also assumed that first and second electric signals in an initial state where the metal fatigue does not occur in the diaphragm 150*d* are denoted by T1*a* and T2*a*, and first and second electric signals in a state where the metal fatigue occurs (is accumulated) in the diaphragm 150*d* are denoted by T1*b* and T2*b* to distinguish from each other in the following description, which is similar to § 1.

In the present embodiment, a relationship between the magnitude of the force Fx applied on the force sensor and the first and second electric signals T1*a* and T2*a* in the initial state is the same as that of the graph illustrated in FIG. 3. In addition, a relationship between the magnitude of the force Fx applied on the force sensor and the first and second electric signals T1*b* and T2*b* in the state where the metal fatigue occurs in diaphragm 150*d* is the same as that of the graph illustrated in FIG. 4.

A principle and a method for determination on whether the force sensor according to the present embodiment described above functions normally are the same as those in § 1. That is, it is possible to understand the principle and the method of the malfunction determination of the force sensor according to the present embodiment by replacing [Expression 6] with the first electric signal T1 (T1*a*, T1*b*) and the second electric signal T2 (T2*a*, T2*b*) in § 1. Thus, a detailed description of the principle and method will be omitted herein. However, the microcomputer 47 of the detection circuit calculates the force Fx by performing difference detection based on [Expression 6] for two voltage values provided from the C/V converter 41 in the present embodiment, which is similar to <2-1>.

According to the present embodiment as described above, the ratio between the first electric signal T1 and the second electric signal T2 changes when the metal fatigue occurs in the diaphragm 150*d*, and thus, it is possible to provide the six-axis force sensor capable of detecting the occurrence of the metal fatigue based on this change and diagnosing the malfunction of the deformation body.

To be specific, the detection circuit according to the present embodiment includes the storage unit 48 that stores the ratio between the first electric signal T1$a$ and the second electric signal T2$a$ in a state where the force sensor normally functions as a reference ratio, and is configured to determine whether the force sensor functions normally by determining whether a "difference between the ratio between the first electric signal T1$b$ and the second electric signal T2$b$ and the reference ratio" falls within a predetermined range. Thus, it is possible to reliably perform the malfunction determination of the diaphragm 150$d$, that is, the malfunction determination of the force sensor based on the reference ratio set in advance.

Incidentally, when malfunction determination is performed using any of the five components other than the force Fx, the arithmetic expression of [Expression 4] relating to a specific component to be focused may be set as a first electric signal T1, and the arithmetic expression of [Expression 5] relating to the specific component may be set as a second electric signal T2 instead of the first electric signal T1 and the second electric signal T2 shown in [Expression 6].

In addition, the respective capacitive elements C11 to C44 are arranged to be symmetric on the XY plane, and thus, it is easy to perform the processing to measure the force or the moment to be detected based on the variation of the capacitance values of the capacitive elements C11 to C44 in the present embodiment.

Incidentally, four displacement electrodes are provided for each of the four first deformation portions 111 to 114 in the above description, but the present invention is not limited to such an example. For example, each one of the displacement electrodes may be provided as a common electrode for each of the four first deformation portions 111 to 114. In this case, for example, the four fixed electrodes E201 to E204, arranged to be symmetric with respect to the Y axis as described above, are provided in the first deformation portion 111, and the four capacitive elements C11 to C14 can be configured using these fixed electrodes E201 to E204 and the common electrode. This is similarly applied to the capacitive elements C21 to C44 corresponding to the remaining three first deformation portions 112 to 114. It is a matter of course that the four first deformation portions 111 to 114 may be configured using a conductive material (for example, a metal material such as stainless steel, aluminum, and titanium) such that the four first deformation portions 111 to 114 function as the common electrodes.

Alternatively, the capacitive elements C11 to C44 may be configured by configuring the fixed electrode as the common electrode and providing the four displacement electrodes to be symmetric with respect to the X axis or the Y axis in each of the four first deformation portions 111 to 114 as described above.

Further, it is conceivable to set the area of one of the fixed electrode and the displacement electrode forming each capacitive element to be larger than the area of the other electrode such that an effective opposing area of a pair of electrodes forming a capacitive element does not change even when the relative position of the displacement electrode with respect to the fixed electrode changes as a result of action of the force in each axis direction or the moment around each axis although not illustrated. As described above, this is a state where a projected image of an electrode having the smaller area is completely contained inside a surface of an electrode having the larger area when a contour of the electrode having the smaller area (for example, the displacement electrode) is projected on the surface of the electrode having the larger area (for example, the fixed electrode) to form an orthogonally projected image. If this state is maintained, the effective area of the capacitive element formed using both the electrodes becomes equal to the area of the smaller electrode and is always constant. That is, it is possible to improve the accuracy in detection of the force.

Incidentally, the displacement electrode is arranged directly in the deformation portion and the fixed electrode is arranged directly in the support body in FIG. 9. However, each electrode may be arranged in the deformation portion and the support body with an insulating substrate interposed therebetween in a case where the deformation portion and the support body are (metal of) conductors as illustrated in FIG. 6.

§ 4. Force Sensor According to Modified Example Using Strain Measurement Device Although the malfunction determination in the capacitive type force sensor has been described in § 1 to § 3, this malfunction determination method can be also employed in a force sensor of a type that measures strain generated in the deformation body (diaphragm 150$d$) by a strain measurement device such as a strain gauge instead of the capacitive element.

<4-1. Uniaxial Force Sensor>

Figure 16:
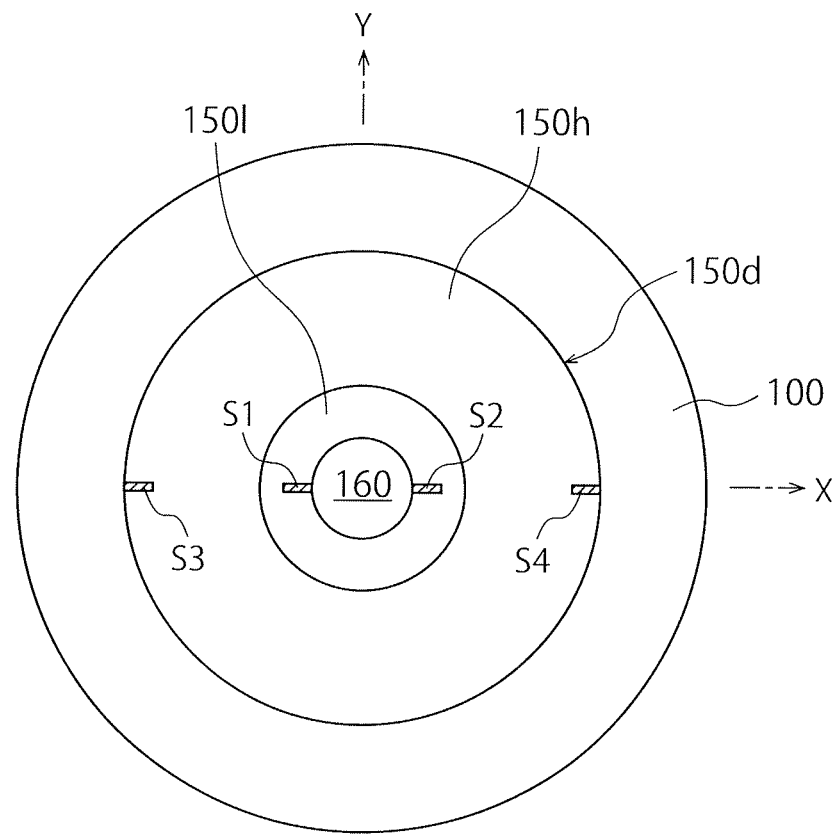
FIG. 16 is a schematic plan view illustrating an example of a strain gauge type uniaxial force sensor.
Figure 17:
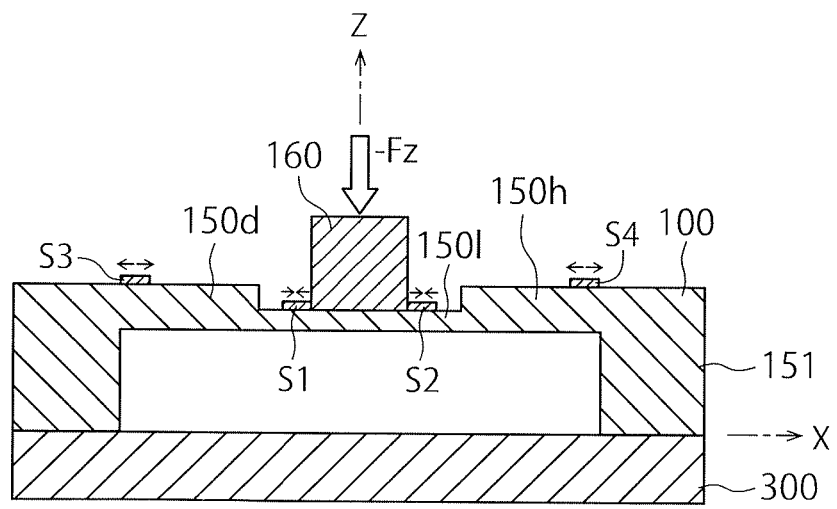
FIG. 17 is a schematic cross-sectional view illustrating the force sensor of FIG. 16 in a state where the force −Fz in the negative Z axis direction is applied on a force receiving body.
Figure 18:
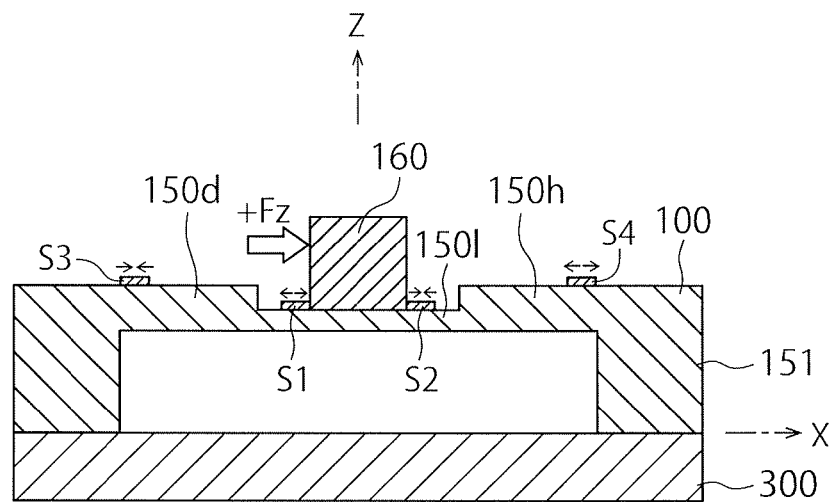
FIG. 18 is a schematic cross-sectional view illustrating the force sensor of FIG. 16 in a state where the force +Fx in the positive X axis direction is applied on the force receiving body.
Figure 19:
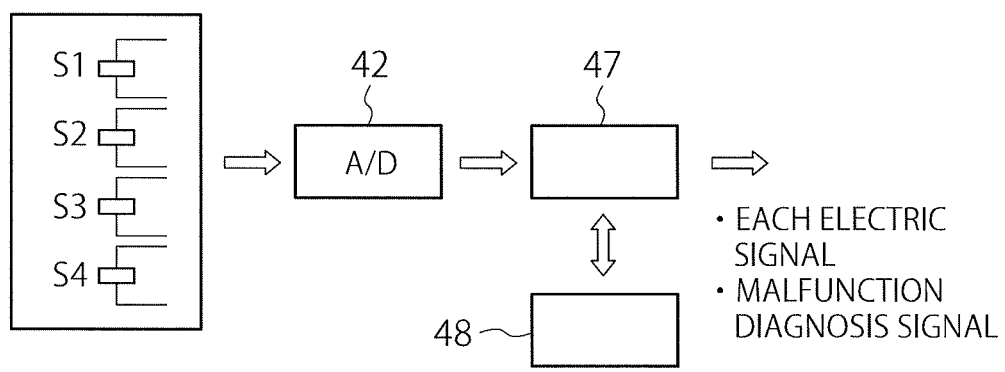
FIG. 19 is a block diagram of a detection circuit employed in the force sensor of FIG. 16.

First, malfunction determination in a uniaxial force sensor using a strain gauge will be described with reference to FIGS. 16 to 19. FIG. 16 is a schematic cross-sectional view illustrating an example of the strain gauge type uniaxial force sensor, FIG. 17 is a schematic cross-sectional view of the force sensor of FIG. 16 in a state where a force −Fz in a negative Z axis direction is applied on a force receiving body 160, and FIG. 18 is a schematic cross-sectional view illustrating the force sensor of FIG. 16 in a state where a force +Fx in a positive X axis direction is applied on the force receiving body 160. In addition, FIG. 19 is a block diagram of a detection circuit which is employed in the force sensor of FIG. 16.

The force sensor according to the present embodiment is a force sensor that detects a force Fz in the Z axis direction (vertical direction in FIG. 17) in an XYZ three-dimensional coordinate system. The force sensor according to the present embodiment includes: a planar support body 300 arranged on an XY plane; and a deformation body 100 which is arranged to oppose the support body 300 and includes a diaphragm 150$d$ as a deformation portion elastically deforamble by action of the force Fz to be detected. Here, it is assumed that the upper surface of the support body 300 is arranged to match with the XY plane for convenience of description.

A structure of the diaphragm 150$d$ of the force sensor according to the present embodiment is the same as that of the diaphragm 150$d$ of the uniaxial force sensor illustrated in § 1. Thus, constituent parts corresponding to the configuration of the force sensor in § 1 will be denoted by the same reference signs, and a detailed description thereof will be omitted in FIGS. 16 and 17.

Four strain gauges S1 to S4 are arranged along the X axis on an upper surface of the diaphragm 150$d$ according to the present embodiment as illustrated in the drawing. The two strain gauges S1 and S2 among these are arranged in the inner deformation portion 150$l$ to be symmetric with respect to the force receiving body 160, and the remaining two strain gauges S3 and S4 are arranged in the outer deformation portion 150h to be symmetric with respect to the force receiving body 160. As a result, the force sensor according to the present embodiment is configured such that the upper substrate 11, the lower substrate 12, and the capacitive elements C1 and C2 are removed from the force sensor of § 1 (see FIG. 1) and the four strain gauges S1 to S4 are arranged instead of these parts as illustrated in FIG. 16. For example, a metal foil strain gauge is employed in the present embodiment. In this metal foil strain gauge, a resistance value decreases when compressive stress is applied, and conversely, the resistance value increases when tensile stress is applied.

When a force −Fz in a negative Z axis direction is applied on the force receiving body 160 of the force sensor configured as described above, the diaphragm 150d is bent downward. As a result of this bending, a force in a compression direction is applied on the two strain gauges S1 and S2 arranged in the inner deformation portion 150l, and a force in a tensile direction is applied on the two strain gauges S3 and S4 arranged in the outer deformation portion 150h as illustrated in FIG. 17. In addition, a magnitude of strain detected by each strain gauge may be studied as follows. That is, a spring constant of the inner deformation portion 150l is smaller than a spring constant of the outer deformation portion 150h in the present embodiment as described above. Thus, the inner deformation portion 150l undergoes relatively large elastic deformation and the outer deformation portion 150h undergoes relatively small elastic deformation by the applied force Fz. Thus, the strain detected by the two strain gauges S1 and S2 arranged in the inner deformation portion 150l is greater than the strain detected by the two strain gauges S3 and S4 arranged in the outer deformation portion 150h.

In the force sensor according to the present embodiment, for example, a magnitude and a direction of the force −Fz in the negative Z axis direction applied on the force receiving body 160 can be detected based on a first electric signal T1 corresponding to a sum of measurement values of the two strain gauges S1 and S2 arranged in the inner deformation portion 150l as shown in the following [Expression 7]. Further, it is also possible to perform the detection based on a second electric signal T2 corresponding to a sum of measurement values of the two strain gauges S3 and S4 arranged in the outer deformation portion 150h. Incidentally, S1 to S4 indicate the measurement values of the strain gauges S1 to S4, respectively, in the following [Expression 7].

$$T1 = S1 + S2$$

$$T2 = S3 + S4 \qquad \text{[Expression 7]}$$

It is a matter of course that a magnitude of the first electric signal T1 and a magnitude of the second electric signal T2 when the force Fz is applied on the force receiving body 160 are different from each other as understood from arrangement positions of the strain sensors S1 to S4. Thus, appropriate correction is performed in the course of processing each signal according to the installed positions of the strain sensors S1 to S4 when the force Fz is applied on the force receiving body 160 such that a force calculated from the first electric signal T1 and a force calculated from the second electric signal T2 become the same.

The force sensor according to the present embodiment is also configured such that the malfunction diagnosis of the force sensor is performed by utilizing a fact that a ratio between the first and second electric signals T1 and T2 changes along with accumulation of metal fatigue in the diaphragm 150d as the deformation body, which is similar to the force sensor in § 1. Thus, here, it is also assumed that first and second electric signals in an initial state where the metal fatigue does not occur in the diaphragm 150d are denoted by T1a and T2a, and first and second electric signals in a state where the metal fatigue occurs (is accumulated) in the diaphragm 150d are denoted by T1b and T2b to distinguish from each other.

Herein, a relationship between an absolute value of the force −Fz and the first and second electric signals T1a and T2a in the initial state where metal fatigue does not occur in the diaphragm 150d when the force −Fz in the negative Z axis direction is applied on the force receiving body 160 is the same as that in the graph illustrated in FIG. 3. In addition, a relationship between the absolute value of the force −Fz and the first and second electric signals T1b and T2b in a state where the metal fatigue occurs in the diaphragm 150d is the same as that in the graph illustrated in FIG. 4. In the present embodiment, however, each vertical axis in FIGS. 3 and 4 is replaced with a resistance value of the strain gauge instead of a capacitance value.

A principle and a method for determination on whether the force sensor according to the present embodiment described above functions normally are the same as those in § 1. That is, it is possible to understand the principle and the method of the malfunction determination of the force sensor according to the present embodiment by replacing [Expression 7] with the first electric signal T1 (T1a, T1b) and the second electric signal T2 (T2a, T2b) in § 1. Thus, a detailed description of the principle and method will be omitted herein.

However, the detection circuit according to the present embodiment has a circuit configuration partially different from the detection circuit of the uniaxial force sensor described in § 1 since the strain gauges S1 to S4 are used instead of the capacitive element. That is, the C/V converter 41 as the detection circuit employed in the uniaxial force sensor described in § 1 is replaced with an A/V converter 42 as illustrated in FIG. 19. This A/V converter 42 enables changes of resistance values of the respective strain sensors S1 to S4 to be converted into voltage values. The other configuration is the same as that of the detection circuit in § 1 (see FIG. 5), and thus, the corresponding constituent parts will be denoted by the same reference signs, and a detailed description thereof will be omitted.

According to the present embodiment as described above, the ratio between the first electric signal T1 and the second electric signal T2 changes when the metal fatigue occurs in the diaphragm 150d, and thus, it is possible to provide the force sensor capable of detecting the occurrence of the metal fatigue based on this change and diagnosing the malfunction of the deformation body.

To be specific, the detection circuit according to the present embodiment includes the storage unit 48 that stores the ratio between the first electric signal T1a and the second electric signal T2a in a state where the force sensor normally functions as a reference ratio, and is configured to determine whether the force sensor functions normally by determining whether a "difference between the ratio between the first electric signal T1b and the second electric signal T2b and the reference ratio" falls within a predetermined range. Thus, it is possible to reliably perform the malfunction determination of the diaphragm 150d, that is, the malfunction determination of the force sensor based on the reference ratio set in advance.

In addition, the four strain sensors S1 to S4 are arranged to be symmetric with respect to the Y axis, and thus, it is easy to perform the processing to measure the force Fz to be detected based on the measurement values of the strain sensors S1 to S4 in the present embodiment.

Incidentally, the four strain gauges S1 to S4 are used in the present embodiment, but it is possible to perform the malfunction diagnosis of the force sensor while measuring the force Fz in the Z axis direction applied on the force receiving body 160 only using the two strain gauges S1 and S3. In this case, it is possible to detect the magnitude and the direction of the force Fz in the Z axis direction applied on the force receiving body 160 based on a first electric signal T1 corresponding to the measurement value of the strain gauge S1 arranged in the inner deformation portion 150*l* as shown in the following [Expression 8]. Further, it is also possible to perform the detection based on a second electric signal T2 corresponding to the measurement value of the strain gauge S3 arranged in the outer deformation portion 150*h*.

$$T1=S1$$

$$T2=S3 \qquad \text{[Expression 8]}$$

Similarly, the malfunction diagnosis of the force sensor may be performed by utilizing a fact that a ratio between the first and second electric signals T1 and T2 changes along with accumulation of metal fatigue in the diaphragm 150*d* as the deformation body even in this case.

<4-2. Biaxial Force Sensor>

It is possible to employ a strain gauge instead of a capacitive element even in a biaxial force sensor capable of measuring a force Fz applied in a Z axis direction and a force Fx applied in an X axis direction. Such a force sensor can be realized by the structure illustrated in FIG. 16 described in § 4.

For malfunction determination, either the force Fx or the force Fz applied on the force receiving body 160 may be used as described in § 2. For example, when the malfunction determination of the force sensor is performed based on the force Fx in the X axis direction applied on the force receiving body 160, the first electric signal T1 and the second electric signal T2 are set as shown in the following [Expression 9].

$$T1=S2-S1$$

$$T2=S4-S3 \qquad \text{[Expression 9]}$$

Alternatively, when the malfunction determination of the force sensor is performed based on the force Fz in the Z axis direction applied on the force receiving body 160, the first electric signal T1 and the second electric signal T2 are set as shown in the above-described [Expression 7].

Even in these cases, the malfunction diagnosis of the force sensor can be performed by utilizing a fact that a ratio between the first and second electric signals T1 and T2 changes along with accumulation of metal fatigue in the diaphragm 150*d* as the deformation body. Here, it is also assumed that first and second electric signals in an initial state where the metal fatigue does not occur in the diaphragm 150*d* are denoted by T1*a* and T2*a*, and first and second electric signals in a state where the metal fatigue occurs (is accumulated) in the diaphragm 150*d* are denoted by T1*b* and T2*b* to distinguish from each other.

A relationship between an absolute value of the applied force Fx or Fz and the first and second electric signals T1*a* and T2*a* in the initial state where metal fatigue does not occur in the diaphragm 150*d* when the force Fx in the X axis direction or the force Fz in the Z axis direction is applied on the force receiving body 160 is the same as that in the graph illustrated in FIG. 3. In addition, a relationship between the absolute value of the applied force Fx or Fz and the first and second electric signals T1*b* and T2*b* in a state where the metal fatigue occurs in the diaphragm 150*d* is the same as that in the graph illustrated in FIG. 4. However, each vertical axis in FIGS. 3 and 4 is replaced with a resistance value of the strain gauge instead of a capacitance value.

A principle and a method for determination on whether the force sensor according to the present embodiment described above functions normally are the same as those in § 1. That is, it is possible to understand the principle and the method of the malfunction determination of the force sensor according to the present embodiment by replacing [Expression 7] or [Expression 9] with the first electric signal T1 (T1*a*, T1*b*) and the second electric signal T2 (T2*a*, T2*b*) in § 1. Thus, a detailed description of the principle and method will be omitted herein. In addition, the same detection circuit (see FIG. 19) described in <4-1.> is employed as the detection circuit employed in the force sensor according to the present embodiment.

According to the present embodiment as described above, the ratio between the first electric signal T1 and the second electric signal T2 changes when the metal fatigue occurs in the diaphragm 150*d*, and thus, it is possible to provide the force sensor capable of detecting the occurrence of the metal fatigue based on this change and diagnosing the malfunction of the deformation body.

To be specific, the detection circuit according to the present embodiment includes the storage unit 48 that stores the ratio between the first electric signal T1*a* and the second electric signal T2*a* in a state where the force sensor normally functions as a reference ratio, and is configured to determine whether the force sensor functions normally by determining whether a "difference between the ratio between the first electric signal T1*b* and the second electric signal T2*b* and the reference ratio" falls within a predetermined range. Thus, it is possible to reliably perform the malfunction determination of the diaphragm 150*d*, that is, the malfunction determination of the force sensor based on the reference ratio set in advance.

In addition, the strain gauges S1 to S4 are arranged to be symmetric with respect to the Y axis, and thus, it is easy to perform the processing to calculate the force to be detected based on the measurement values of the strain gauges S1 to S4 in the present embodiment.

Incidentally, in a situation where forces or moments other than the force Fz is also applied on the force receiving body 160, these forces or moments are also detected since the force Fz is detected only by the single strain gauge according to [Expression 8]. The same description is also applied for [Expression 7] in a situation where forces or moments other than forces Fx and Fz are also applied. However, both the expressions are effective when only a force in a specific direction, for example, the force Fz, is applied on the force sensor.

Meanwhile, when detecting the force Fz, the detection is performed based on the sum of the measurement values of the two strain gauges S1 and S2 or the two strain gauges S3 and S4 (Expression 7) or the absolute value thereof (Expression 8) as shown in [Expression 7] or [Expression 8], in the present embodiment. Thus, there is a characteristic that it is likely to be affected by noise and a temperature change. It is a matter of course that it is possible to detect the force Fz with high accuracy even according to the present embodiment if the force sensor is used under constant temperature environment, for example. However, it is difficult to be affected by the noise or the temperature change according to a modified example illustrated in FIGS. 20 and 21 and it is possible to detect the force Fz with high accuracy regardless of use environment.

Figure 20:
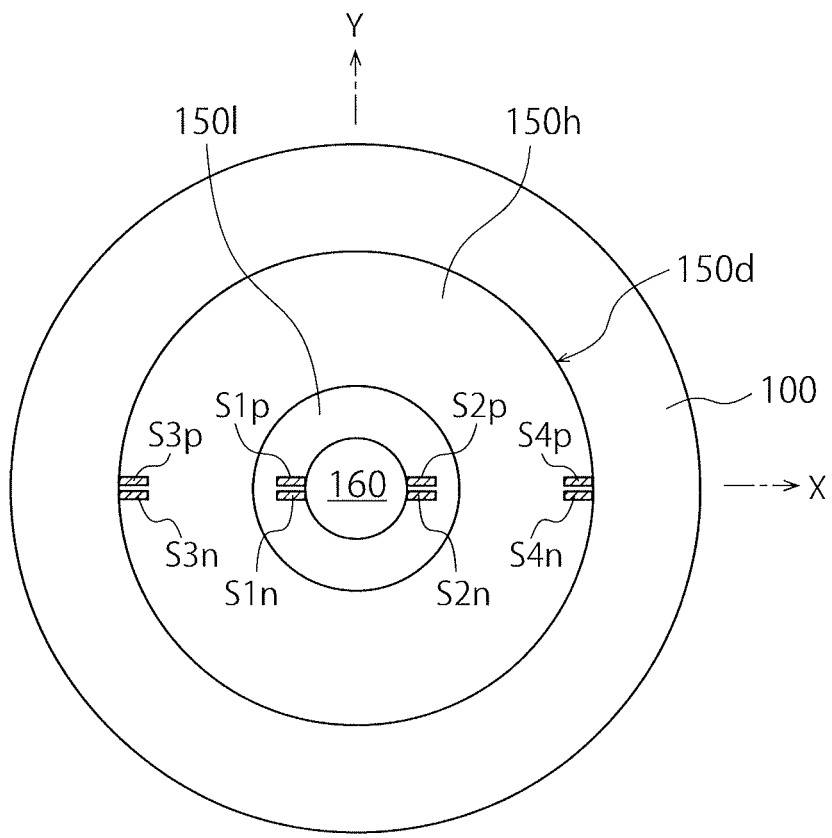
FIG. 20 is a schematic plan view illustrating a force sensor in which a semiconductor strain gauge is employed.

FIG. 20 is a schematic plan view illustrating a force sensor in which a semiconductor strain gauge is employed, and FIG. 21 is a Wheatstone bridge circuit provided in a detection circuit of the force sensor of FIG. 20. As illustrated in FIG. 20, the force sensor according to the present modified example includes eight strain gauges in total, that is, p-type semiconductor strain gauges S1p to S4p and n-type semiconductor strain gauges S1n to S4n. These strain gauges are arranged such that two of the p-type semiconductor strain gauge and the n-type semiconductor strain gauge are grouped into one set, and each set is arranged at a position at which each of the strain gauges S1 to S4 illustrated in FIG. 16 is arranged. That is, the p-type semiconductor strain gauge S1p and the n-type semiconductor strain gauge S1n are arranged instead of the strain gauge S1 of FIG. 16, the p-type semiconductor strain gauge S2p and the n-type semiconductor strain gauge S2n are arranged instead of the strain gauge S2 of FIG. 16, the p-type semiconductor strain gauge S3p and the n-type semiconductor strain gauge S3n are arranged instead of the strain gauge S3 of FIG. 16, and the p-type semiconductor strain gauge S4p and the n-type semiconductor strain gauge S4n are arranged instead of the strain gauge S4 of FIG. 16.

Incidentally, the semiconductor strain gauge is a strain gauge that utilizes a piezoresistive effect, and has a characteristic that a resistance value increases in the p-type semiconductor strain gauge and a resistance value decreases in the n-type semiconductor strain gauge when tensile stress is applied on the semiconductor strain gauge. On the other hand, when compressive stress is applied on the semiconductor strain gauge, a resistance value decreases in the p-type semiconductor strain gauge and a resistance value increases in the n-type semiconductor strain gauge.

When the forces Fz and Fx are applied on the force sensor illustrated in FIG. 20, directions of stress applied on the respective semiconductor strain gauges S1p to S4p and S1n to S4n are given as illustrated in FIGS. 17 and 18. Meanwhile, S1, S2, S3 and S4 in FIGS. 17 and 18 are read as S1p and S1n, S2p and S2n, S3p and S3n, and S4p and S4n, respectively.

Figure 21A:
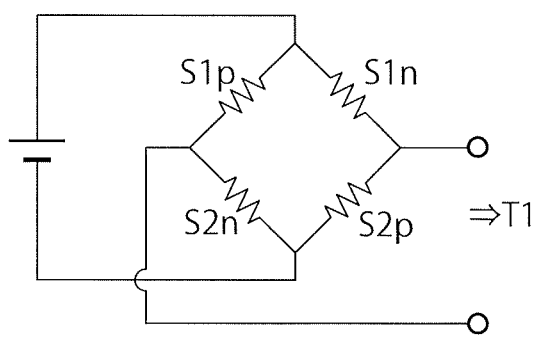
FIG. 21 is a Wheatstone bridge circuit provided in the detection circuit of the force sensor of FIG. 20.
Figure 21B:
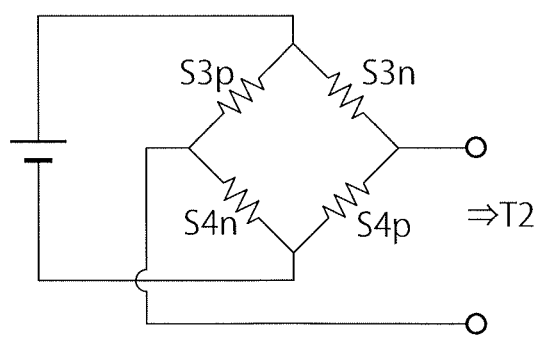

It is possible to use the Wheatstone bridge circuit illustrated in FIG. 21 in order to measure the force applied on the force receiving body 160 based on these eight semiconductor strain gauges S1p to S4p and S1n to S4n. FIG. 21(A) illustrates a Wheatstone bridge circuit configured using the four semiconductor strain gauges S1p, S2p, S1n and S2n arranged in the inner deformation portion 150l, and FIG. 21(B) illustrates a Wheatstone bridge circuit configured using the four semiconductor strain gauges S3p, S4p, S3n and S4n arranged in the outer deformation portion 150h. It is possible to measure the forces Fz and Fx applied on the force receiving body 160 by any circuit between these two circuits. In addition, it is possible to measure the forces Fz and Fx with high accuracy while excluding the influence of the temperature change due to characteristics of the Wheatstone bridge circuit.

Further, an electric signal output from the circuit illustrated in FIG. 21(A) is set as a first electric signal T1, an electric signal output from the circuit illustrated in FIG. 21(B) is set as a second electric signal T2, and it is possible to determine whether the force sensor according to the present modified example functions normally based on a change of a ratio between these two electric signals T1 and T2. This determination principle is the same as described above, and thus, a detailed description thereof will be omitted here.

<4-3. Six-Axis Force Sensor>

Figure 22:
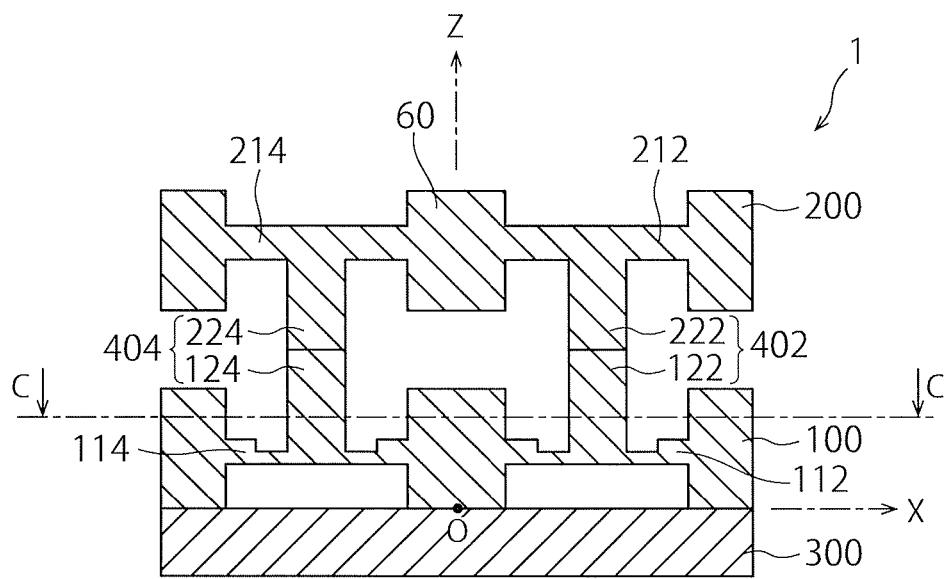
FIG. 22 is a schematic cross-sectional view illustrating an example of a strain gauge type six-axis force sensor.
Figure 23:
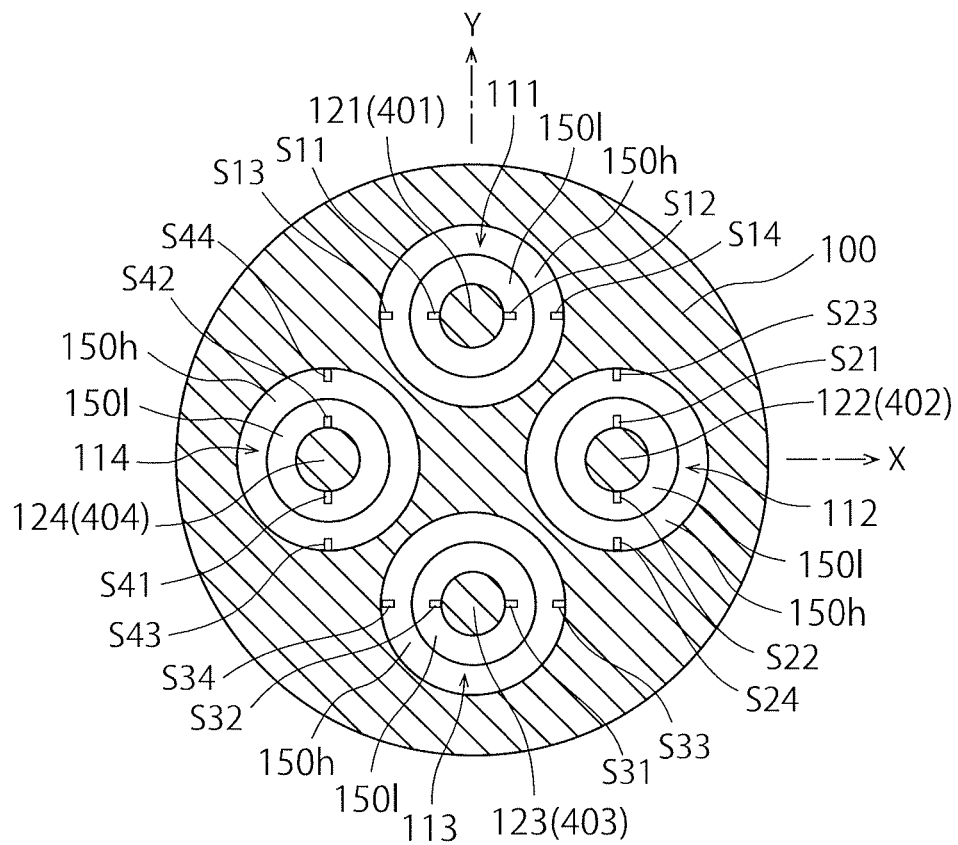
FIG. 23 is a schematic plan view illustrating one of deformation portions provided in the force sensor of FIG. 22.

It is also possible to apply a strain gauge, instead of a capacitive element, in the six-axis force sensor described in § 3. FIG. 22 is a schematic cross-sectional view illustrating an example of a strain gauge type six-axis force sensor, and FIG. 23 is a schematic plan view illustrating one of deformation portions provided in the force sensor of FIG. 22.

As illustrated in FIG. 22, the force sensor according to the present embodiment has substantially the same structure as the six-axis force sensor described in § 3. However, no capacitive element is provided in the four deformation portions, and instead, four sets of strain gauges are provided on upper surfaces (surfaces on the upper side in FIG. 22) of the respective deformation portions as illustrated in FIG. 23. To be specific, a first set of strain gauges includes a first strain gauge S11 on a negative X axis side and a second strain gauge S12 on a positive X axis side, which are arranged to be symmetric on the inner deformation portion 150l with a Y axis interposed therebetween, and a third strain gauge S13 on the negative X axis side and a fourth strain gauge S14 on the positive X axis side, which are arranged to be symmetric on the outer deformation portion 150h with the Y axis interposed therebetween on an upper surface of the first deformation portion 111 on the positive Y axis side as illustrated in the drawing.

In addition, three sets, that is, a second set to a fourth set, of strain gauges are additionally provided in the force sensor according to the present embodiment. The second set of strain gauges is also configured using four strain gauges (fifth to eighth strain gauges S21 to S24). The second set of strain gauges is arranged by rotating the above-described first set of strain gauges S11 to S14 clockwise by 90° around an origin. That is, the fifth strain gauge S21 is arranged at a position obtained by rotating the first strain gauge S11 clockwise by 90° around the origin, the sixth strain gauge S22 is arranged at a position obtained by rotating the second strain gauge S12 clockwise by 90° around the origin, the seventh strain gauge S23 is arranged at a position obtained by rotating the third strain gauge S13 clockwise by 90° around the origin, and the eighth strain gauge S24 is arranged at a position obtained by rotating the fourth strain gauge S14 clockwise by 90° around the origin.

Similarly, the third set of strain gauges is also configured using four strain gauges (ninth to twelfth strain gauges S31 to S34), and are arranged at positions obtained by rotating the above-described fifth to eighth strain gauges S21 to S24 clockwise by 90° around the origin. Further, the fourth set of strain gauges is also configured using four strain gauges (thirteenth to sixteenth strain gauges S41 to S44), and are arranged at positions obtained by rotating the above-described ninth to twelfth strain gauges S31 to S34 clockwise by 90° around the origin.

As a result, the first set of four strain gauges S11 to S14 and the third set of the four strain gauges S31 to S34 are arranged to be symmetric with respect to the origin, and the second set of four strain gauges S21 to S24 and the fourth set of four strain gauges S41 to S44 are arranged to be symmetric with respect to the origin. Further, each set of strain gauges is arranged such that two strain gauges arranged in the inner deformation portion 150l and two strain gauges arranged in the outer deformation portion 150h are symmetric with respect to each of the connection members 401 to 404.

Next, each state of the force sensor when forces Fx, Fy and Fz in the respective axis directions of the X, Y and Z axes, and moments Mx, My and Mz around the respective axes are applied on the second deformation body 200 is the same as described in § 3, and thus, a description thereof will be omitted here.

In the present embodiment, a spring constant of the inner deformation portion 150*l* is smaller than a spring constant of the outer deformation portion 150*h*. Thus, relatively large strain occurs in the inner deformation portion 150*l*, and relatively small strain occurs in the outer deformation portion 150*h* by the applied force or moment. Thus, a measurement value of the strain gauge arranged in the inner deformation portion 150*l* is larger than a measurement value of the strain gauge arranged in the outer deformation portion 150*h*. In other words, the strain gauge arranged in the inner deformation portion 150*l* is more sensitive to the force or moment applied on the second deformation body 200 than the strain gauge arranged in the outer deformation portion 150*h*.

FIG. 24 is a table illustrating a list of trends of measurement values of the respective strain gauges S11 to S48 when the force and the moment +Fx, +Fy, +Fz, +Mx, +My and +Mz in the positive direction are applied on the force sensor of FIG. 22. In the table, "+" indicates that a measurement value is positive, "++" indicates that a measurement value is a larger positive value, "−" Indicates that a measurement value is a negative value, and "−−" indicates that a measurement value is a larger negative value, which is similar to the table illustrated in FIG. 15. In addition, "0" indicates that substantially no strain occurs. The arrangement of the strain gauges S11 to S44 according to the present embodiment corresponds to the arrangement of the capacitive elements in the embodiment (capacitive type six-axis force sensor) described in § 3. Incidentally, signs in the table are also reversed in the present embodiment when directions of the respective forces and moments Fx, Fy, Fz, Mx, My and Mz are reversed (negative directions).

Six components Fx, Fy, Fz, Mx, My and Mz of forces are expressed by the following [Expression 10] based on measurement values of the strain gauges arranged in the inner deformation portion 150*l* among the above-described strain gauges. Incidentally, the reference signs "1" and "2" appended to the end of each component are given to distinguish these components from components (these are appended with "2" at the end) to be calculated based on measurement values of the strain gauges arranged in the outer deformation portion 150*h*, which will be described later, similarly to [Expression 4] and [Expression 5] described in § 3. In addition, S11 to S44 represent the measurement values of the strain gauges S11 to S44, respectively, in the following expression.

$Fx1=-(S12+S31)+(S11+S32)$ $Fy1=-(S21+S42)+(S22+S41)$ $Fz1=S11+S12+S21+S22+S31+S32+S41+S42$ $Mx1=-(S31+S32)+(S11+S12)$ $My1=-(S21+S22)+(S41+S42)$ $Mz1=(S12+S22+S32+S42)-(S11+S21+S31+S41)$ [Expression 10]

Further, six components Fx, Fy, Fz, Mx, My and Mz of forces are expressed by the following [Expression 11] based on the measurement values of the strain gauges arranged in the outer deformation portion 150*h*.

$Fx2=(S14+S33)-(S13+S34)$ $Fy2=(S23+S44)-(S24+S43)$ $Fz2=S13+S14+S23+S24+S33+S34+S43+S44$ $Mx2=-(S33+S34)+(S13+S14)$ $My2=(S23+S24)-(S43+S44)$ $Mz2=(S13+S23+S33+S43)-(S14+S24+S34+S44)$ [Expression 11]

In the force sensor according to the present embodiment, it is possible to perform malfunction determination of the force sensor by focusing on any of the above-described six forces and moments of Fx to Mz. That is, the attention is paid to a ratio of electric signals corresponding to Fx1 and Fx2 described above when the malfunction determination is performed by focusing on the force Fx, for example, as described in § 3. That is, a first electric signal T1 and a second electric signal T2 are defined as shown in the following [Expression 12], a difference between a ratio between the T1 and T2 and a predetermined reference ratio is evaluated. Further, when the difference does not exist within a predetermined range, it is determined that the force sensor does not function normally (malfunctions). A specific method of malfunction determination is the same as in § 3, and thus, a detailed description thereof will be omitted.

$T1=-(S12+S31)+(S11+S32)$ $T2=(S14+S33)-(S13+S34)$ [Expression 12]

According to the present embodiment as described above, the ratio between the first electric signal T1 and the second electric signal T2 changes when the metal fatigue occurs in the first deformation portions 111 to 114, and thus, it is possible to provide the six-axis force sensor capable of detecting the occurrence of the metal fatigue based on this change and diagnosing the malfunction of the deformation body.

Incidentally, four strain gauges are arranged in each of the four first deformation portions 111 to 114 in the present embodiment, but eight strain gauges may be arranged in each of the four first deformation portions 111 to 114 in order to further improve the measurement accuracy. That is, eight strain gauges in total including four strain gauges which are arranged in a cross shape on the inner deformation portion 150*l* two by two along the X axis direction and the Y axis direction, respectively, with the connection member 401 interposed therebetween, and four strain gauges which are arranged in a cross shape on the outer deformation portion 150*h* two by two along the X axis direction and the Y axis direction, respectively, with the connection member 401 interposed therebetween may be arranged on an upper surface of the first deformation portion 111 on the positive Y axis side. In this case, eight strain gauges are arranged in the same manner in each of the remaining three first deformation portions 112 to 114, and as a result, sixteen strain gauges are added in the above-described six-axis force sensor. According to this method, the 32 strain gauges are arranged, and the Wheatstone bridge circuit may be configured to detect the force in each axis direction and the moment around each axis using these strain gauges.

<4-4. Modified Example of Force Sensors of <4-1> to <4-3>>

Figure 25:
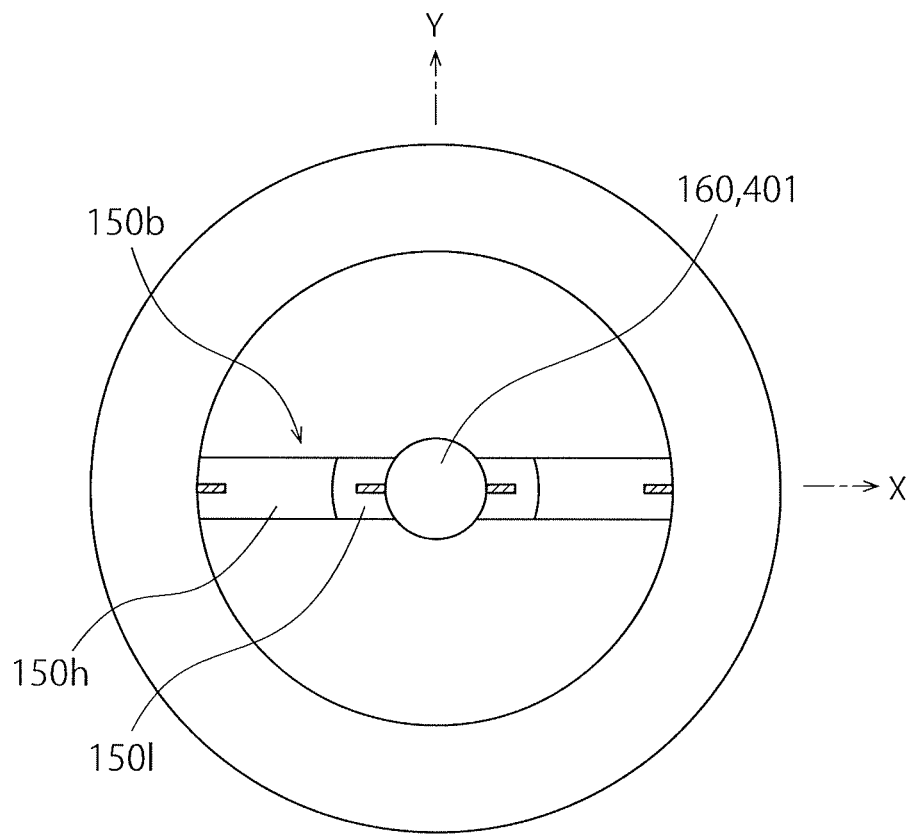
FIG. 25 is a schematic plan view illustrating an example of a deformation body in which a beam-shaped deformation portion is employed.
Figure 26:
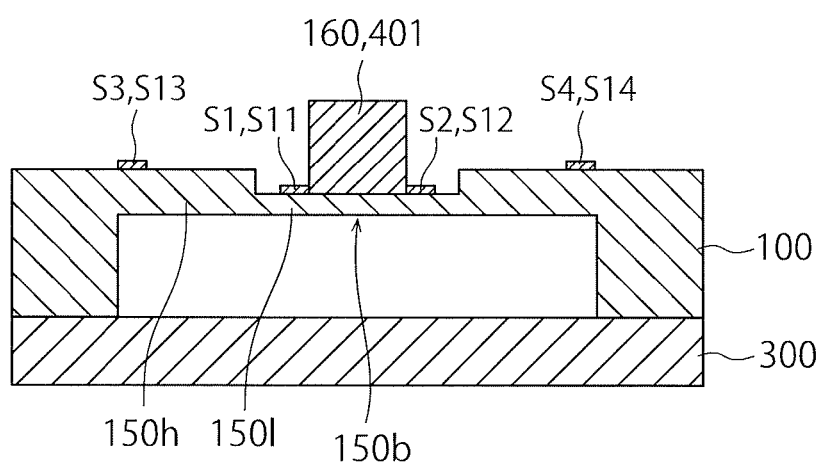
FIG. 26 is a schematic cross-sectional view illustrating an example of the deformation body in which the beam-shaped deformation portion is employed.

In any of the embodiments in <4-1> to <4-3>, a beam 150*b* can be employed, instead of the diaphragm 150*d*, as the deformation portion in which the strain sensor is arranged. FIG. 25 is a schematic plan view illustrating an example of a deformation body in which a beam-shaped deformation portion is employed, and FIG. 26 is a schematic cross-sectional view of FIG. 25. As illustrated in FIG. 25, a beam having a width sufficient for arrangement of the strain sensor is arranged so as to be a diameter of the deformation portion in this beam-shaped deformation portion. This deformation portion has a plate shape as a whole, but has a smaller thickness in an inner region 150*l* positioned in the vicinity of a connection part with the connection portion 401 than in an outer region 150*h* positioned at an outer periphery of the inner region 150*l* as illustrated in FIG. 26. Accordingly, a spring constant of the inner region 150*l* is set to be smaller than a spring constant of the outer region 150*h*.

It is a matter of course that a width of the inner region 150*l* may be made different instead of making the thickness of the inner region 150*l* different. That is, the spring constant of the inner region 150*l* may be set to be smaller than the spring constant of the outer region 150*h* by configuring the inner region 150*l* to be relatively narrow and the outer region 150*h* to be relatively wide.

In addition, an optical strain measurement device can be employed instead of the strain sensor in any of the embodiments <4-1> to <4-3>. As an example, it is possible to consider a method of irradiating a measurement target part with light (laser light) using a position in which the strain gauge is arranged in <4-1> to <4-3> as the measurement target part, and measuring strain of each measurement target part based on a phase difference between the emitted light and reflected light from the measurement target part. Even in this case, it is possible to perform malfunction determination of the force sensor using the same principle as that of the malfunction determination based on the measurement value obtained by the strain gauge.

§ 5. Other Modified Examples

The respective force sensors described above have been described assuming that the diaphragm 150*d* is made of metal and the substrate and the displacement electrode are arranged on the lower surface (surface on the support body 300 side) of the diaphragm 150*d*, but the invention is not limited to such a mode. For example, if the diaphragm 150*d* has conductivity, the diaphragm 150*d* itself may be used as a common electrode. In this case, however, stray capacitances are formed in various unintended parts, and thus, a noise component is easily mixed in a detection value of a capacitance so that there is a possibility that detection accuracy may decrease. Accordingly, it is preferable to provide a displacement electrode independently for each capacitive element in the case of a force sensor in which highly accurate detection is required.

Figure 27:
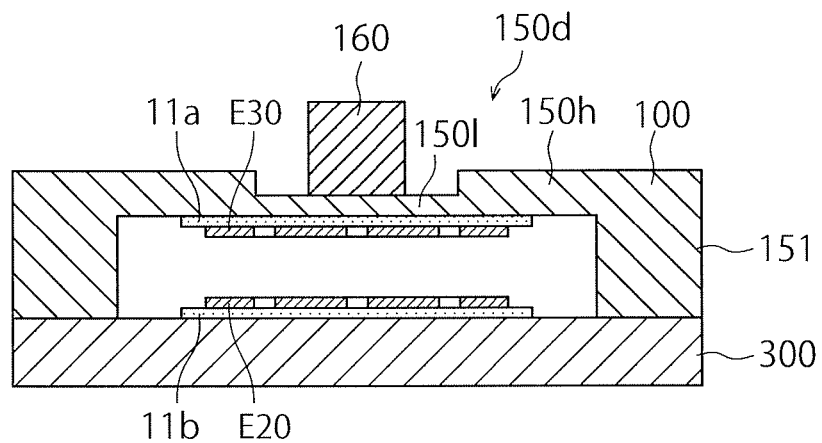
FIG. 27 is a schematic cross-sectional view of a force sensor including a diaphragm made of plastic.

Alternatively, it is also possible to configure the diaphragm 150*d* using an insulator having flexibility such as plastic. FIG. 27 is a schematic cross-sectional view of a force sensor including the plastic diaphragm 150*d*. As illustrated in FIG. 27, a flexible print circuit (FPC) or the like may be bonded to a lower surface (surface on the lower side in FIG. 27) of the diaphragm 150*d*, and a displacement electrode may be provided on a lower surface of the flexible print circuit. However, it is necessary for the FPC to be bonded to the diaphragm 150*d* in the mode of not hindering elastic deformation of the diaphragm 150*d*. If the displacement electrode can be independently provided for each capacitive element in this manner, there is a low risk of deterioration in detection accuracy as described above, and further, a degree of freedom as a circuit increases, which is advantageous from the viewpoint of circuit design. Since the above-described ratio between the first electric signal T1 and the second electric signal T2 changes along with repetitive use even in the diaphragm 150*d* configured using plastic, the principle of malfunction determination that has been described so far can be employed even in the force sensor having this diaphragm 150*d*. It is a matter of course that an upper substrate 11*a* and a lower substrate 11*b* may be configured as insulators and electrodes may be arranged on upper surfaces of the substrates when the diaphragm 150*d* is made of metal.

Figure 28:
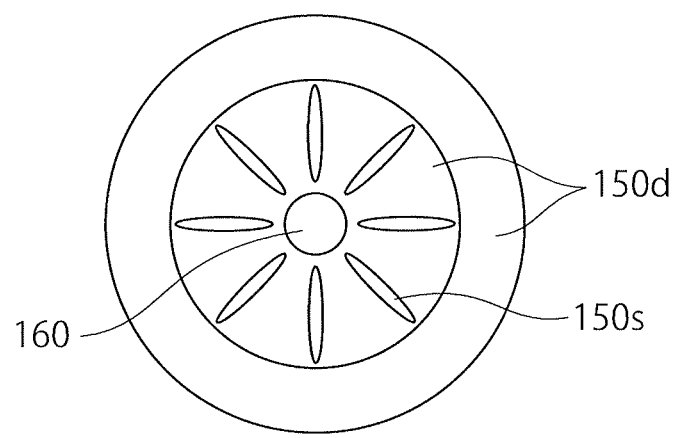
FIG. 28 is a schematic plan view illustrating a deformation body 100 including a diaphragm provided with a slit in an inner deformation portion.

In addition, the thickness is set to be different between the inner deformation portion 150*l* and the thickness of the outer deformation portion 150*h* in order to make the spring constant different between the inner deformation portion 150*l* and the outer deformation portion 150*h* of the diaphragm 150*d*. However, it is also possible to make the spring constant of the inner deformation portion 150*l* different from (make the spring constant thereof smaller than) that of the outer deformation portion 150*h* by providing a slit 150*s* radially in the inner deformation portion 150*l*. FIG. 28 is a schematic plan view illustrating a deformation body 100 including a diaphragm 150*d* provided with a slit 150*s* in the inner deformation portion 150*l*. The inner deformation portion 150*l* is relatively more easily deformed than the outer deformation portion 150*h* due to this slit 150*s*, and it is possible to cause the above-described difference in the spring constant. It is a matter of course that this method of decreasing the spring constant by providing the slit 150*s* can be also employed in the force sensor (see FIG. 25) of the type including the beam-shaped deformation portion.

Further, the force sensor according to each of the above-described embodiments has been described regarding the case where the spring constant of the inner deformation portion 150*l* is smaller than the spring constant of the outer deformation portion 150*h*. Conversely, however, it may be configured such that the spring constant of the inner deformation portion 150*l* is larger than the spring constant of the outer deformation portion 150*h*. Even in this case, the above-described principle can be employed as the principle of malfunction determination of the force sensor. In this case, however, it is necessary to take caution since each inclination of T1*a* and T1*b* illustrated in FIG. 3 and each inclination of T2*a* and T2*b* illustrated in FIG. 4 changes.

§ 6. Force Sensor with Wave-Type Detection Portion Proposed by Present Applicant <6-1. Overall Configuration of Basic Structural Part>

Next, a description will be given regarding a new force sensor obtained by providing the malfunction determination function according to the present invention to a force sensor proposed in International Patent Application No. PCT/JP2015/052784 filed by the present applicant. Prior to this description, first, an overview of a basic structural part (hereinafter, referred to as a prior application force sensor) of the force sensor proposed in the international patent application will be described with reference to FIGS. 29 to 37.

Figure 29:
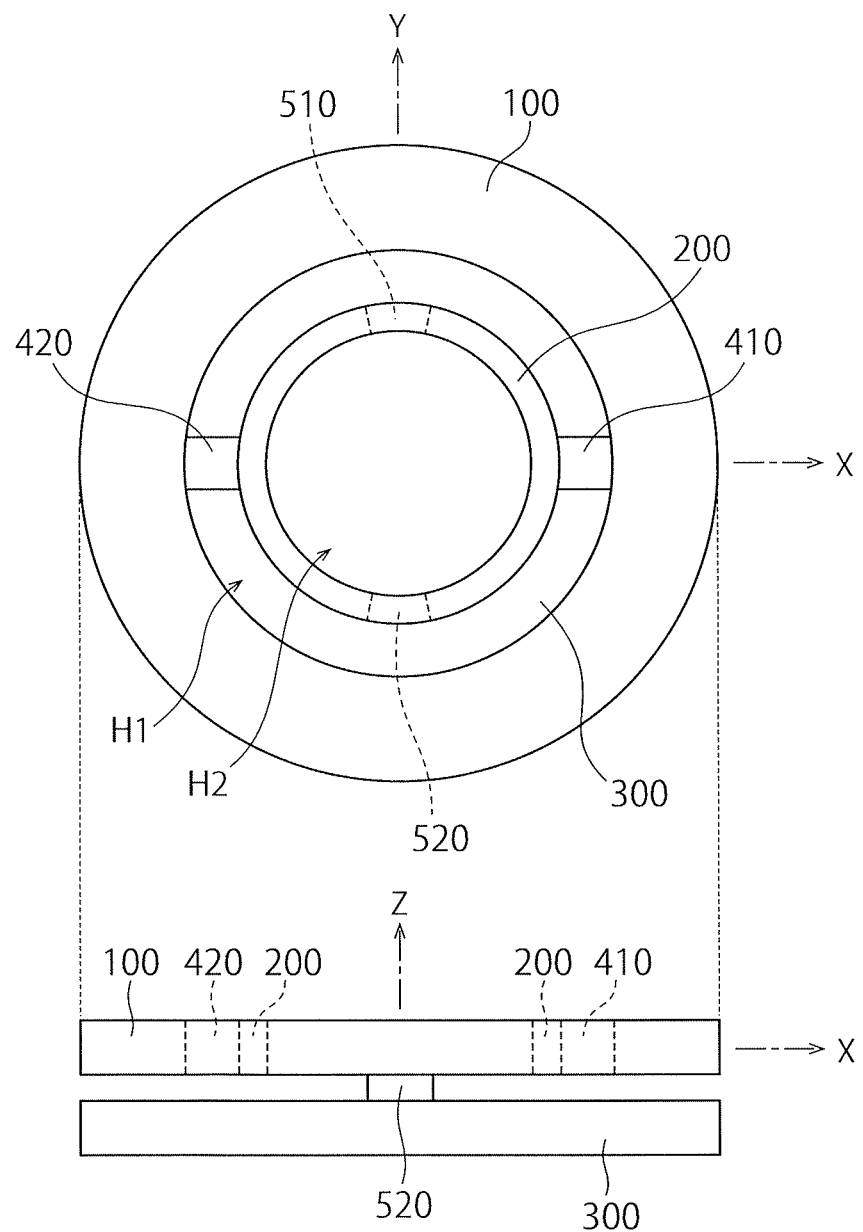
FIG. 29 is a top view (an upper view) and a side view (a lower view) of a basic structural part of a force sensor of the prior application.

FIG. 29 is a top view (an upper view) and a side view (a lower view) of the basic structural part of the prior application force sensor. In the top view, an X axis is arranged in a rightward direction of the drawing, a Y axis is arranged in an upward direction of the drawing, and a front direction perpendicular to the sheet plane a Z axis direction. On the other hand, in the side view, an X axis is arranged in a rightward direction of the drawing, a Z axis is arranged in an upward direction of the drawing, and a depth direction perpendicular to the sheet plane is a Y axis direction. As illustrated in the drawing, this basic structural part is configured of a force receiving body 100, a detection ring 200, a support substrate 300, connection members 410 and 420, and fixing members 510 and 520.

The force receiving body 100 is a ring having a circular and planer (washer) shape that is arranged on an XY plane such that the Z axis becomes a center axis, and both an outer circumferential surface and an inner circumferential surface form a cylindrical surface. The force receiving body 100 serves a role of receiving action of a force or a moment to be detected and transmitting the received force or moment to the detection ring 200.

Meanwhile, the detection ring 200 is a member obtained by performing a partial material removing process on an annular member that is obtained by forming a through opening portion H2 having a concentric disc shape with a smaller diameter at a central portion of a disc arranged with the Z axis as a central axis thereof. An outer shape of the force receiving body 100 is illustrated as a simple disc herein for convenience of description although including four wave-shaped detection portions D1 to D4 as illustrated in FIG. 36, which will be described later. In the example illustrated herein, the detection ring 200 is arranged at an inner side of the force receiving body 100. That is, the force receiving body 100 is referred to as an outer ring arranged on the XY plane, and the detection ring 200 is referred to as an inner ring arranged on the XY plane. Here, a characteristic of the detection ring 200 is that elastic deformation occurs by action of the force or the moment to be detected.

The connection members 410 and 420 are members configured to connect the force receiving body 100 and the detection ring 200. In the illustrated example, the connection member 410 connects an inner circumferential surface of the force receiving body 100 and an outer circumferential surface of the detection ring 200 at a position along a positive X axis region, and the connection member 420 connects the inner circumferential surface of the force receiving body 100 and the outer circumferential surface of the detection ring 200 at a position along a negative X axis region. Accordingly, a void H1 is secured between the force receiving body 100 and the detection ring 200 as illustrated in the drawing, and a void H2 is secured at an inner side of the detection ring 200 as illustrated in the drawing.

As apparent when viewing the side view illustrated in the lower part of FIG. 29, the force receiving body 100 and the detection ring 200 have the same thickness (dimension in the Z axis direction) in this example, and the detection ring 200 is in the state of being completely hidden at the inner side of the force receiving body 100 in the side view. Both the rings do not necessarily have the same thickness, but it is preferable to set both the rings to have the same thickness in order to realize a thin sensor (a sensor whose dimension in the Z axis direction is as small as possible).

The support substrate 300 is a disc-shaped substrate whose diameter is equal to an outer diameter of the force receiving body 100, has an upper surface parallel to the XY plane, and is arranged below the force receiving body 100 and the detection ring 200 with a predetermined interval. The fixing members 510 and 520 are members configured to fix the detection ring 200 to the support substrate 300. Although the fixing member 510 is hidden behind the fixing member 520 and does not appear in the side view, the fixing members 510 and 520 serve a role of connecting the lower surface of the detection ring 200 and the upper surface of the support substrate 300. As indicated by broken lines in the top view, the fixing members 510 and 520 are arranged at positions along the Y axis.

Figure 30:
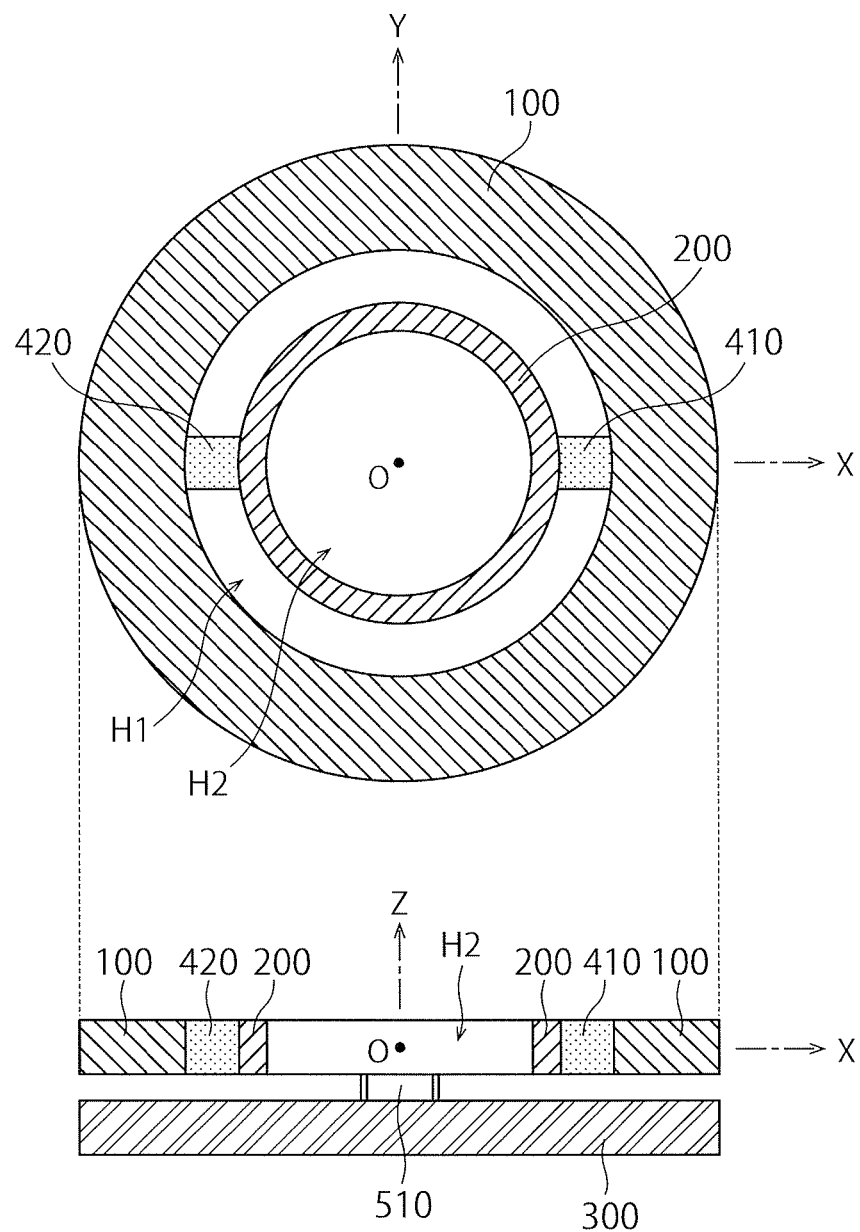
FIG. 30 is a transverse cross-sectional view (an upper view) of the basic structural part illustrated in FIG. 29 cut along an XY plane and a longitudinal cross-sectional view (a lower view) cut along an XZ plane.

FIG. 30 is a transverse cross-sectional view (an upper view) of the basic structural part illustrated in FIG. 29 cut along the XY plane and a longitudinal cross-sectional view (a lower view) cut along an XZ plane. An origin O of an XYZ three-dimensional orthogonal coordinate system is illustrated at the center of the transverse cross-sectional view cut along the XY plane. This FIG. 30 clearly illustrates a state where the detection ring 200 is connected to the force receiving body 100 via the connection members 410 and 420 arranged along the X axis at two right and left locations.

Figure 31:
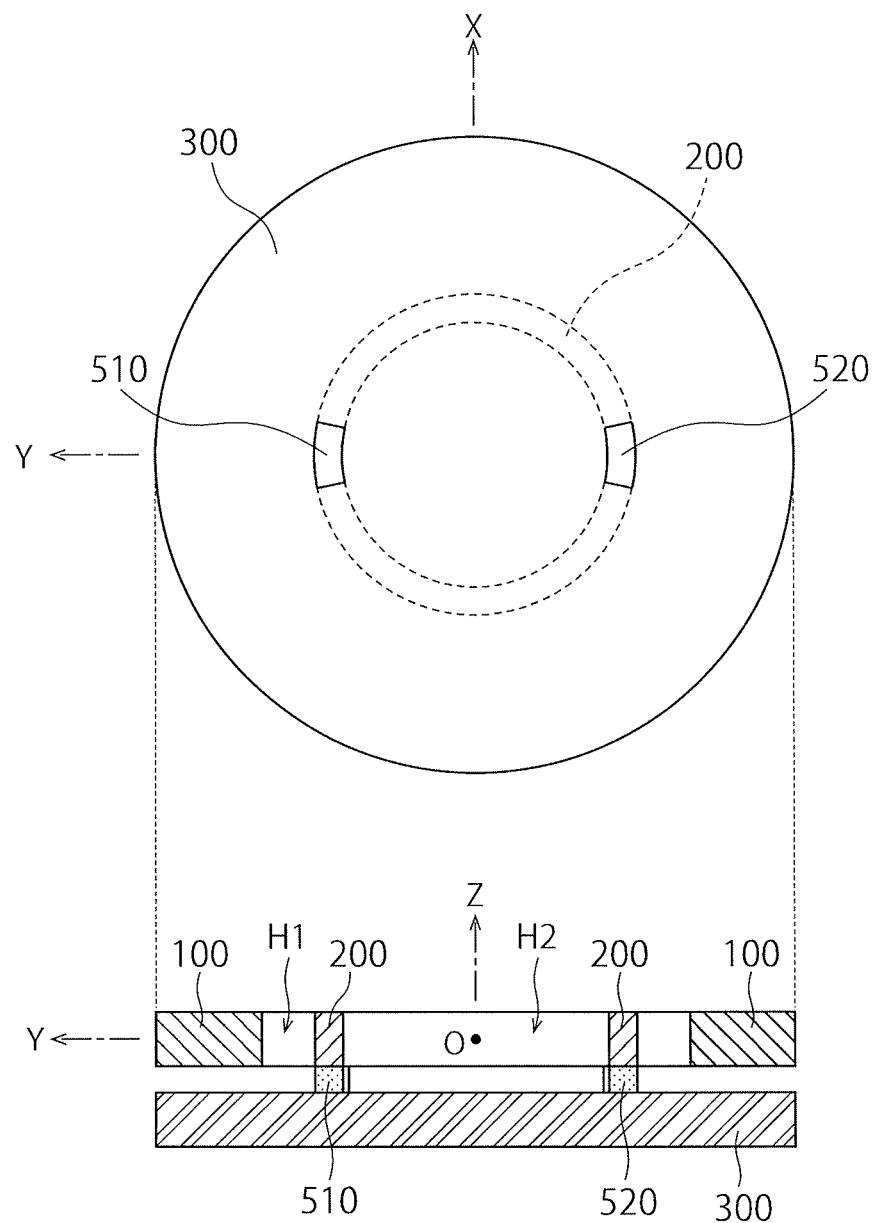
FIG. 31 is a top view (an upper view) of a support substrate and a fixing member of the basic structural part illustrated in FIG. 29 and a longitudinal cross-sectional view (a lower view) of the basic structural part cut along a YZ plane.

FIG. 31 is a top view (an upper view) of the support substrate 300 and the fixing members 510 and 520 of the basic structural part illustrated in FIG. 29 and a longitudinal cross-sectional view (a lower view) of the basic structural part cut along a YZ plane. The top view of FIG. 31 corresponds to a state where the top view of FIG. 29 is rotated counterclockwise by 90°, and the Y axis is a leftward direction. In addition, a position of the detection ring 200 is indicated by a broken line in the top view of FIG. 31. Meanwhile, the longitudinal cross-sectional view of FIG. 31 clearly illustrates the state where the detection ring 200 is fixed to the upper side of the support substrate 300 by the fixing members 510 and 520.

When forces in various directions are applied on the force receiving body 100 in a state where the support substrate 300 is fixed, the detection ring 200 is deformed in a mode in response to the applied force as will be described later. The prior application force sensor performs detection of the applied force by electrically detecting such a deformation mode. Accordingly, the ease of elastic deformation of the detection ring 200 is a parameter which determines detection sensitivity of a sensor. When the detection ring 200 which is liable to be elastically deformed is used, it is possible to realize a highly sensitive sensor capable of detection even when a minute force is applied, but a maximum value of a detectable force is suppressed. Conversely, when the detection ring 200 which is hardly elastically deformed is used, it is possible to increase the maximum value of the detectable force, but the sensitivity is lowered so that it is difficult to detect the minute force.

Meanwhile, the force receiving body 100 and the support substrate 300 do not need to be members elastically deformable in terms of the principle of force detection. Rather, it is preferable that the force receiving body 100 and the support substrate 300 be completely rigid bodies in order to make the applied force contribute 100% to the deformation of the detection ring 200. In the illustrated example, a reason of using the ring-shaped structural body having the void H1 at the center as the force receiving body 100 is not to facilitate the elastic deformation but to accommodate the detection ring 200 inside the void. When the configuration in which the ring-shaped force receiving body 100 is arranged at the outer side of the detection ring 200 as in the illustrated example, it is possible to reduce the thickness of the basic structural part, and to realize the thinner force sensor.

In practical use, as the materials of the force receiving body 100, the detection ring 200, and the support substrate 300, it is sufficient to use a synthetic resin such as plastic as long as an insulating material is used, and it is sufficient to use metal such as stainless steel and aluminum as long as a conductive material is used. It is a matter of course that the insulating material and the conductive material may be used in combination.

Subsequently, any kind of phenomenon that occurs in this basic structural part will be studied when a force in each coordinate axis direction and a moment around each coordinate axis are applied on the force receiving body 100 in the state where the support substrate 300 is fixed will be studied.

As described above, it is preferable that the force receiving body 100 and the support substrate 300 be the completely rigid bodies, in principle, in order to make the applied force contribute 100% to the deformation of the detection ring 200. In practice, however, the force receiving body 100 and the support substrate 300 do not become the completely rigid bodies when the basic structural part is configured using resin or metal, and strictly speaking, the force receiving body 100 and the support substrate 300 also slightly undergo elastic deformation of a force or a moment is applied on the force receiving body 100. However, the elastic deformation occurring in the force receiving body 100 and the support substrate 300 can be ignored as long as it is the slight elastic deformation as compared to the elastic deformation occurring in the detection ring 200, and there is no problem even if the force receiving body 100 and the support substrate 300 are considered as the substantially rigid bodies. Therefore, the description is given in the present application assuming that the force receiving body 100 and the support substrate 300 are the rigid bodies, and elastic deformation caused by the force or the moment occurs exclusively in the detection ring 200.

Figure 32:
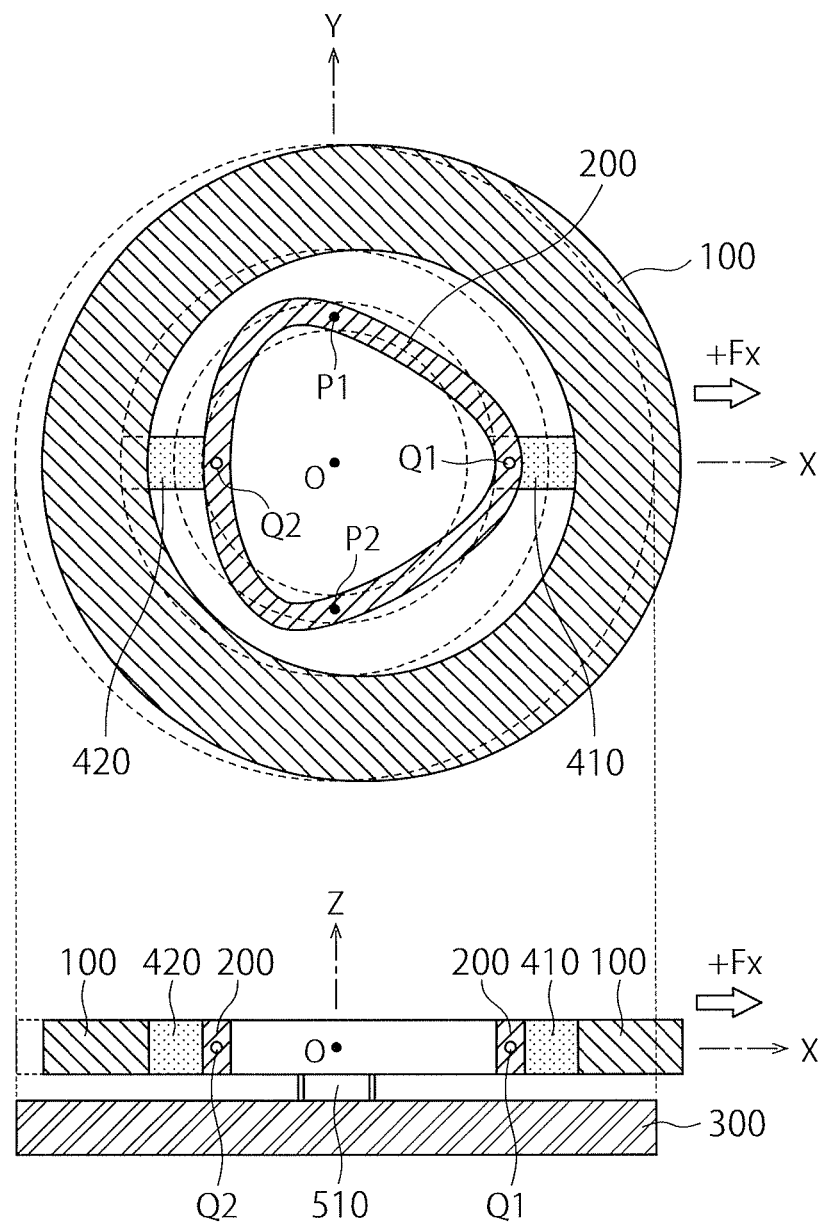
FIG. 32 is a transverse cross-sectional view (an upper view) on the XY plane illustrating a deformation state when the force +Fx in the positive X axis direction is applied on a force receiving body of the basic structural part illustrated in FIG. 29 and a longitudinal cross-sectional view (a lower view) on the XZ plane.

First, a description will be given regarding any kind of change that occurs in this basic structural part when the force in the X axis direction is applied on the force receiving body 100 in the state where the support substrate 300 is fixed. FIG. 32 is a transverse cross-sectional view (an upper view) on the XY plane illustrating a deformation state when a force +Fx in a positive X axis direction is applied on the force receiving body 100 of the basic structural part illustrated in FIG. 29 and a longitudinal cross-sectional view (a lower view) on the XZ plane. The support substrate 300 is fixed and immovable, but the force receiving body 100 moves in the rightward direction in the drawing by the force +Fx in the positive X axis direction. As a result, the detection ring 200 is deformed as illustrated in the drawing. Incidentally, a broken line illustrated in the drawing indicates a position of each ring before being moved or deformed.

Here, considered are two fixing points P1 and P2 (indicated by black circles) and two action points Q1 and Q2 (indicated by white circles) for convenience of description of this deformation mode. The fixing points P1 and P2 are points defined on the Y axis and correspond to positions of the fixing members 510 and 520 illustrated in FIG. 29. That is, the detection ring 200 is fixed to the support substrate 300 by the fixing members 510 and 520 at positions of these fixing points P1 and P2. On the other hand, the action points Q1 and Q2 are points defined on the X axis, and the detection ring 200 is connected to the force receiving body 100 by the connection members 410 and 420 at positions of these action points Q1 and Q2.

In this manner, the action point is the position to which the connection member is connected, and the fixing point is the position to which the fixing member is connected in the prior application force sensor. Further, an important fact is that the action point and the fixing point are arranged at different positions. In the example illustrated in FIG. 32, the fixing points P1 and P2 and the action points Q1 and Q2 are arranged at different positions on the XY plane. This is because the detection ring 200 is not elastically deformed when the action point and the fixing point occupy the same position.

Incidentally, when the force Fx in the positive X axis direction is applied on the force receiving body 100, a force in the rightward direction in the drawing is applied on the action points Q1 and Q2 (white circles) of the detection ring 200 as illustrated in FIG. 32. However, since the positions of the fixing points P1 and P2 (black circles) of the detection ring 200 are fixed, the detection ring 200 having flexibility is deformed from a circular state as a reference to a distorted state as illustrated in the drawing (incidentally, the view illustrating the deformation state in the present application is a view that is deformed somewhat in order to illustrates the deformation state in an emphasized manner and is not necessarily a view illustrating an accurate deformation mode). To be specific, a tensile force is applied on both ends of a quadrant arc of the detection ring 200 between the points P1 and Q1 and between the points P2 and Q1 so that the quadrant arc contracts inward, and a pressing force is applied on both ends of a quadrant arc of the detection ring 200 between the point P1 to Q2 and between the points P2 and Q2 so that the quadrant arc bulges outward, as illustrated in the drawing.

When a force −Fx in a negative X axis direction is applied on the force receiving body 100, a phenomenon laterally reversed from that illustrated in FIG. 32 occurs. In addition, a phenomenon obtained by rotating the deformation state in the upper part of FIG. 32 by 90° occurs when a force +Fy in a positive Y axis direction and a force −Fy in a negative Y axis direction are applied on the force receiving body 100.

Figure 33:
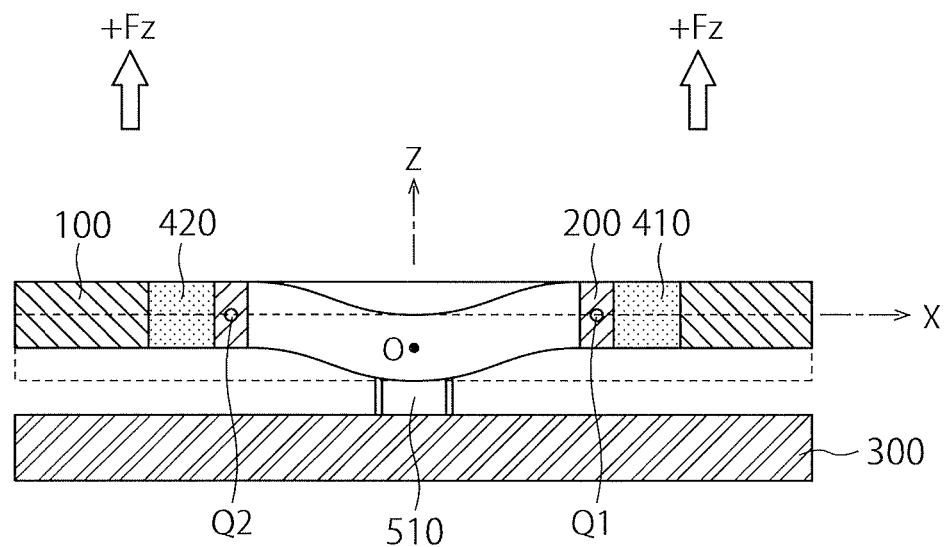
FIG. 33 is a vertical cross-sectional view on the XZ plane illustrating a deformation state when a force +Fz in a positive Z axis direction is applied on the force receiving body of the basic structural part illustrated in FIG. 29.

Next, any kind of change that occurs in this basic structural part when a force in the Z axis direction is applied on the force receiving body 100 in the state where the support substrate 300 is fixed will be considered. FIG. 33 is a vertical cross-sectional view on the XZ plane illustrating a deformation state when a force +Fz in a positive Z axis direction is applied on the force receiving body 100 of the basic structural part illustrated in FIG. 29. The support substrate 300 is fixed and immovable, but the force receiving body 100 moves in the upward direction in the drawing by the force +Fz in the positive Z axis direction. As a result, the detection ring 200 is deformed as illustrated in the drawing. Incidentally, a broken line illustrated in the drawing indicates a position of each ring before being moved or deformed.

Even in this case, the basics of the deformation mode is that positions of the two fixing points P1 and P2 (positions fixed by the fixing members 510 and 520) are immovable, and positions of the two action points Q1 and Q2 move upward. The detection ring 200 is gently deformed from the positions of the fixing points P1 and P2 to the positions of the action points Q1 and Q2. In addition, when a force Fz in a negative Z axis direction is applied on the force receiving body 100, the force receiving body 100 moves in a downward direction in the drawing. As a result, the deformation mode of the detection ring 200 is vertically reversed from that of FIG. 33.

Figure 34:
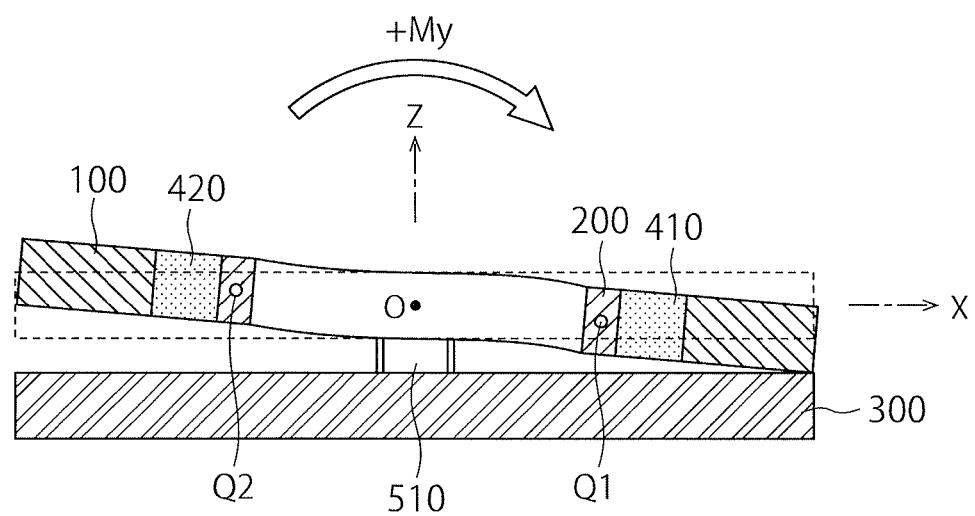
FIG. 34 is a longitudinal cross-sectional view on the XZ plane illustrating a deformation state when the positive moment +My around the Y axis is applied on the force receiving body of the basic structural part illustrated in FIG. 29.

Subsequently, any kind of change that occurs in this basic structural part when a moment around the Y axis is applied on the force receiving body 100 in the state where the support substrate 300 is fixed will be considered. FIG. 34 is a longitudinal cross-sectional view on the XZ plane illustrating a deformation state when a positive moment +My around the Y axis is applied on the force receiving body 100 of the basic structural part illustrated in FIG. 29. Incidentally, the sign of the moment to be applied around a predetermined coordinate axis is set such that a direction of rotation of a right screw for advancing the right screw in a positive direction of the relevant coordinate axis is positive as described above.

Even in this case, the support substrate 300 is fixed and immovable, but the force receiving body 100 receives a positive moment +My around the Y axis and rotates clockwise around the origin O in the drawing. As a result, the action point Q1 moves downward and the action point Q2 moves upward. The detection ring 200 is gently deformed from the positions of the fixing points P1 and P2 (positioned fixed by the fixing members 510 and 520) to the positions of the action points Q1 and Q2. When a negative moment –My around the Y axis is applied on the force receiving body 100, a phenomenon laterally reversed from that illustrated in FIG. 34 occurs. In addition, a phenomenon obtained by rotating the deformation state in the top view by 90° occurs when a positive moment +Mx around the X axis and a negative moment –Mx around the X axis are applied on the force receiving body 100.

Figure 35:
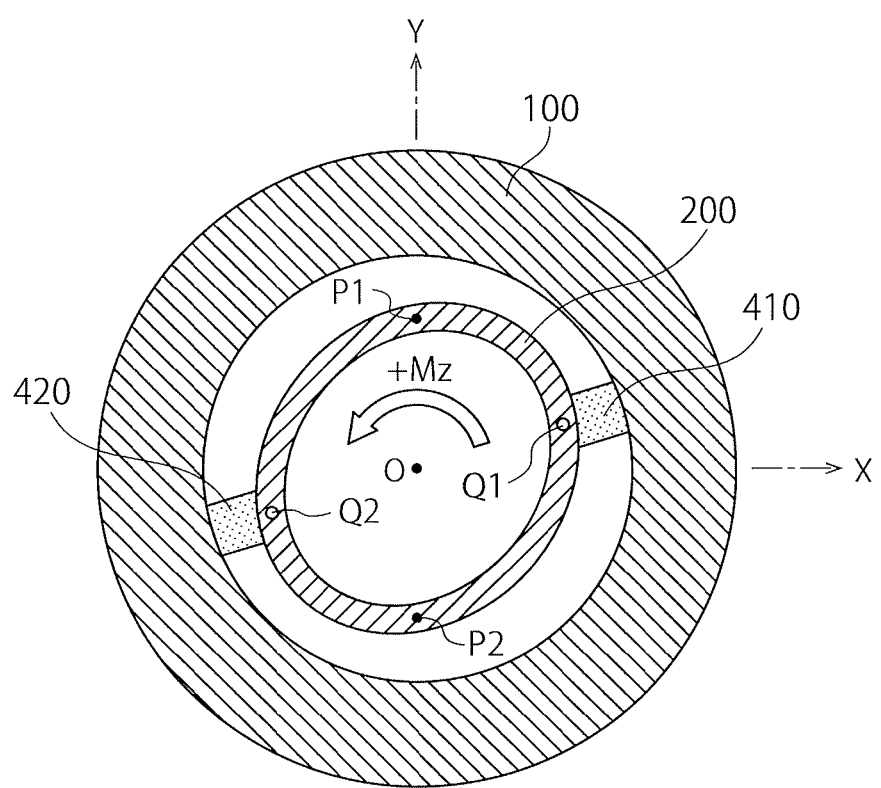
FIG. 35 is a transverse cross-sectional view on the XY plane illustrating a deformation state when a positive moment +Mz around the Z axis is applied on the force receiving body of the basic structural part illustrated in FIG. 29.

Finally, any kind of change that occurs in this basic structural part when a moment around the Z axis is applied on the force receiving body 100 in the state where the support substrate 300 is fixed will be considered. FIG. 35 is a transverse cross-sectional view on the XY plane illustrating a deformation state when a positive moment +Mz around the Z axis is applied on the force receiving body 100 of the basic structural part illustrated in FIG. 29. Even in this case, the support substrate 300 is fixed and immovable, but the force receiving body 100 receives the positive moment +Mz around the Z axis and rotates counterclockwise around the origin O in the drawing.

As a result, the counterclockwise force in the drawing is applied on the action points Q1 and Q2 of the detection ring 200. Meanwhile, the detection ring 200 having flexibility is deformed from the circular state as the reference to a distorted state as illustrated in the drawing since the positions of the fixing points P1 and P2 of the detection ring 200 are fixed. To be specific, a tensile force is applied on both ends of a quadrant arc of the detection ring 200 between the points P2 and Q1 and between the points P1 and Q2 so that the quadrant arc contracts inward, and a pressing force is applied on both ends of a quadrant arc of the detection ring 200 between the point P1 to Q1 and between the points P2 and Q2 so that the quadrant arc bulges outward, and accordingly, the detection ring 200 is deformed into an elliptical shape as a whole as illustrated in the drawing. On the other hand, the force receiving body 100 rotates clockwise around the origin O of the drawing when a negative moment –Mz around the Z axis is applied on the force receiving body 100, and thus, a deformation state obtained by flipping over FIG. 35 occurs.

As described above, the description has been given regarding the deformation modes occurring in the detection ring 200 when the forces in the respective coordinate axis directions and the moments around the respective coordinate axes are applied on the force receiving body 100 in the state where the support substrate 300 of the basic structural part illustrated in FIG. 29 is fixed, but these deformation modes are different from each other and the amount of deformation varies depending on a magnitude of the applied force or moment. Thus, it is possible to separately and independently detect the forces in the respective coordinate axis directions and the moment around the respective coordinate axes by detecting the elastic deformation of the detection ring 200 and collecting information on a mode and a magnitude of the deformation. This is a basic principle of a detection operation in the prior application force sensor. In the prior application force sensor, a capacitive element and a detection circuit are further added to the basic structural part described above in order to perform detection based on such a principle.

<6-2. Structure of Detection Ring>

Figure 36A:
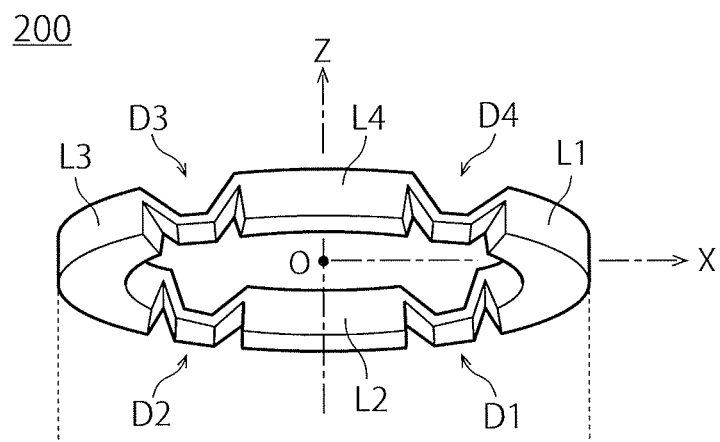
FIG. 36 is a perspective view (FIG. 36(a)), a side view (FIG. 36(b)), and a bottom view (FIG. 36(c)) of a detection ring that includes a wave-shaped detection portion.
Figure 36B:
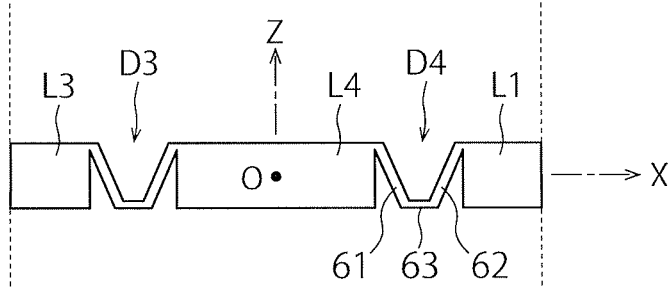
Figure 36C:
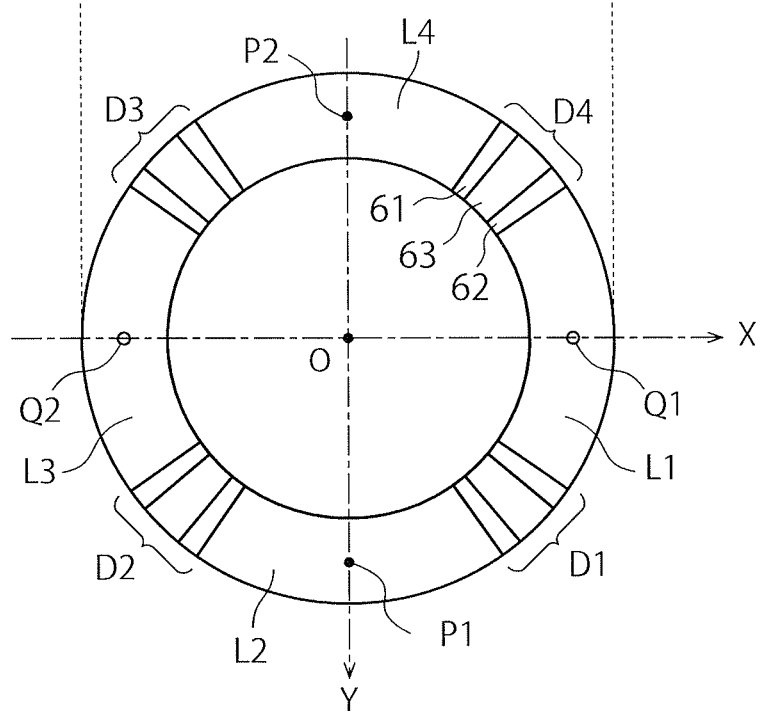

FIG. 36 is a perspective view (FIG. 36(a)), a side view (FIG. 36(b)), a bottom view (FIG. 36(c)) of a detection ring 200 used in the force sensor according to a basic embodiment (first embodiment) of the present invention. The detection ring 200 used in the force sensor of the present application illustrated in FIG. 36 is provided with detection portions D1 to D4 which are configured by combining elastically deformable plate-shaped pieces at four places of a simple annular structure.

In other words, the detection ring 200 illustrated in FIG. 36 is a member obtained by performing a partial material removing process on the annular structural body, and the detection portions D1 to D4 as illustrated in the drawing are formed using each part that has been subjected to this material removing process. Meanwhile, it is not necessarily to perform the material removing process in the case of mass-producing the detection ring 200 in practice, and the detection portion may be manufactured by casting using a mold, molding of resin, pressing or the like, for example.

Here, an XYZ three-dimensional coordinate system is defined as illustrated in the drawing, and a state where the detection ring 200 is arranged on an XY plane with a Z axis as a central axis thereof is illustrated for convenience of description. FIG. 36(a) is the perspective view of the detection ring 200 as viewed from an obliquely lower side. As illustrated in the drawing, the detection ring 200 includes four sets of detection portions D1 to D4 and four sets of connection portions L1 to L4 connecting these detection portions D1 to D4 to each other. That is, the detection ring 200 has a structure in which each of the respective connection portions L1 to L4 is interposed between the respective detection portions D1 to D4.

The detection portion D according to the present embodiment is configured using three plate-shaped pieces (leaf springs) including a first deformation portion 61, a second deformation portion 62, and a displacement portion 63 as illustrated in the detection portion D4 of the side view of FIG. 36(b) (illustrating only a part of an outer circumferential surface in order to avoid complication of the drawing). The other detection portions D1 to D3 also have the same structure. In this manner, each of the detection portions D1 to D4 is configured using the plate-shaped piece having a smaller thickness than that of each of the connection portions L1 to L4, and thus, has a property of undergoing elastic deformation more easily than the connection portions L1 to L4. Therefore, when an external force is applied on the detection ring 200, elastic deformation of the detection ring 200 based on the external force occurs concentrating on the detection portions D1 to D4, and elastic deformation of the connection portions L1 to L4 is a degree that can be ignored in practical use, which will be described later.

In this manner, the deformation concentrates on the detection portions D1 to D4 that easily undergo elastic deformation in the detection ring 200 according to the present embodiment while elastic deformation occurs over the entire ring in a detection ring having a uniform annular structure when an external force is applied. Thus, it is possible to cause more efficient deformation and to perform more efficient detection. To be specific, it is possible to not only enhance detection sensitivity but also freely set a mode of elastic deformation by devising a shape or a structure of the detection portion.

FIG. 36(c) is a bottom view of the detection ring 200 illustrated in FIG. 36(a) as viewed from the lower side, and the Y axis becomes an axis facing a downward direction when the X axis is taken as a rightward direction. As illustrated in the drawing, the connection portion L1, the detection portion D1, the connection portion L2, the detection portion D2, the connection portion L3, the detection portion D3, the connection portion L4, and the detection portion D4 are arranged clockwise in this order with the connection portion L1 arranged on the X axis as a start point. As will be described later, fixing points P1 and P2 (indicated by black circles) on the Y axis are fixed to the support substrate, and an external force applied from the force receiving body acts on action points Q1 and Q2 (indicated by white circles) on the X axis. As a result, elastic deformation in response to the external force is generated in each of the detection portions D1 to D4.

Figure 37:
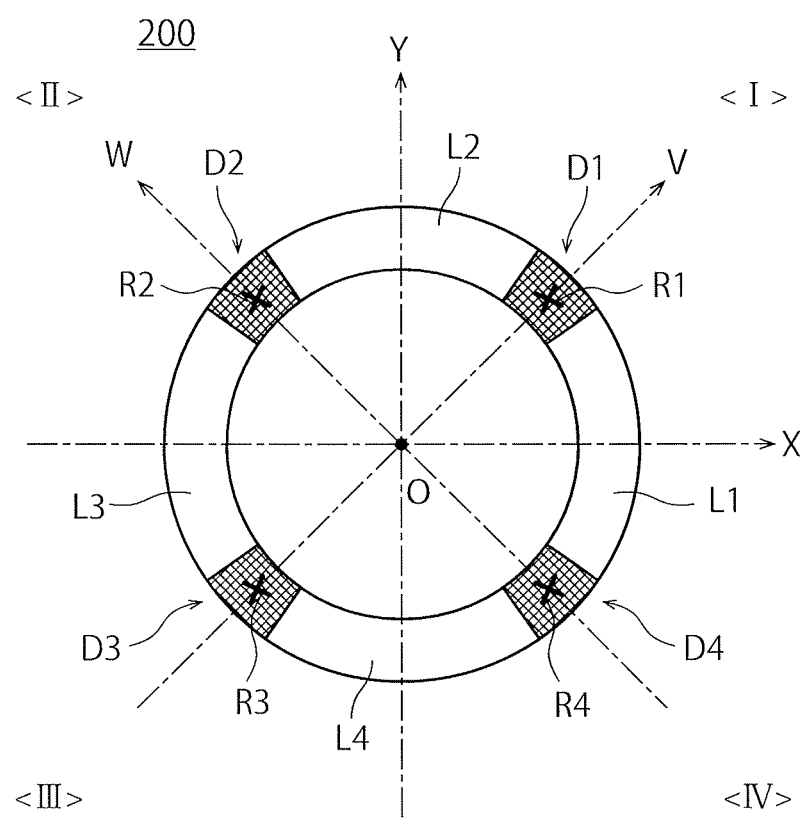
FIG. 37 is a top view illustrating a region distribution of the detection ring illustrated in FIG. 36 (mesh-like hatching indicates regions of detection portions D1 to D4 and does not indicate a cross section).

FIG. 37 is a top view illustrating a region distribution of the detection ring 200 illustrated in FIG. 36 (mesh-like hatching indicates regions of the detection portions D1 to D4 and does not indicate a cross section). Since FIG. 37 is the top view, L1, D1, L2, D2, L3, D3, L4 and D4 are arranged counterclockwise in this order on the detection ring 200, which is contrary to FIG. 36(c). As illustrated in the drawing, a V axis is defined as a coordinate axis obtained by rotating the X axis counterclockwise by 45° around an origin O, and a W axis is defined as a coordinate axis obtained by rotating the Y axis counterclockwise by 45° around the origin O on the XY plane. In the drawing, <I>, <II>, <III>, and <IV> indicate the first quadrant to the fourth quadrant in an XY two-dimensional coordinate system. The four sets of detection portions D1, D2, D3 and D4 are arranged in the first quadrant, the second quadrant, the third quadrant, and the fourth quadrant, respectively.

<6-3. Deformation Modes of Detection Portion>

Figure 38A:
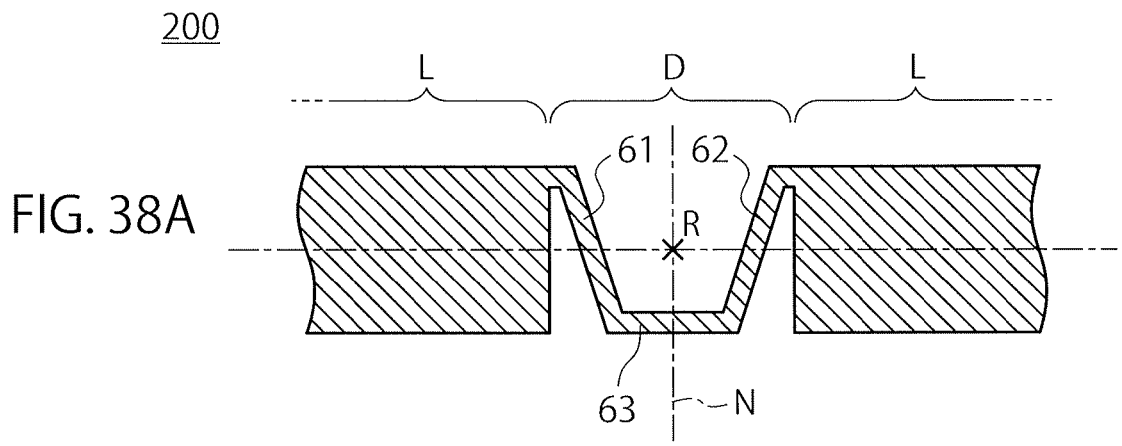
FIG. 38 is a partial cross-sectional view illustrating a detailed structure of the detection portions D1 to D4 (denoted by a reference sign D as a representative) of the detection ring illustrated in FIG. 36.
Figure 38B:
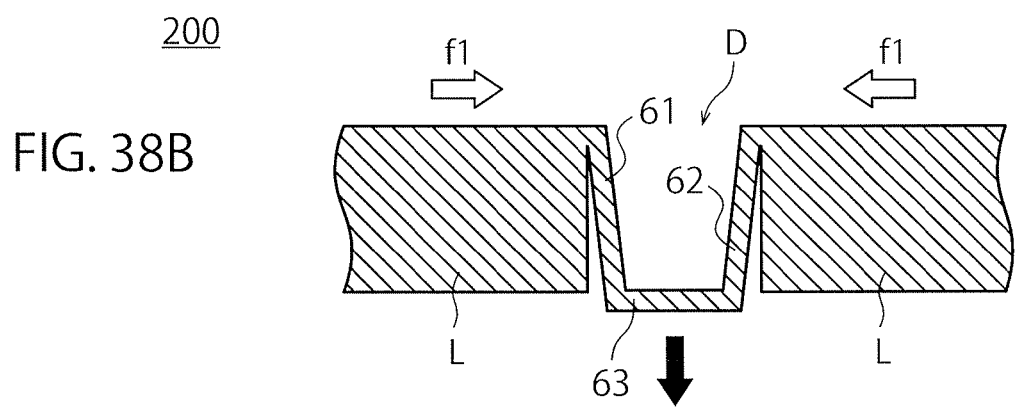
Figure 38C:
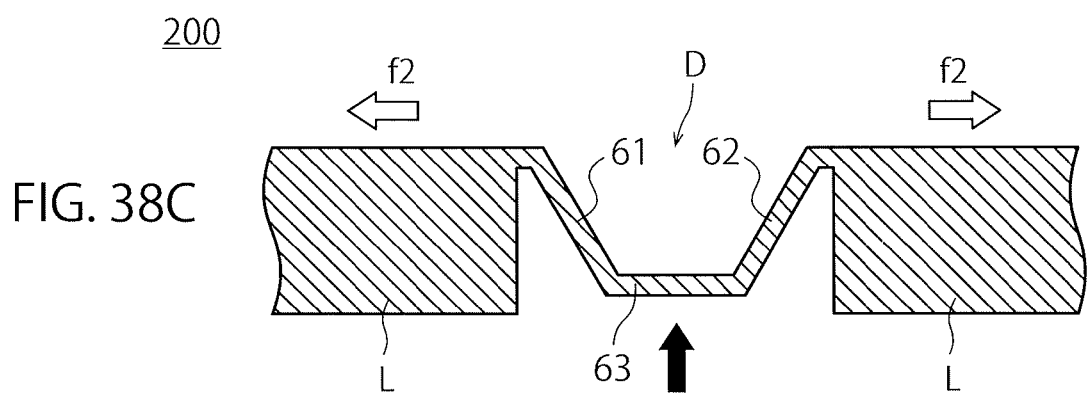

Next, the structure of the respective detection portions D1 to D4 and deformation modes thereof will be described. FIG. 38 is a partial cross-sectional view illustrating the detailed structure of the detection portions D1 to D4 of the detection ring 200 illustrated in FIG. 38. All the four sets of detection portions D1 to D4 have the same structure. A detection portion D illustrated in FIG. 38 is a representative of these four sets of detection portions D1 to D4, and illustrates a sectional part obtained when the detection ring 200 is cut by a cylindrical plane along a circumferential direction of the detection ring 200. FIG. 38(a) illustrates a state where an external force is not applied, FIG. 38(b) illustrates a state where a compressive force f1 is applied on the detection portion D by action of the external force, and FIG. 38(c) illustrates a state where a stretching force f2 is applied on the detection portion D by action of the external force.

As illustrated in FIG. 38(a), connection portions L are positioned on both right and left sides of the detection portion D. The connection portion L corresponds to any of the four sets of connection portions L1 to L4. For example, when the detection portion D illustrated in FIG. 38(a) is the fourth detection portion D4 illustrated in FIG. 36, the connection portion L arranged on the right side corresponds to the connection portion L1 illustrated in FIG. 36, and the connection portion L arranged on the left side corresponds to the connection portion L4 illustrated in FIG. 36.

As illustrated in the drawing, the detection portion D includes the first deformation portion 61 elastically deformable by action of the external force to be detected, the second deformation portion 62 elastically deformable by action of the external force to be detected, and the displacement portion 63 which causes displacement by elastic deformation of the first deformation portion 61 and the second deformation portion 62, and is arranged between an end portion of the connection portion L arranged on the left side and an end portion of the connection portion L arranged on the right side.

In the example illustrated herein, the first deformation portion 61 is configured using a first plate-shaped piece having flexibility, the second deformation portion 62 is configured using a second plate-shaped piece having flexibility, and the displacement portion 63 is configured using a third plate-shaped piece. In practice, the detection ring 200 is configured using a structural body made of the same material such as metal (stainless steel, aluminum, or the like) and synthetic resin (plastic or the like). Since the first plate-shaped piece 61, the second plate-shaped piece 62, and the displacement portion 63 are the plate-shaped members having a smaller thickness than the connection portion L, and thus, have flexibility.

Incidentally, the displacement portion 63 is also the thin plate-shaped member and thus, has the flexibility in the example illustrated herein. However, the displacement portion 63 is not necessarily a member having flexibility (or may have the flexibility, of course). The role of the displacement portion 63 is to cause the displacement when the external force is applied, and it is enough if the first deformation portion 61 and the second deformation portion 62 have the flexibility in order to cause such displacement. On the other hand, the connection portion L may have flexibility to some extent, but it is preferable that the connection portion L is not deformed as much as possible in order to cause effective deformation in the first deformation portion 61 and the second deformation portion 62 by the applied external force.

An outer end of the first deformation portion 61 is connected to the adjacent connection portion L, and an inner end of the first deformation portion 61 is connected to the displacement portion 63. In addition, an outer end of the second deformation portion 62 is connected to the adjacent connection portion L, and an inner end of the second deformation portion 62 is connected to the displacement portion 63. In the example illustrated in FIG. 38(a), the first deformation portion, the second deformation portion, and the displaced portion are configured using the first plate-shaped piece 61, the second plate-shaped piece 62, and third plate-shaped piece 63, respectively, the outer end (left end) of the first plate-shaped piece 61 is connected to a right end portion of the connection portion L arranged on the left side, the inner end (right end) of the first plate-shaped piece 61 is connected to a left end of the third plate-shaped piece 63, the outer end (right end) of the second plate-shaped piece 62 is connected to a left end portion of the connection portion L arranged on the right side, and the inner end of the second plate-shaped piece 62 is connected to a right end of the third plate-shaped piece 63.

As described above, the detection portion D is arranged at a position of a detection point R defined on a basic annular route B. A normal line N illustrated in FIG. 38(a) is a normal line of the XY plane that is set at the position of the detection point R, and the detection portion D is arranged such that the normal line N is located at the center thereof. In addition, in the cross-sectional view of FIG. 38(a), the first plate-shaped piece 61 and the second plate-shaped piece 62 are inclined with respect to the normal line N, and an inclination direction (downward to the right) of the first plate-shaped piece 61 and an inclination direction (upward to the right) of the second plate-shaped piece 62 are opposite to each other.

Particularly, a sectional shape of the detection portion D is line-symmetric with respect to the normal line N, and both upper and lower faces of the third plate-shaped piece 63 form a plane parallel to the XY plane in the example illustrated in the drawing.

In this manner, since the inclination direction of the first plate-shaped piece 61 and the inclination direction of the second plate-shaped piece 62 with respect to the normal line N are opposite to each other regarding the cross section including the basic annular route B, displacement directions of the third plate-shaped piece 63 (displacement portion) are opposite between a case where the compressive force f1 is applied in the direction along the basic annular route B and a case where the stretching force f2 is applied. This is advantageous when performing difference detection using a plurality of capacitive elements as will be described later.

That is, when the compressive force f1 (white arrow in the drawing) is applied to the detection portion D in the direction along the basic annular route B as illustrated in FIG. 38(*b*), stress is applied to the detection portion D in a direction of reducing a lateral width, and thus, postures of the first plate-shaped piece 61 and the second plate-shaped piece 62 change to the state of standing more vertically. As a result, the third plate-shaped piece 63 (displacement portion) is displaced downward as indicated by the black arrow in the drawing. On the other hand, when the stretching force f2 (white arrow in the drawing) is applied to the detection portion D in the direction along the basic annular route B as illustrated in FIG. 38(*c*), stress is applied to the detection portion D in a direction of widening the lateral width, and thus, the postures of the first plate-shaped piece 61 and the second plate-shaped piece 62 change to the state of lying more horizontally. As a result, the third plate-shaped piece 63 (displacement portion) is displaced upward as indicated by the black arrow in the drawing.

The principle of measuring the force or the moment of the force sensor according to the present embodiment utilizes such displacement. That is, the direction of the applied force or moment can be detected using the displacement direction (upward or downward in FIG. 38) of the displacement portion 63, and the magnitude of the acting torque can be detected using the displacement amount thereof.

<6-4. Configuration of Capacitive Element>

Figure 39:
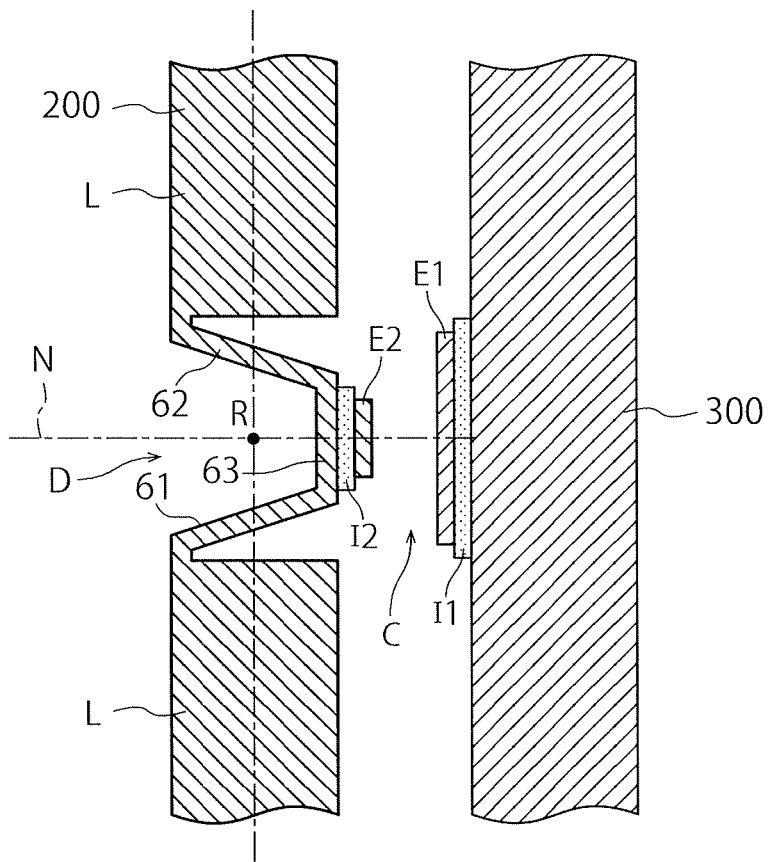
FIG. 39 is a partial cross-sectional view illustrating a detailed structure in which electrodes are provided in the detection portions D1 to D4 (denoted by the reference sign D as a representative) of the detection ring illustrated in FIG. 36 and predetermined portions of the support substrate opposing thereto.

In the present embodiment, a capacitive element is used to detect the displacement of the displacement portion 63. FIG. 39 is a partial cross-sectional view illustrating a detailed structure in which electrodes are provided in the detection portions D1 to D4 of the detection ring 200 illustrated in FIG. 36 and predetermined portions of the support substrate 300 opposing thereto. Even in FIG. 39, the detection portion D is the representative of the four sets of detection portions D1 to D4, and illustrates the sectional part obtained when the detection ring 200 is cut along the circumferential direction of the detection ring 200. That is, a part of the detection ring 200 illustrated on the upper side of FIG. 39 corresponds to a part of the detection ring 200 illustrated in FIG. 36(*a*).

As described above, both surfaces of the third plate-shaped piece 63 form a plane parallel to the XY plane including the basic annular route B in the state where the external force (force or moment) is not applied. Meanwhile, the support substrate 300 is arranged such that both upper and lower surfaces thereof are parallel to the XY plane. Accordingly, the third plate-shaped piece 63 (displacement portion) and an opposing surface of the support substrate 300 are in the state of being parallel to each other as illustrated in the drawing. Moreover, the cross-sectional shape of the detection part D is line symmetric with respect to the normal N in this example illustrated herein, and thus, the third plate-shaped piece 63 (displacement portion) is displaced in the form of moving in parallel with a vertical direction in the drawing when the compressive force f1 or the stretching force f2 as illustrated in FIGS. 38(*b*) and 38(*c*) are applied, and the third plate-shaped piece 63 (displacement portion) and an opposing surface of the support substrate 300 are constantly kept in a parallel state. It is a matter of course that the above-described parallel state is hardly maintained when the third plate-shaped piece 63 is deformed by the external force (f1 or f2). Even in this case, however, no malfunctions occurs in terms of the detection operation if a distance between electrodes E1 and E2 to be described later changes based on the external force (f1 or f2).

As illustrated in the drawing, a fixed electrode E1 is fixed to an upper surface of the support substrate 300 with an insulating layer 11 interposed therebetween, and a displacement electrode E2 is fixed to a lower surface of the third plate-shaped piece 63 (displacement portion) with an insulating layer 12 interposed therebetween in order to detect displacement of the displacement portion. If the support substrate 300 is kept in the fixed state, a position of the fixed electrode E1 is fixed, but a position of the displacement electrode E2 is displaced in accordance with the displacement of the third plate-shaped piece 63 (displacement portion). As illustrated in the drawing, the fixed electrode E1 and the displacement electrode E2 are arranged at the positions opposing each other, and the capacitive element C is configured using both the fixed electrode E1 and the displacement electrode E2. Here, when the third plate-shaped piece 63 (displacement portion) moves in the vertical direction in the drawing, a distance between the pair of electrodes forming the capacitive element C varies. Therefore, it is possible to detect a displacement direction (the upward or downward direction in the drawing) and a displacement amount of the third plate-shaped piece 63 (displacement portion) based on a capacitance value of the capacitive element C.

To be specific, the distance between both the electrodes is reduced and the capacitance value of the capacitive element C increases when the compressive force f1 is applied to the detection portion D as illustrated in FIG. 38(*b*), and the distance between both the electrodes is widened and the capacitance value of the capacitive element C decreases when the stretching force f2 is applied to the detection portion D as illustrated in FIG. 38(*c*). Although FIG. 39 illustrates an example in which the capacitive element C is formed for the detection portion D, it is a matter of course that the fixed electrodes E1 and displacement electrode E2 are provided for each of the four sets of the detection portions D1 to D4 illustrated in FIG. 36, in practice, to form the four sets of capacitive elements C1 to C4. A specific method of detecting individual components of an applied external force using these four sets of capacitive elements C1 to C4 will be described in the following <6-5>.

<6-5. Specific Detection Method of Individual External Force Components>

Figure 40:
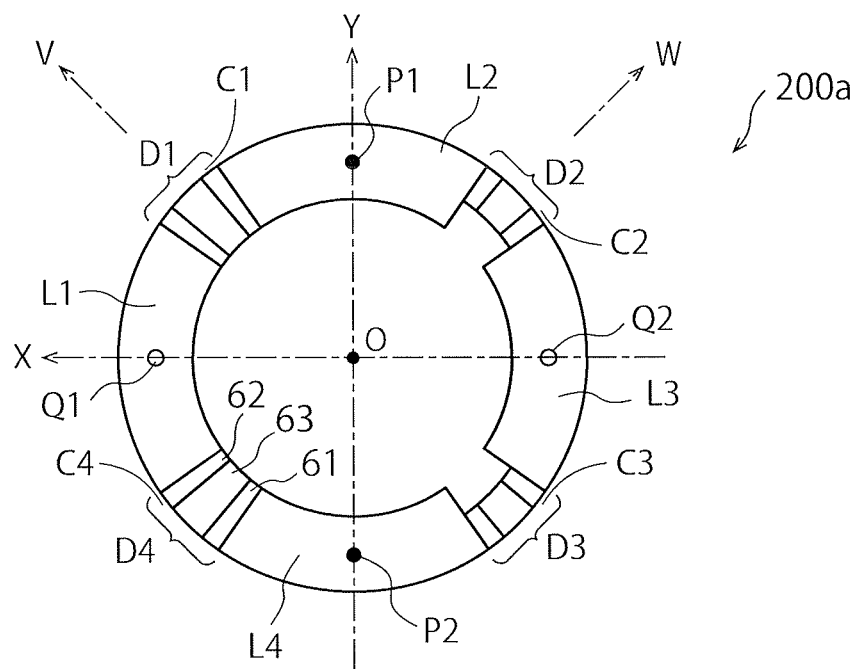
FIG. 40 is a schematic plan view illustrating the detection ring used in the force sensor according to the present embodiment.

Next, FIG. 40 is a schematic plan view illustrating a detection ring 200*a* of the force sensor according to the present embodiment. The detection ring 200*a* is configured such that the first detection portion D1 and the fourth detection portion D4, and the second detection portion D2 and the third detection portion D3 have different spring constants. To be specific, a thickness (width) in a radial direction of the first deformation portion 61 and the second deformation portion 62 in the first and fourth detection portions D1 and D4 is configured to be larger than a thickness (width) in the radial direction of the first deformation portion 61 and the second deformation portion 62 in the second and third detection portions D2 and D3 so that each spring constant of the first and fourth detection portions D1 and D4 is larger than each spring constant of the second and third detection portions D2 and D3 as illustrated in the drawing. In addition, the first detection portion D1 and the fourth detection portion D4 have the same spring constant, and the second detection portion D2 and the third detection portion D3 have the same spring constant in the present embodiment. Further, a total of four capacitive elements are arranged at positions corresponding to the respective detection portions as described above.

Figure 41:
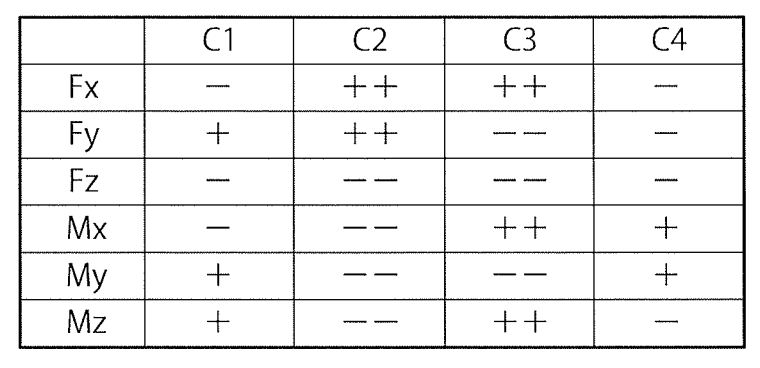

The table in FIG. 41 shows each variation amount (degree of an increase or decrease) of capacitance values of the respective capacitive elements C1 to C4 when forces and moments +Fx, +Fy, +Fz, +Mx, +My and +Mz in the positive direction are applied on the force receiving body 100 in the state where the support substrate 300 is fixed in the force sensor as described above. Here, capacitive elements formed for the four sets of detection portions D1 to D4 are referred to as capacitive elements C1 to C4, respectively, and capacitance values of these respective capacitive elements C1 to C4 are denoted by the same signs C1 to C4. In this table, "+" indicates that a capacitance value increases (an electrode interval of the capacitive element C decreases), and "−" indicates a capacitance value decreases (an electrode interval of the capacitive element C increases). In addition, "++" indicates that a degree of an increase of a capacitance value is greater than "+", and "−−" indicates that a degree of a decrease of a capacitance value is greater than "−".

However, a magnitude of an increase or decrease of each capacitance value is practically a quantity that depends on a dimension or thickness of each portion of the detection ring 200a, and particularly, each dimension or thickness of the plate-shaped pieces 61, 62 and 63 forming the detection portion D, and thus, the difference between "+" and "++" or the difference between "−" and "−−" in the table shown in the present application are set only in a relative manner. Since this magnitude of the increase or decrease is the relative magnitude for each of the six components Fx to Mz, a magnitude relation differs between, for example, "+" and "−" corresponding to Fx, and "+" and "−" corresponding to Fz. In addition, the forces Fx, Fy and Fz (unit: N) and the moments Mx, My and Mz (unit: N·m) are different physical quantities, and the direct comparison thereof is difficult It is possible to understand why results as shown in the table of FIG. 41 are obtained when considering any force applied at each position of the detection portions D1 to D4 of the detection ring 200a illustrated in FIG. 40 based on the deformation mode illustrated in FIG. 38 with reference to the deformation modes of the detection ring 200 illustrated in FIGS. 32 to 35.

For example, when the force Fx in the positive X axis direction is applied on the force receiving body 100, the detection ring 200a is deformed as illustrated in FIG. 32, and the stretching force f2 is applied between the points P1 and Q1 and between the points P2 and Q1 and the compressive force f1 is applied between the points P1 and Q2 and between the points P2 and Q2. Accordingly, the stretching force f2 is applied on the detection portions D1 and D4, the displacement portion 63 moves upward as illustrated in FIG. 38(c), and the capacitance values C1 and C4 decrease. On the other hand, the compressive force f1 is applied on the detection parts D2 and D3, the displacement part 63 moves downward as illustrated in FIG. 38(b), and the capacitance values C2 and C3 increase.

In the present embodiment, however, the spring constant of the first and fourth detectors D1 and D4 is set to be smaller than the spring constant of the second and third detectors D2 and D3 as described above. Thus, the variation amount of the capacitance values is greater in the first and fourth capacitive elements C1 and C4 provided in the first and fourth detection portions D1 and D4 than in the second and third capacitive elements C2 and C3 provided in the second and third detection portions D2 and D3.

Similarly, when the force +Fy in the positive Y axis direction is applied on the force receiving body 100, the compressive force f1 is applied between the points P1 and Q1 and between the points P1 and Q2, and the stretching force f2 is applied between the points P2 and Q1 and the points P2 and Q2. Therefore, the compressive force f1 is applied on the detection portions D1 and D2, and the capacitance values C1 and C2 increase. On the other hand, the stretching force f2 is applied on the detection portions D3 and D4, and the capacitance values C3 and C4 decrease.

In addition, when the force +Fz in the positive Z axis direction is applied on the force receiving body 100, the detection ring 200a is deformed as illustrated in FIG. 33. Therefore, all the four sets of detection portions D1 to D4 move upward (in the positive Z axis direction). Thus, all the electrode intervals of the four sets of capacitive elements C1 to C4 are widened and the capacitance values C1 to C4 decrease.

Meanwhile, when the positive moment +My around the Y axis is applied on the force receiving body 100, the detection ring 200a is deformed as illustrated in FIG. 34, the right half of the drawing is displaced downward, the left half of the drawing is displaced upward. Therefore, the detection portions D1 and D4 positioned in the right half of the drawing are displaced downward, and the detection portions D2 and D3 positioned in the left half of the drawing are displaced upward. Thus, the electrode intervals of the capacitive elements C1 and C4 decrease, and the capacitance values C1 and C4 increase. In addition, the electrode distances of the capacitive elements C2 and C3 increase, and the capacitance values C2 and C3 decrease.

Similarly, when the positive moment +Mx around the X axis is applied on the force receiving body 100, the detection portions D3 and D4 positioned in the lower half of the drawing are displaced downward, and the detection portions D1 and D2 positioned in the upper half of the drawing are displaced upward. Thus, the electrode intervals of the capacitive elements C3 and C4 decrease, and the capacitance values C3 and C4 increase. In addition, the electrode distances of the capacitive elements C1 and C2 increase, and the capacitance values C1 and C2 decrease.

Finally, when the positive moment +Mz around the Z axis is applied on the force receiving body 100, the detection ring 200a is deformed as illustrated in FIG. 35, and the compressive force f1 is applied between the points P1 and Q1 and between the points P2 and Q2, and the stretching force f2 is applied between the points P1 and Q2 and between the points P2 and Q1. Therefore, the compressive force f1 is applied on the detection portions D1 and D3, and the capacitance values C1 and C3 increase. On the other hand, the stretching force f2 is applied on the detection portions D2 and D4, and the capacitance values C2 and C4 decrease.

Incidentally, the table in FIG. 41 illustrates the results in the case where the force in the positive direction and the moment in the positive direction are applied, but results with reversed "+" and "−" are obtained in a case where a force in the negative direction and a moment in the negative direction are applied.

Incidentally, the fact that the first and fourth capacitive elements C1 and C4 have the greater variation amount of the capacitance values (higher sensitivity) than the second and third capacitive elements C2 and C3 is considered when calculating each component, and appropriate correction is performed such that such a difference in sensitivity does not affect the calculation result of each component.

<6-6. Principle of Malfunction Determination of Force Sensor According to Present Embodiment>

Next, a method to perform malfunction determination in the above-described force sensor will be described. In the present embodiment, the malfunction diagnosis of the force sensor is performed by utilizing a fact that the capacitance values of the capacitive elements C1 to C4 are likely to vary (the sensitivity thereof increases) as metal fatigue is accumulated in the first deformation portion 61 and the second deformation portion 62 of the detection ring 200a. In particular, the metal fatigue is remarkably developed in the first deformation portion 61 and the second deformation portion 62 forming the second and third detection portions D2 and D3 having the smaller spring constant. When the metal fatigue is developed and accumulated in a metal material, the metal material is softened. Thus, the sensitivity remarkably increases in the second and third capacitive elements C2 and C3 corresponding to the second and third detection portions D2 and D3.

By utilizing this fact, it is possible to perform the malfunction diagnosis of the force sensor by comparing a ratio (reference ratio) between the variation amount of the capacitance values of the first and fourth capacitive elements C1 and C4 and the variation amount of the capacitance values of the second and third capacitive elements C2 and C3 in a case where the metal fatigue does not occur in the detection ring 200a with a ratio in a case where the metal fatigue occurs in the detection ring 200a when the force Fx with a certain magnitude is applied on the force receiving body 100, for example.

Here, an electric signal corresponding to a sum of the variation amount of the capacitance values of the second and third capacitive elements C2 and C3 is set as a first electric signal T1, and an electric signal corresponding to a sum of the variation amount of the capacitance values of the first and fourth capacitive elements C1 and C4 is set as a second electric signal T2 as shown in the following [Expression 13].

$T1 = C2 + C3$ $T2 = C1 + C4$ [Expression 13]

In the present embodiment, malfunction diagnosis of the force sensor is performed by utilizing a fact that a ratio between the first electric signal T1 and the second electric signal T2 changes along with accumulation of metal fatigue in the detection ring 200a. In the following description, it is assumed that first and second electric signals in an initial state where the metal fatigue does not occur in the detection ring 200a are denoted by T1a and T2a, and first and second electric signals in a state where the metal fatigue occurs (is accumulated) in the detection ring 200a are denoted by T1b and T2b to distinguish from each other.

Figure 42:
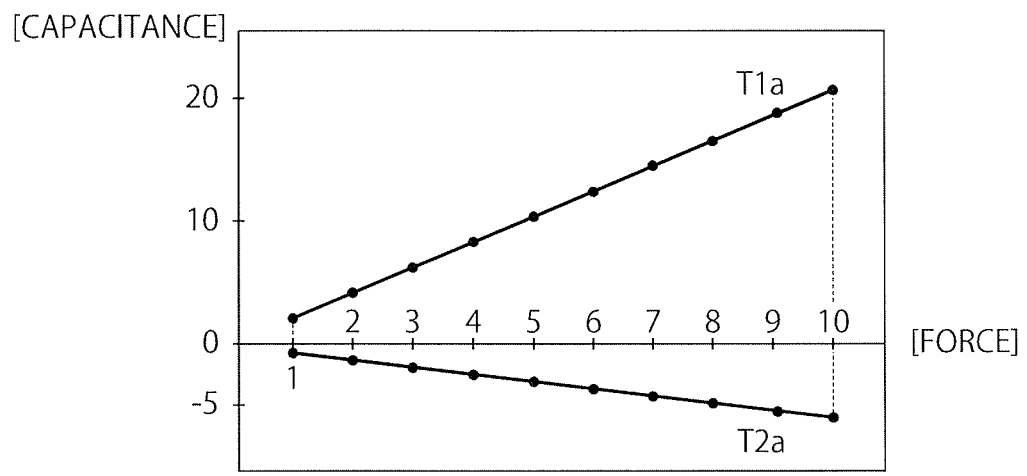
FIG. 42 is a graph illustrating a relationship between a magnitude of the force Fz applied on the force sensor and the first electric signal T1$a$ and the second electric signal T2$a$ output from the force sensor in a case (initial state) where metal fatigue does not occur in the detection ring of FIG. 40.
Figure 43:
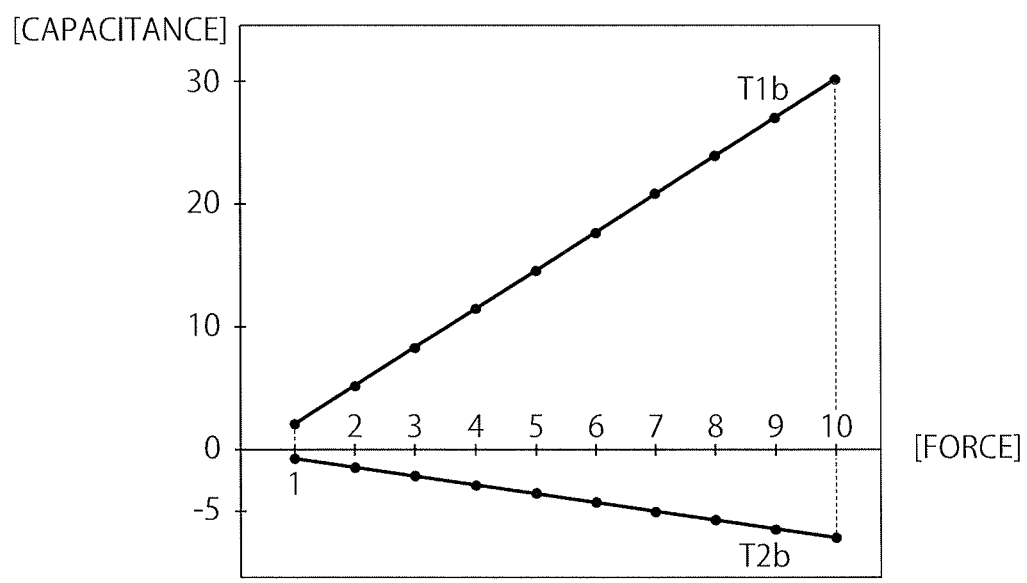
FIG. 43 is a graph illustrating a relationship between a magnitude of the force Fz applied on the force sensor and the first electric signal T1$b$ and the second electric signal T2$b$ output from the force sensor in a case where metal fatigue occurs in the detection ring of FIG. 40.

FIG. 42 is a graph illustrating a relationship between the magnitude of the force applied on the force sensor and the first electric signal T1a and the second electric signal T2a output from the force sensor in the state (initial state) where the metal fatigue does not occur in the detection ring 200a of FIG. 40, and FIG. 43 is a graph illustrating a relationship between the magnitude of the force applied on the force sensor and the first electric signal T2a and the second electric signal T2b output from the force sensor in a case where the metal fatigue occurs (is accumulated) in the detection ring 200a of FIG. 40.

In each drawing, the horizontal axis represents an absolute value of the force Fx applied on the force sensor and the vertical axis represents a magnitude of an electric signal output from the force sensor in response to the force Fx. Thus, an inclination of a straight line indicating each of the electric signals T1a, T1b, T2a and T2b represents the detection sensitivity of the force sensor in each drawing.

Next, a method of determining whether the force sensor functions normally will be described. When a repeated load is applied on the force sensor according to the present embodiment, the metal fatigue occurs in the detection ring 200a. The metal fatigue is remarkably developed in the second and third detection portions D2 and D3 in which the deformation caused by the force Fx is relatively large as described above. When this metal fatigue is accumulated, each strength of the first deformation portion 61 and the second deformation portion 62 in the second and third detection portions D2 and D3 decreases, and finally, the detection ring 200a is broken in the second and third detection portions D2 and D3. When the metal fatigue is accumulated in the second and third detection portions D2 and D3, the second and third detection portions D2 and D3 are greatly deformed by the force Fx, and the sensitivity of the second and third detection portions D2 and D3 with respect to the force Fx increase as compared with the initial state. This can be understood by comparing FIGS. 42 and 43.

To be specific, an inclination (sensitivity) of a straight line indicating the first electric signal T1a is 2.0 in the initial state when referring to FIG. 42. On the other hand, an inclination (sensitivity) of a straight line indicating the second electric signal T2b is 3.0 in the state where the metal fatigue is accumulated, and the sensitivity increases by 50% when referring to FIG. 43.

It is a matter of course that the metal fatigue is also developed in the first and fourth detection portions D1 and D4, but a degree of the development thereof is smaller than a degree of the development of metal fatigue in the second and third detection portions D2 and D3. In practice, an absolute value (sensitivity) of a straight line indicating the second electric signal T2a is 0.5 in the initial state when referring to FIG. 42. On the other hand, an absolute value (sensitivity) of a straight line indicating the second electric signal T2b in the state where the metal fatigue is accumulated is 0.6 when referring to FIG. 43. Therefore, an increase rate is only 20% even if the sensitivity increases.

It should be noted here that the degree of development of metal fatigue differs between the second and third detection portions D2 and D3, and the first and fourth detection portions D1 and D4. The present invention utilizes this fact to perform the malfunction diagnosis of the force sensor. That is, an absolute value of a ratio (T2a/T1a) between the first electric signal T1a and the second electric signal T2a is 4.0 in the initial state, whereas an absolute value of a ratio (T2b/T1b) between the first electric signal T1b and the second electric signal T2b increases to 5.0 in the state where the metal fatigue is accumulated.

In other words, the ratio between the first electric signal T1 and the second electric signal T2 gradually changes due to the difference in characteristic of accumulation of metal fatigue between the second and third detection portions D2 and D3, and the first and fourth detection portions D1 and D4. Further, the detection ring 200a finally breaks at the second detection portion D2 or the third detection portion D3 when a repetitive load is further applied on the force sensor. On the other hand, it is highly probable that the first and fourth detection portions D1 and D4 normally function at this point in time.

In the above-described manner, it is possible to determine whether the force sensor functions normally by evaluating whether a difference between a ratio between the first electric signal T1b and the second electric signal T2b at a certain point in time and the ratio (reference ratio) between the first electric signal T1a and the second electric signal T2a in the initial state falls within a predetermined range.

In order to embody the above determination principle, the force sensor according to the present embodiment also includes the above-described detection circuit illustrated in FIG. 5. A method of diagnosing malfunction using this detection circuit is substantially the same as that in § 1, and thus, a detailed description thereof will be omitted.

According to the present embodiment as described above, the ratio between the first electric signal T1b and the second electric signal T2b changes when the metal fatigue occurs in the detection ring 200a, and thus, it is possible to provide the force sensor capable of detecting the occurrence of the metal fatigue based on this change and diagnosing the malfunction of the deformation body.

To be specific, the detection circuit according to the present embodiment includes the storage unit 48 that stores the ratio between the first electric signal T1a and the second electric signal T2a in a state where the force sensor normally functions as a reference ratio, and is configured to determine whether the force sensor functions normally by determining whether a "difference between the ratio between the first electric signal T1b and the second electric signal T2b and the reference ratio" falls within a predetermined range. Thus, it is possible to reliably perform the malfunction determination of the detection ring 200a, that is, the malfunction determination of the force sensor based on the reference ratio set in advance.

<6-7. Principle of Malfunction Determination of Force Sensor According to Another Embodiment>

Figure 44:
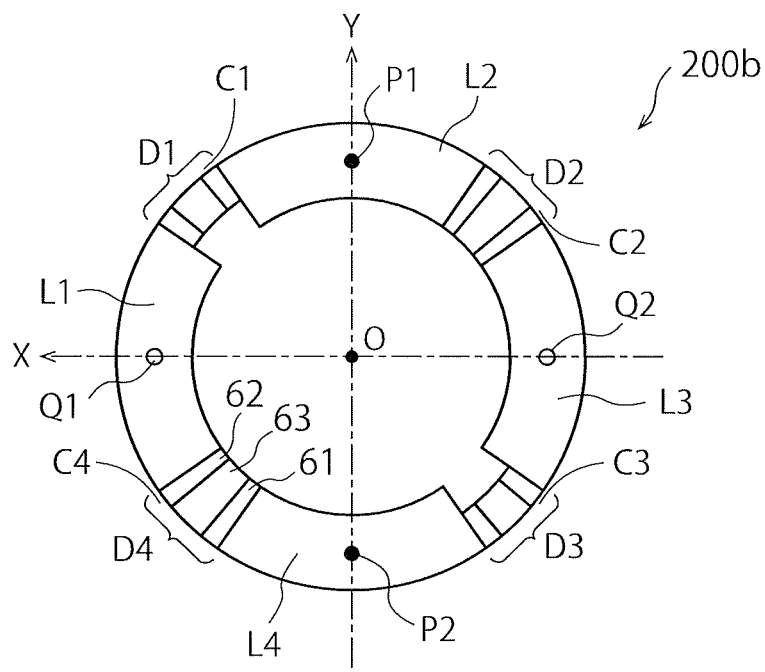
FIG. 44 is a schematic plan view of a detection ring illustrating a modified example of the detection ring of FIG. 40.

In the above description, the method of performing the malfunction determination of the force sensor based on the force Fx in the X axis direction has been described. However, it is also possible to perform malfunction determination of the force sensor based on the force Fz in the Z axis direction. FIG. 44 is a schematic plan view of a detection ring 200b illustrating a modified example of the detection ring 200a of FIG. 40, which is the schematic plan view illustrating the detection ring 200b that is used in the case of performing the malfunction determination based on the force Fz. Since the detection ring 200b has the substantially same overall configuration as the detection ring 200a illustrated in FIG. 40, the corresponding constituent parts will be denoted by the same reference signs, and a detailed description thereof will be omitted. Meanwhile, the detection ring 200b according to the present embodiment is different from the detection ring 200a of FIG. 40 in terms that each spring constant of the first detection portion D1 and the third detection portion D3 is smaller than each spring constant of the second detection portion D2 and the fourth detection portion D4. The first detection portion D1 and the third detection portion D3 have the same spring constant, and the second detection portion D2 and the fourth detection portion D4 have the same spring constant. Further, a total of four capacitive elements are arranged at positions corresponding to the respective detection portions.

An operation of the force sensor including the detection ring 200b described above in a case where the forces Fx, Fy and Fz in the respective coordinate axis directions and the moments Mx, My and Mz around the respective coordinate axes are applied on the force receiving body 100 in the state where the support substrate 300 is fixed is the same as the operation described in <6-5>. Incidentally, the fact that the first and third capacitive elements C1 and C3 have the greater variation amount of the capacitance values (higher sensitivity) than the second and fourth capacitive elements C2 and C4 is also considered here when calculating the force or moment, and appropriate correction is performed such that such a difference in sensitivity does not affect the calculation result of each component.

Next, a method to perform malfunction determination in the above-described force sensor will be described. In the present embodiment, malfunction diagnosis of the force sensor is performed by utilizing a fact that capacitance values of the capacitive elements C1 to C4 are likely to vary (the sensitivity thereof increases) as metal fatigue is accumulated in the first deformation portion 61 and the second deformation portion 62 of the detection ring 200b. In particular, the metal fatigue is remarkably developed in the first deformation portion 61 and the second deformation portion 62 forming the first and third detection portions D1 and D3 having the smaller spring constant. When the metal fatigue is developed and accumulated in a metal material, the metal material is softened. Thus, the sensitivity remarkably increases in the first and third capacitive elements C1 and C3 corresponding to the first and third detection portions D1 and D3.

By utilizing this fact, it is possible to perform the malfunction diagnosis of the force sensor by comparing a ratio (reference ratio) between the variation amount of the capacitance values of the first and third capacitive elements C1 and C3 and the variation amount of the capacitance values of the second and fourth capacitive elements C2 and C4 in a case where the metal fatigue does not occur in the detection ring 200b with a ratio in a case where the metal fatigue occurs in the detection ring 200b when the force Fz with a certain magnitude is applied on the force receiving body 100, for example.

Here, an electric signal corresponding to a sum of the variation amount of the capacitance values of the first and third capacitive elements C1 and C3 is set as a first electric signal T1, and an electric signal corresponding to a sum of the variation amount of the capacitance values of the second and fourth capacitive elements C2 and C4 is set as a second electric signal T2 as shown in the following [Expression 14].

$$T1 = C1 + C3$$

$$T2 = C2 + C4 \qquad \text{[Expression 14]}$$

Even in the present modified example, malfunction diagnosis of the force sensor is performed by utilizing a fact that a ratio between the first electric signal T1 and the second electric signal T2 changes along with accumulation of metal fatigue in the detection ring 200b. Here, it is also assumed that first and second electric signals in an initial state where the metal fatigue does not occur in the detection ring 200b are denoted by T1a and T2a, and first and second electric signals in a state where the metal fatigue occurs (is accumulated) in the detection ring 200b are denoted by T1b and T2b to distinguish from each other.

In the present modified example, a relationship between a magnitude of the force applied on the force sensor and the first electric signal T1a and the second electric signal T2a output from the force sensor in the case (initial state) where metal fatigue does not occur in the detection ring 200b of FIG. 44 is the same as the graph illustrated in FIG. 42. In addition, a relationship between a magnitude of the force applied on the force sensor and the first electric signal T2a and the second electric signal T2b output from the force sensor in a state where metal fatigue occurs (is accumulated) in the detection ring 200b of FIG. 44 is the same as the graph illustrated in FIG. 43.

A principle and a method for determination on whether the force sensor according to the present embodiment described above functions normally are the same as those in § 6-6. That is, it is possible to understand the principle and the method of the malfunction determination of the force sensor according to the present embodiment by replacing [Expression 14] with the first electric signal T1 (T1a, T1b) and the second electric signal T2 (T2a, T2b) in § 6-6. Thus, a detailed description of the principle and method will be omitted herein.

According to the present modified example as described above, the ratio between the first electric signal T1 and the second electric signal T2 changes when the metal fatigue occurs in the detection ring 200b, and thus, it is possible to provide the force sensor capable of detecting the occurrence of the metal fatigue based on this change and diagnosing the malfunction of the deformation body.

To be specific, the detection circuit according to the present embodiment includes the storage unit 48 that stores the ratio between the first electric signal T1a and the second electric signal T2a in a state where the force sensor normally functions as a reference ratio, and is configured to determine whether the force sensor functions normally by determining whether a "difference between the ratio between the first electric signal T1b and the second electric signal T2b and the reference ratio" falls within a predetermined range. Thus, it is possible to reliably perform the malfunction determination of the detection ring 200b, that is, the malfunction determination of the force sensor based on the reference ratio set in advance.

Figure 45:
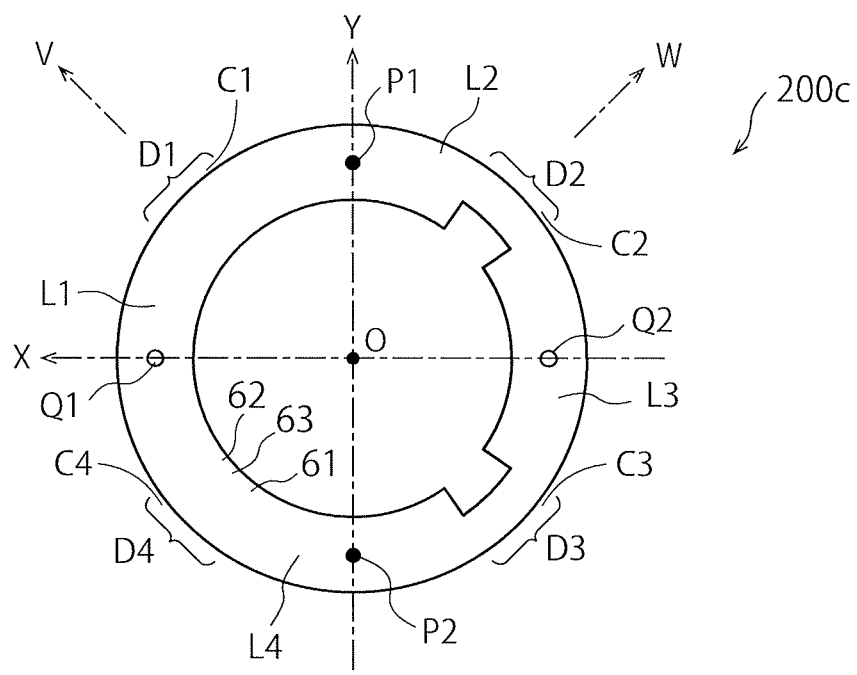
FIG. 45 is a schematic plan view illustrating a detection ring according to a modified example of the detection ring illustrated in FIG. 29.

Although the malfunction determination in the force sensor illustrated in FIG. 29 has not been described, it is possible to perform the malfunction determination described in <6-6> in the same manner as in the force sensor illustrated in FIG. 36. In this case, a detection ring illustrated in FIG. 45 may be employed. FIG. 45 is a schematic plan view illustrating a detection ring 200c according to a modified example of the detection ring 200 illustrated in FIG. 29. The detection ring 200c has a region in which a spring constant is relatively reduced by setting a thickness in a radial direction thereof to be smaller than a thickness of the other region, at positions corresponding to the second and third detection portions D2 and D3 of the detection ring 200a illustrated in FIG. 40. In addition, the displacement electrode arranged on the detection ring 200a is arranged on a side opposing the support substrate 300 in the force sensor illustrated in FIG. 40 (see FIG. 39), but may be arranged on a side surface of the detection ring 200c with respect to the detection ring 200c illustrated in FIG. 45.

In addition, the force sensor illustrated in FIGS. 36 to 40 includes only the four capacitive elements configured to detect the force or moment, and thus, it is difficult to detect all the six components of the force or moment. Therefore, the malfunction determination method illustrated herein is effective when a force in a specific axis direction (for example, Fx) is applied on the force sensor.

In addition, the principle of malfunction determination has been described in the force sensor illustrated in FIG. 16 on the premise of the force sensor in which only the force Fz is applied.

The invention claimed is:

1. A force sensor that detects at least one component among components of a force in each axis direction in an XYZ three-dimensional coordinate system, and of a moment around each axis, the sensor comprising:
    a support body that is arranged on an XY plane;
    a deformation body that is joined to the support body; and
    a detection circuit that outputs an electric signal indicating a force applied on the deformation body,
    wherein the deformation body includes a first deformation portion having a first spring constant and a second deformation portion having a second spring constant different from the first spring constant, and
    the detection circuit outputs, in response to an applied force, a first electric signal corresponding to the deformation of the first deformation portion and a second electric signal corresponding to the deformation of the second deformation portion and determines whether the force sensor functions normally based on a change of a ratio between the first electric signal and the second electric signal, both corresponding to the applied force.

2. The force sensor according to claim 1, wherein a component applied on the force sensor is detected based on the first electric signal or the second electric signal.

3. The force sensor according to claim 2, wherein the detection circuit detects the applied component using a change of a capacitance.

4. The force sensor according to claim 2, wherein the detection circuit detects the applied component using a change of an electrical resistance value.

5. The force sensor according to claim 2, wherein the detection circuit detects the applied component using a light emitting element and a light receiving element.

6. The force sensor according to claim 1, wherein the detection circuit detects the applied component using a change of a capacitance.

7. The force sensor according to claim 1, wherein the detection circuit detects the applied component using a change of an electrical resistance value.

8. The force sensor according to claim 1, wherein the detection circuit detects the applied component using a light emitting element and a light receiving element.

* * * * *